April 11, 1961 S. H. CREED ET AL 2,979,093
PEAR PEELING MACHINE
Filed Nov. 30, 1956 31 Sheets-Sheet 1
FIG_1
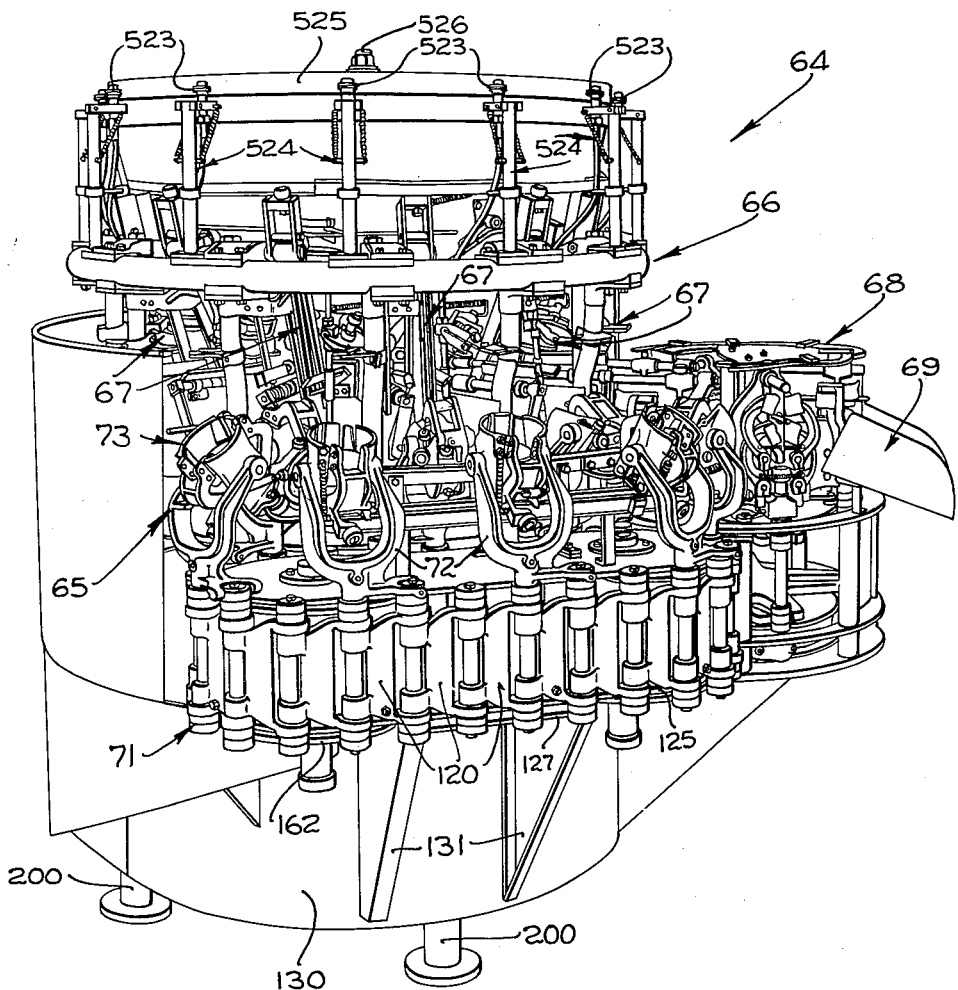
INVENTORS
SHERMAN H. CREED
SANDOR CSIMMA
BY Hans G. Hoffmeister
ATTORNEY

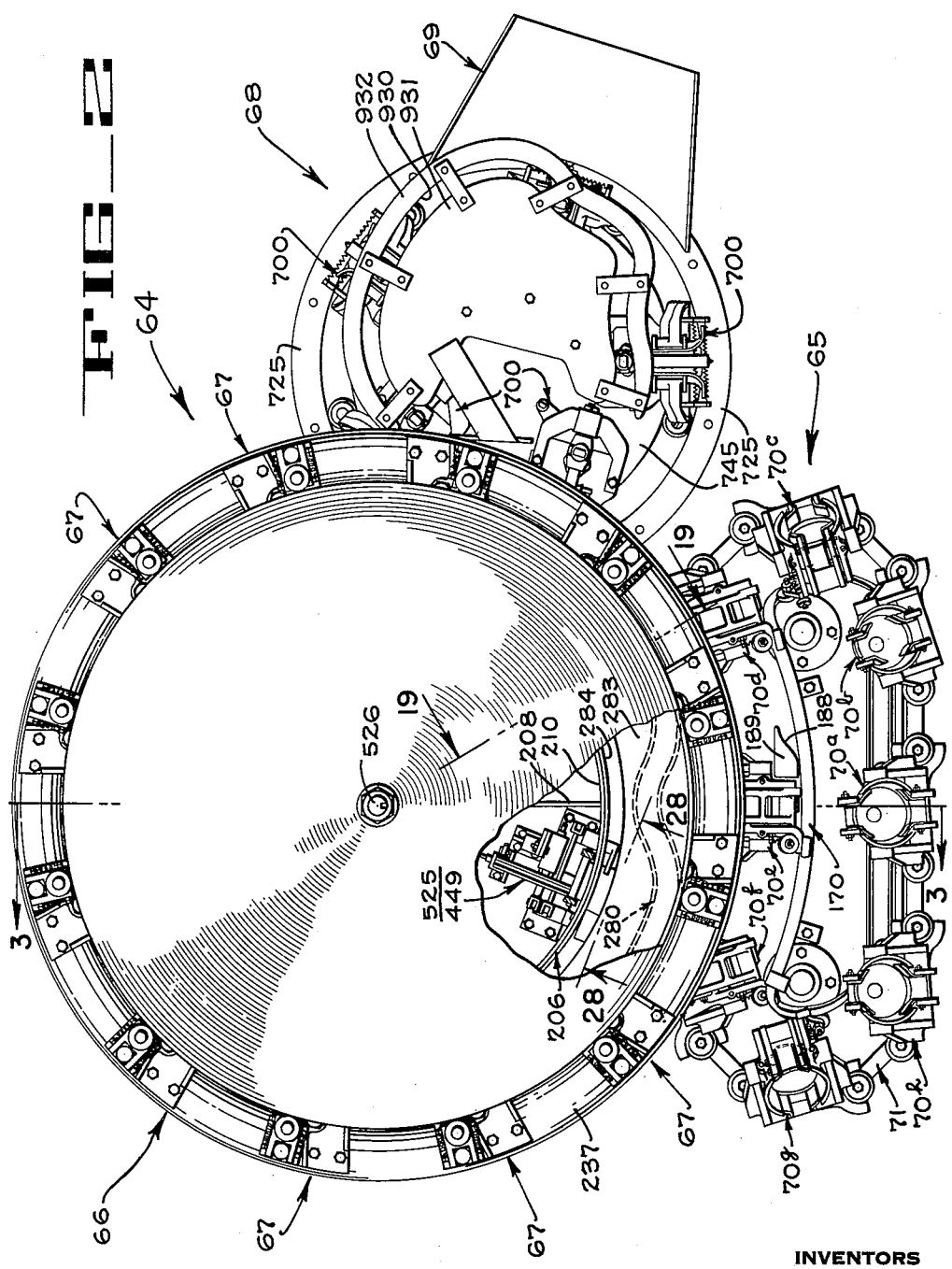

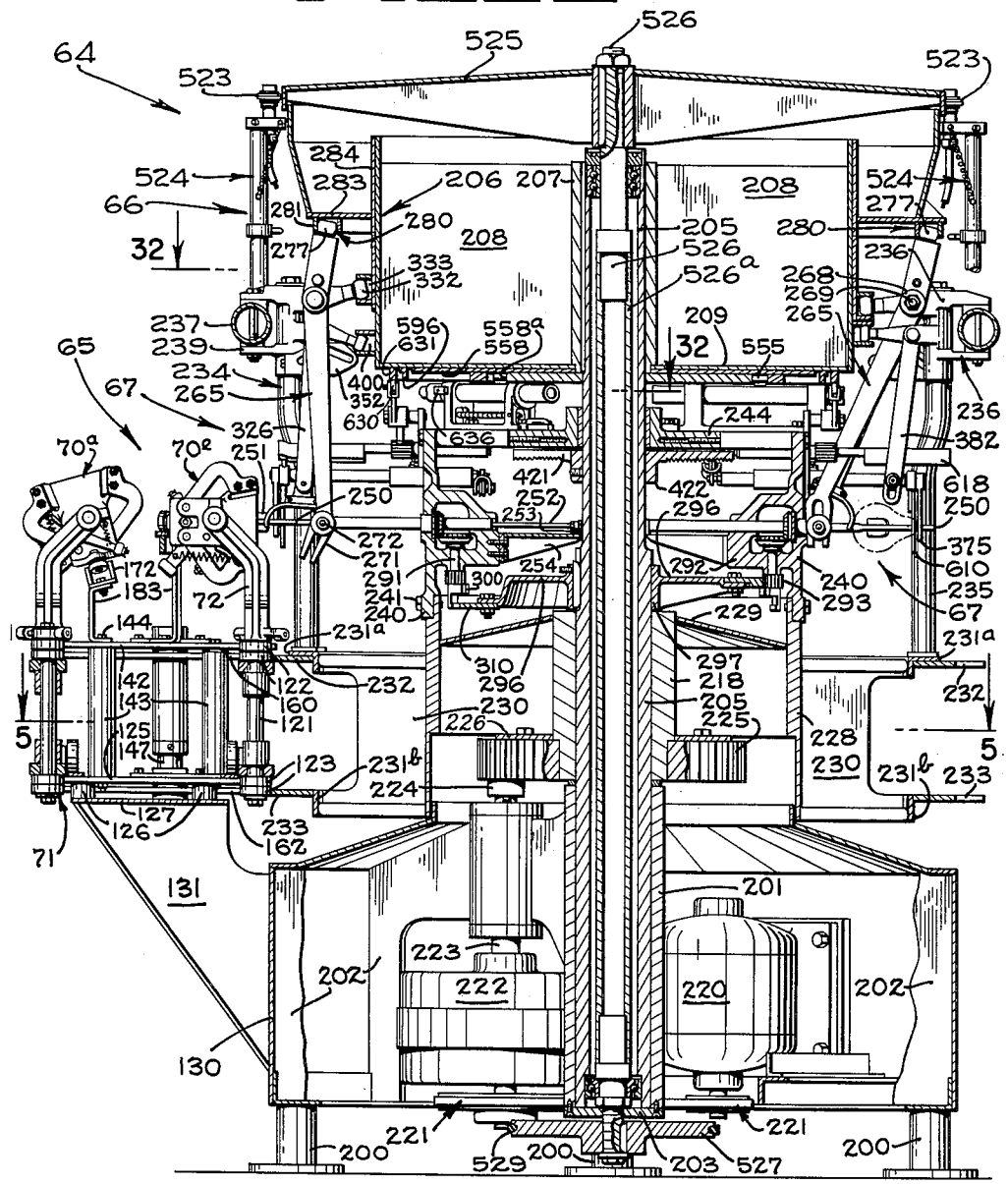

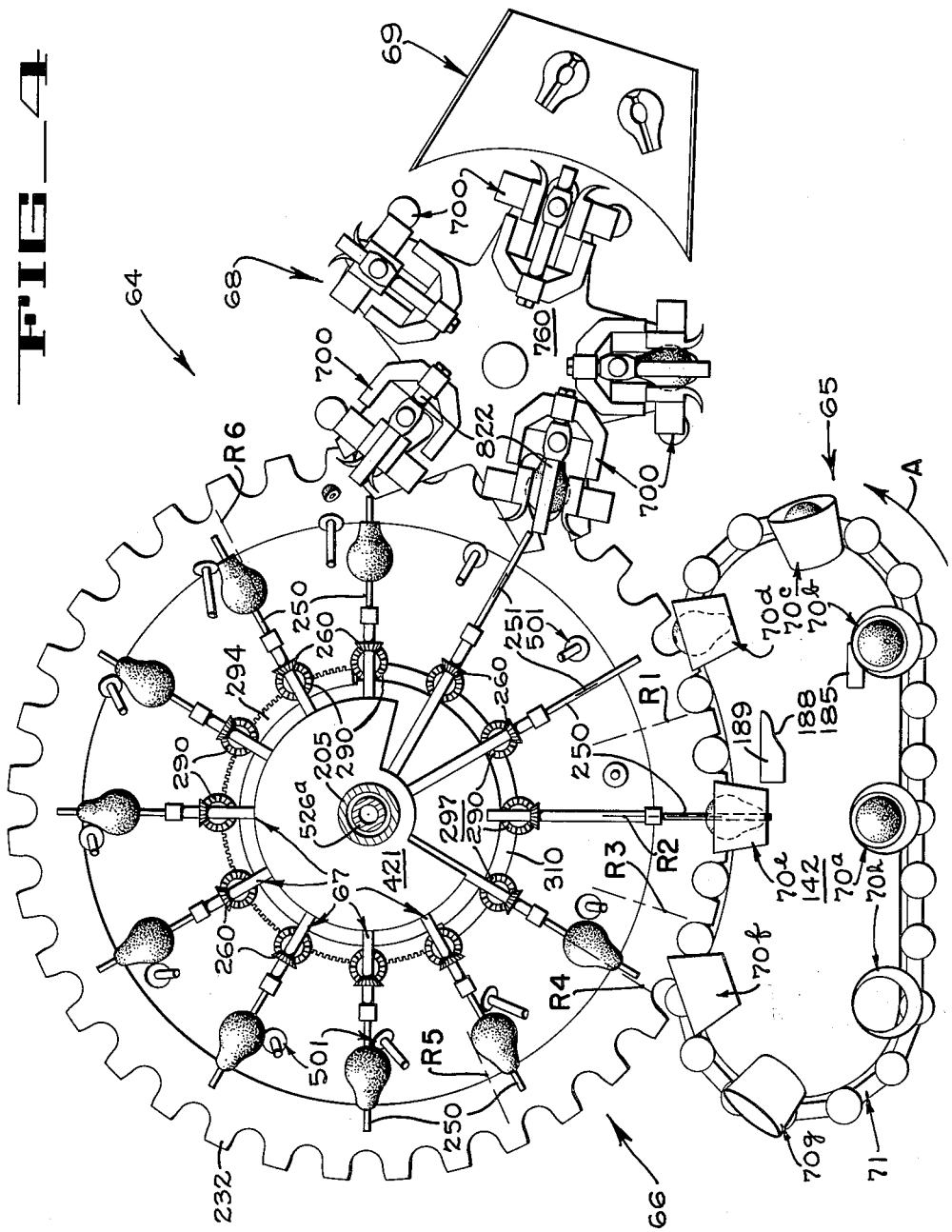

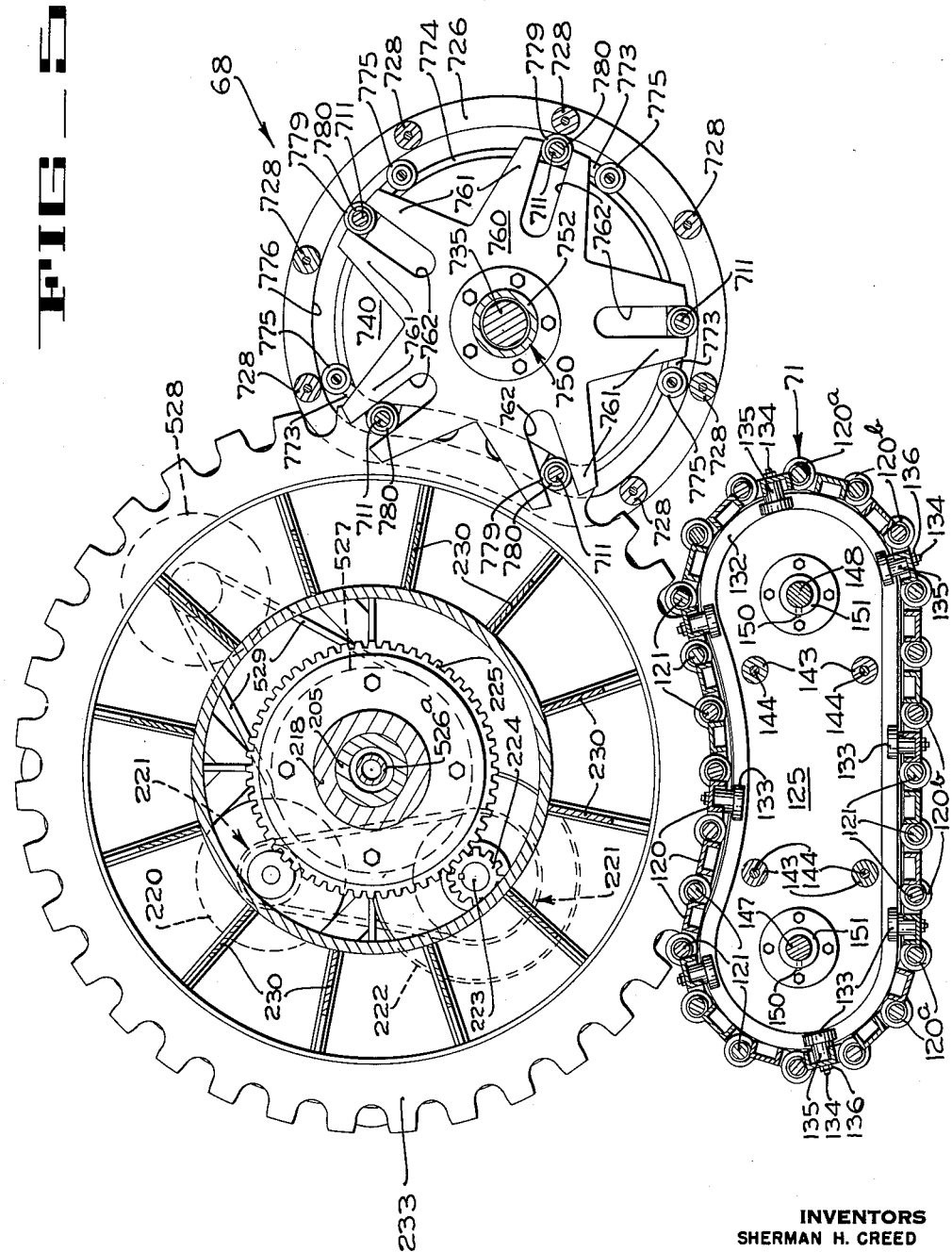

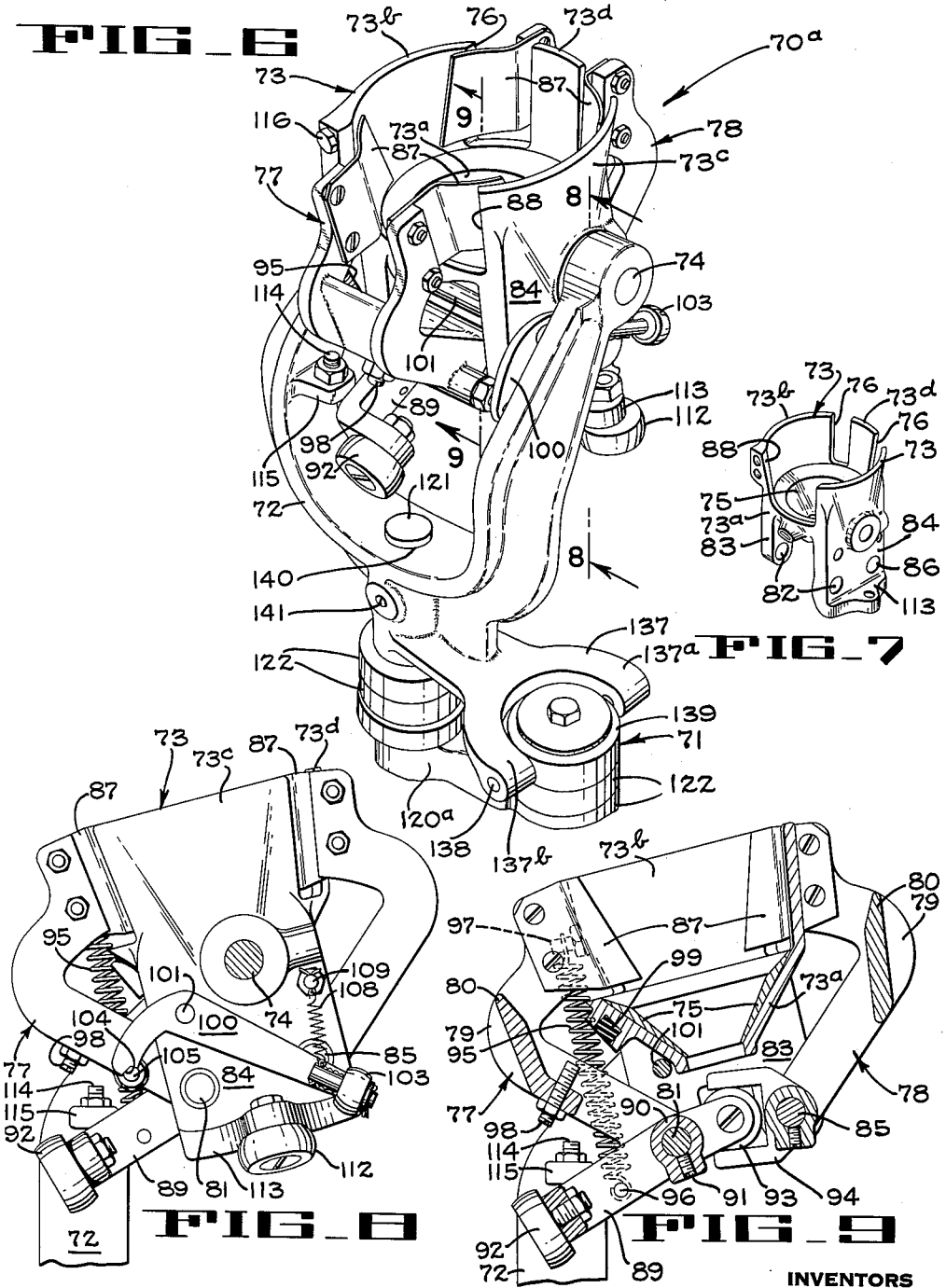

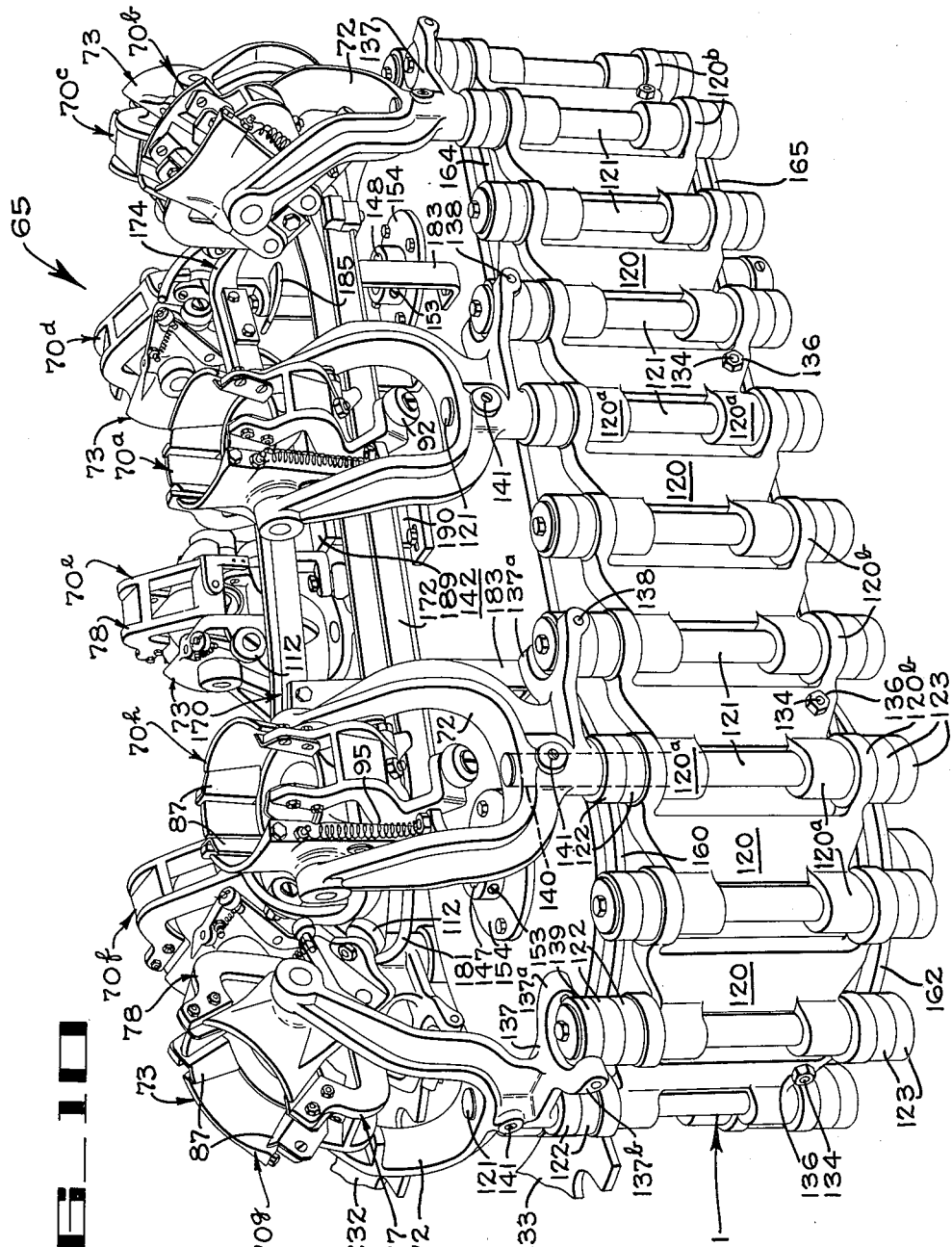
FIG_10

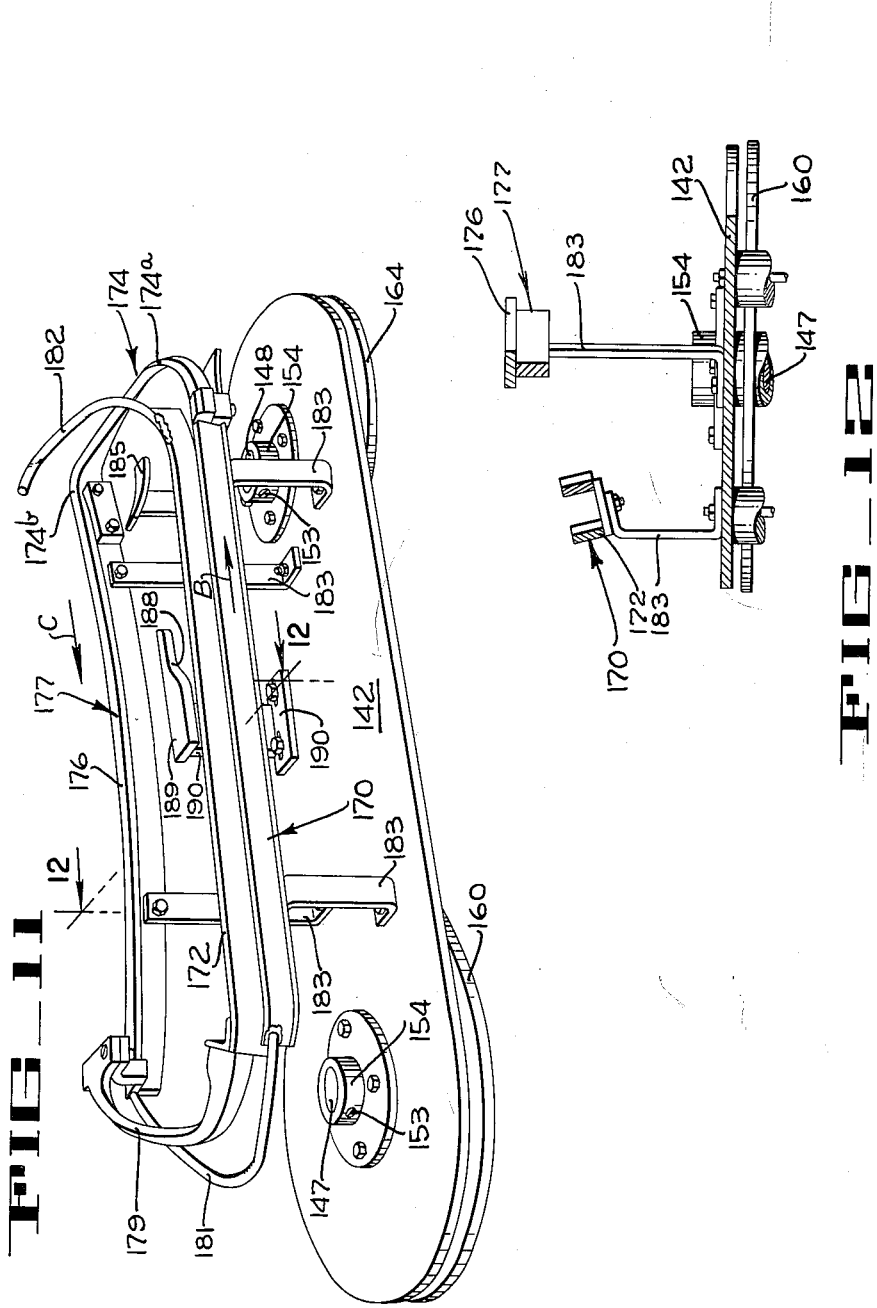

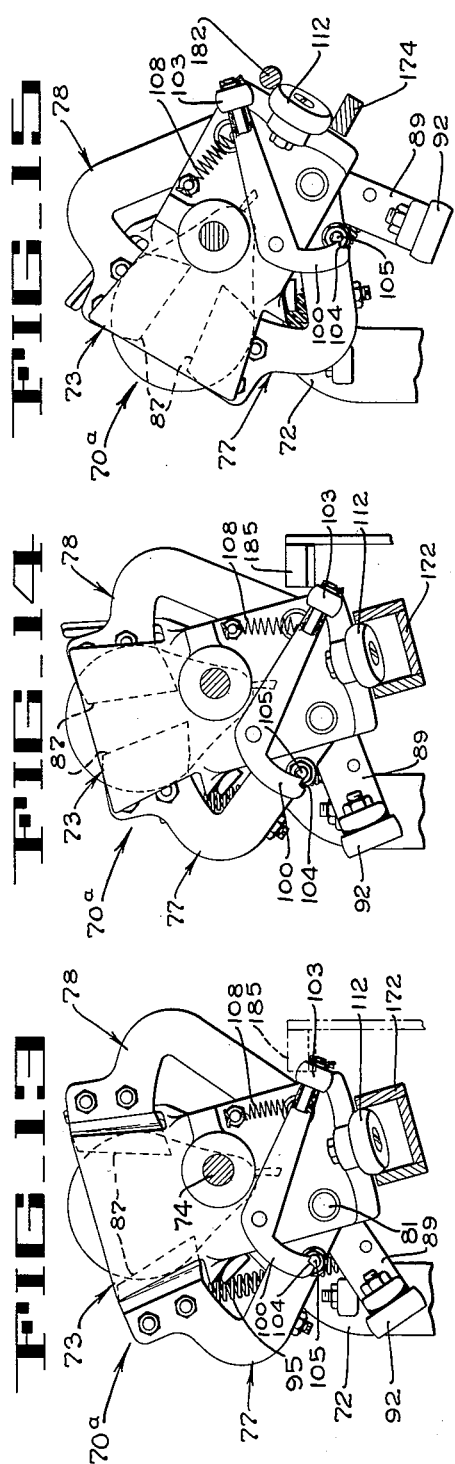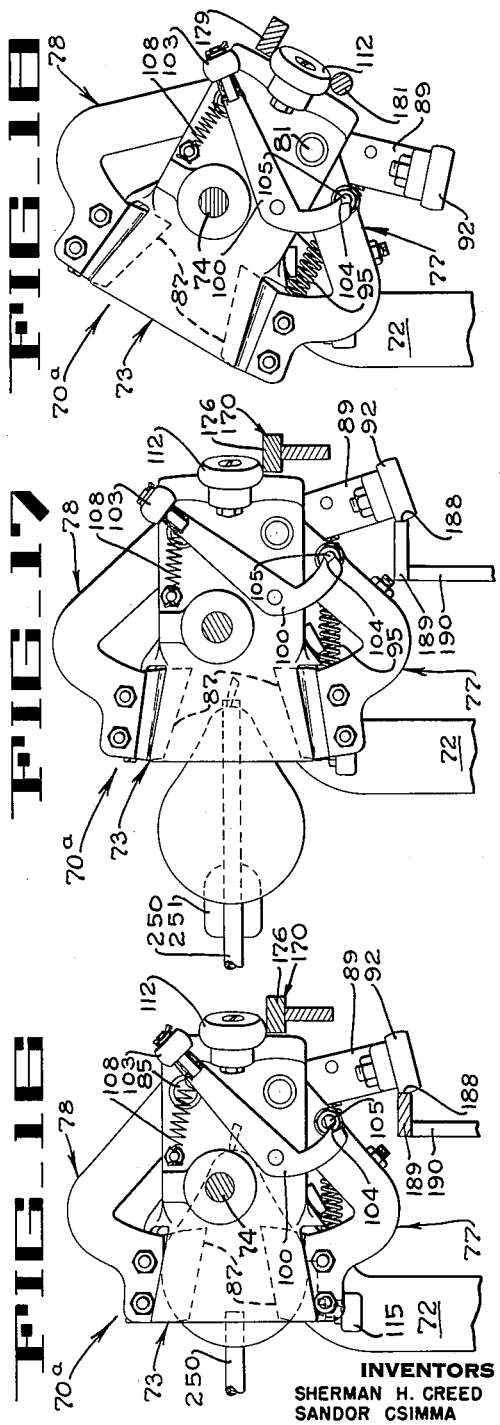

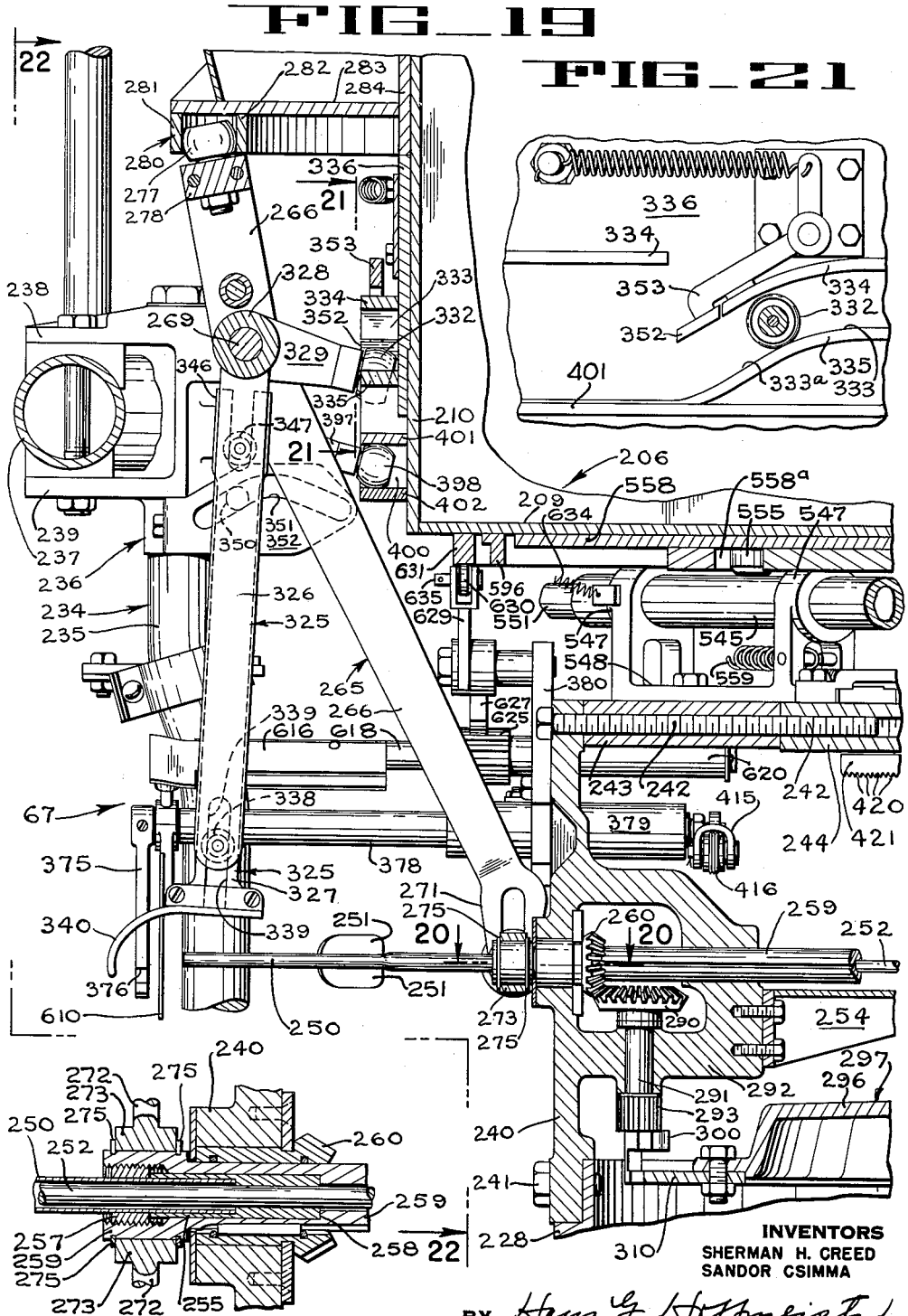

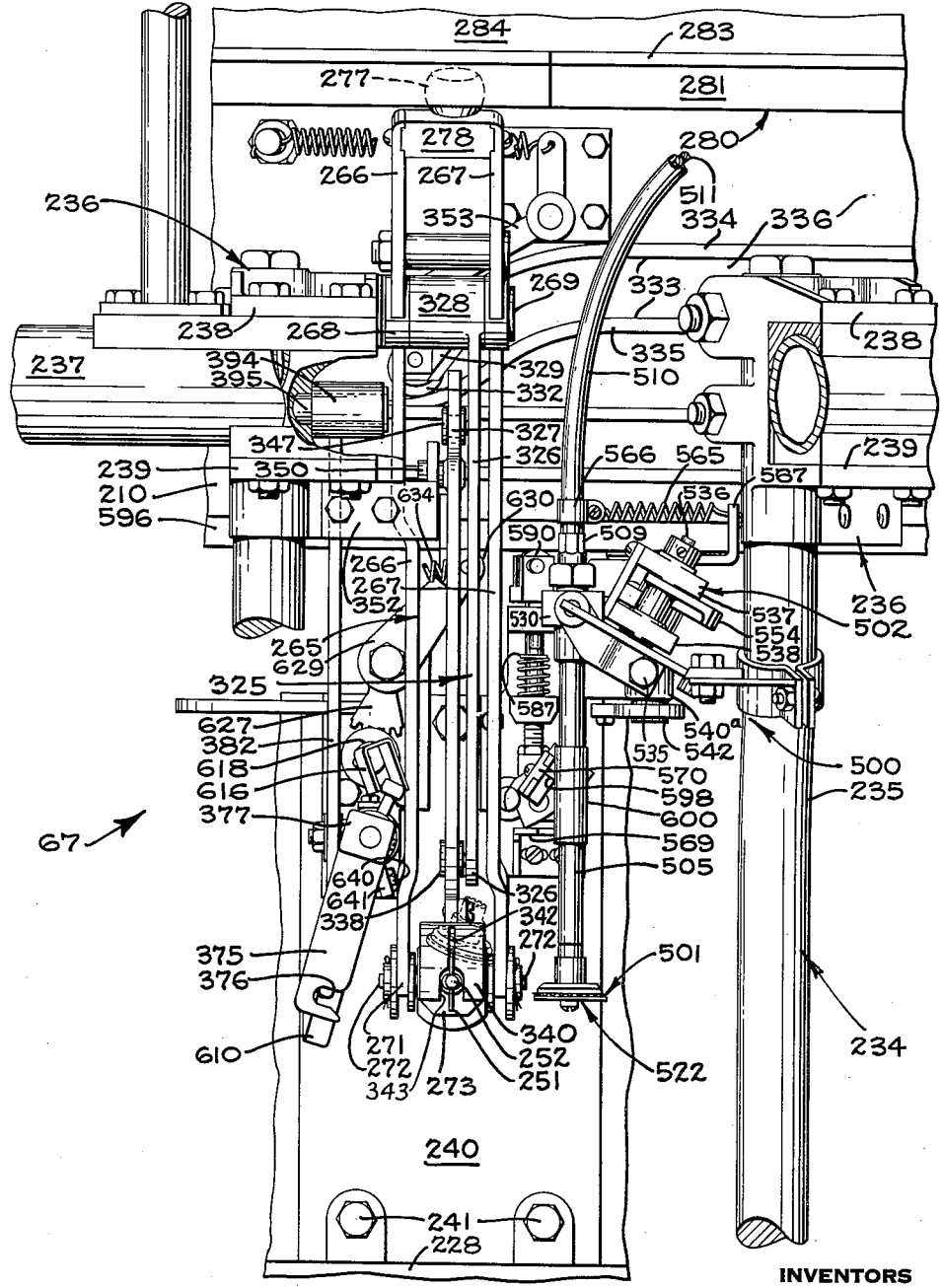

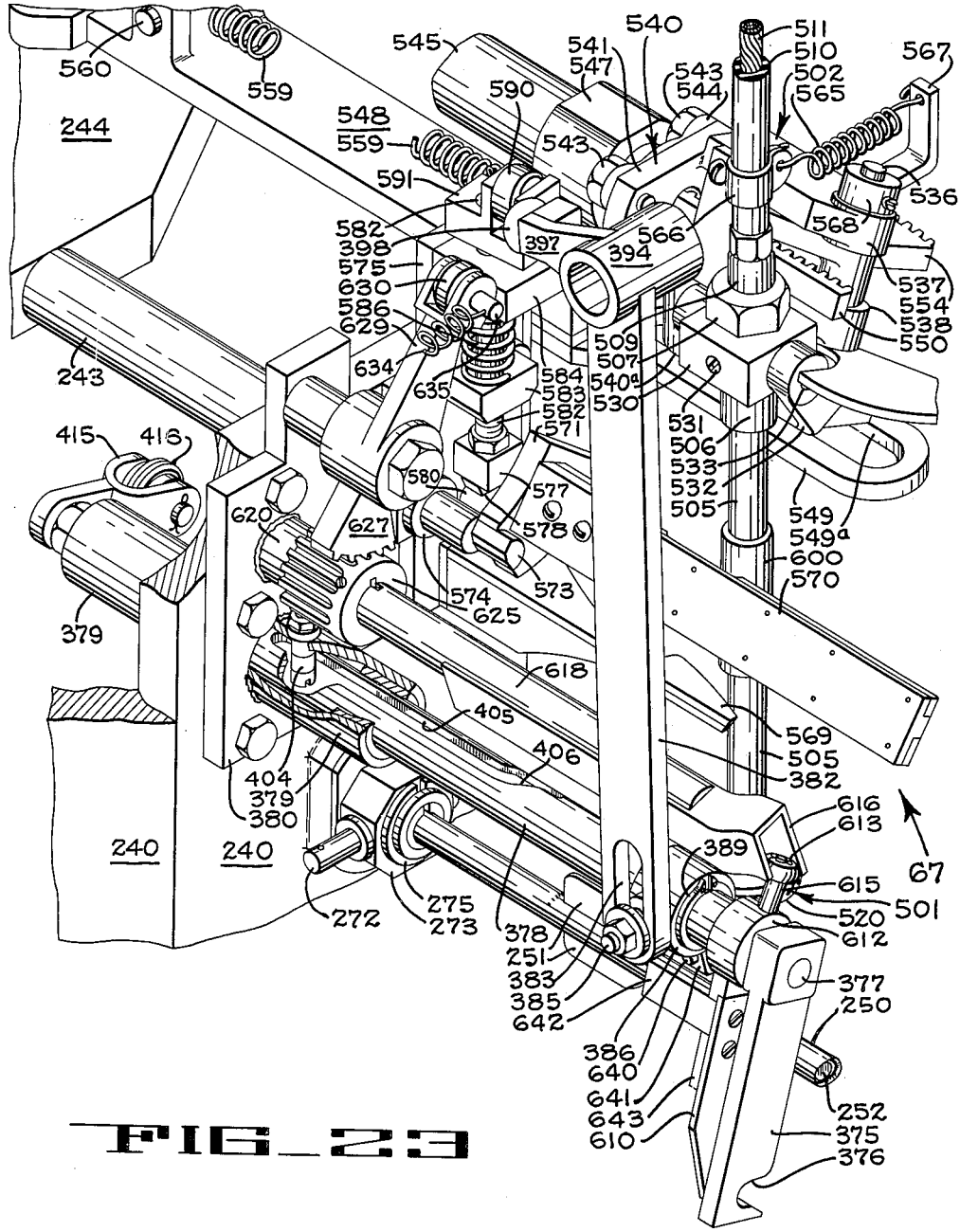

April 11, 1961 S. H. CREED ET AL 2,979,093
PEAR PEELING MACHINE
Filed Nov. 30, 1956 31 Sheets-Sheet 13
FIG_24
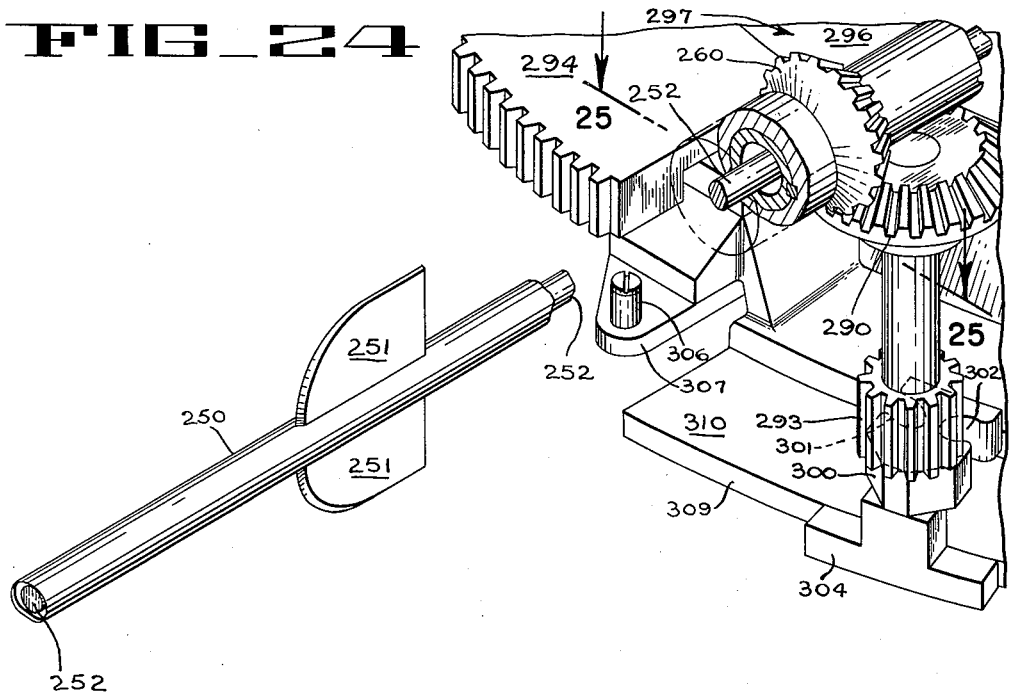
FIG_25
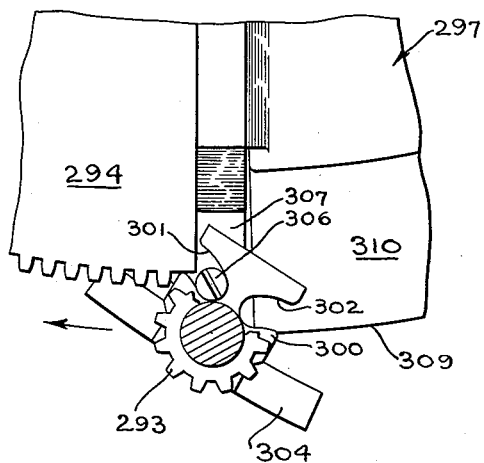
FIG_26
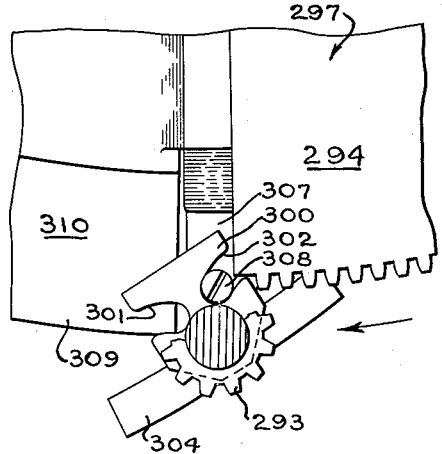
INVENTORS
SHERMAN H. CREED
SANDOR CSIMMA
BY *Hans G. Hoffmeister*
ATTORNEY April 11, 1961 S. H. CREED ET AL 2,979,093
PEAR PEELING MACHINE
Filed Nov. 30, 1956 31 Sheets-Sheet 14
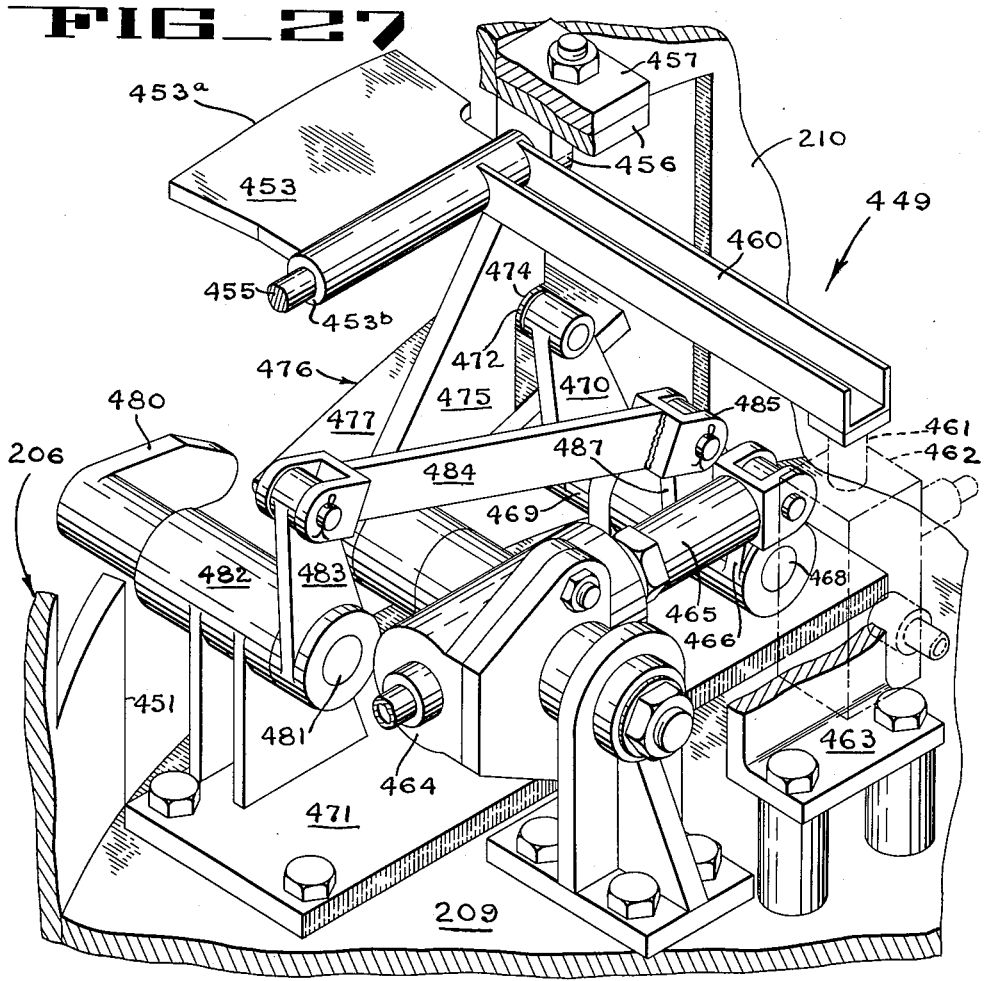
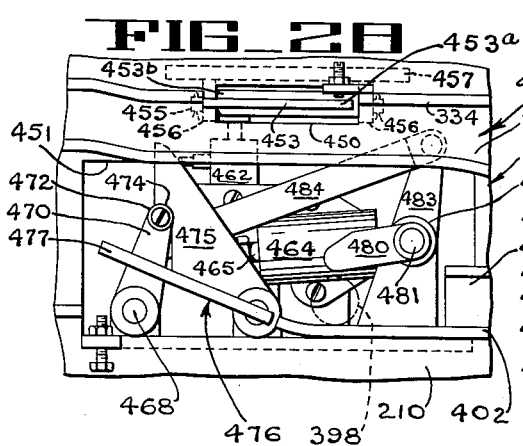
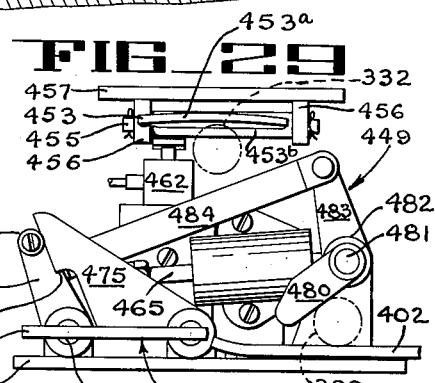
INVENTORS
SHERMAN H. CREED
SANDOR CSIMMA
BY Hans G. Hoffmeister
ATTORNEY

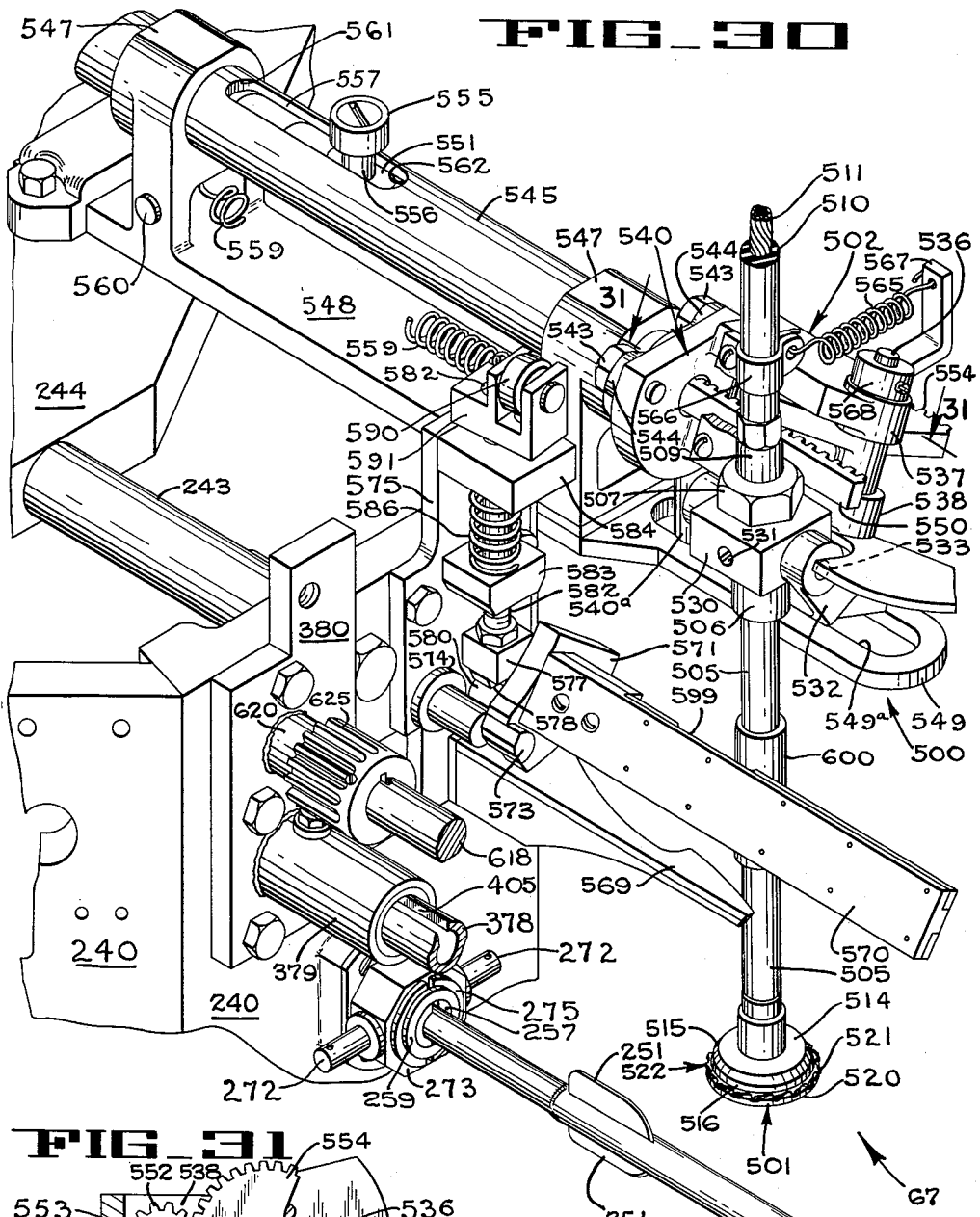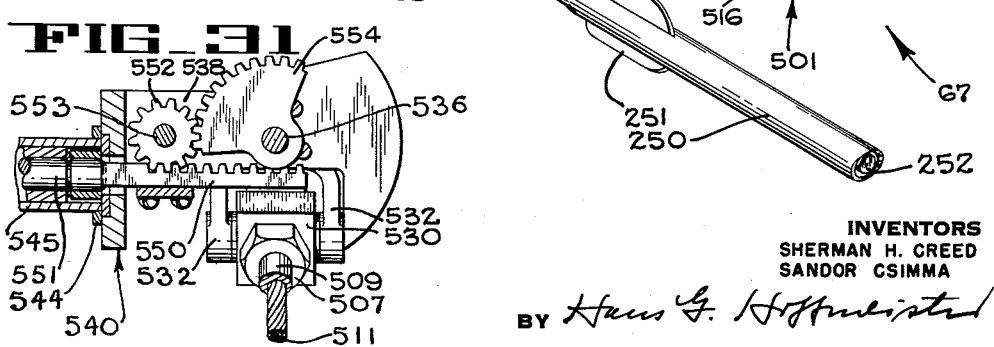

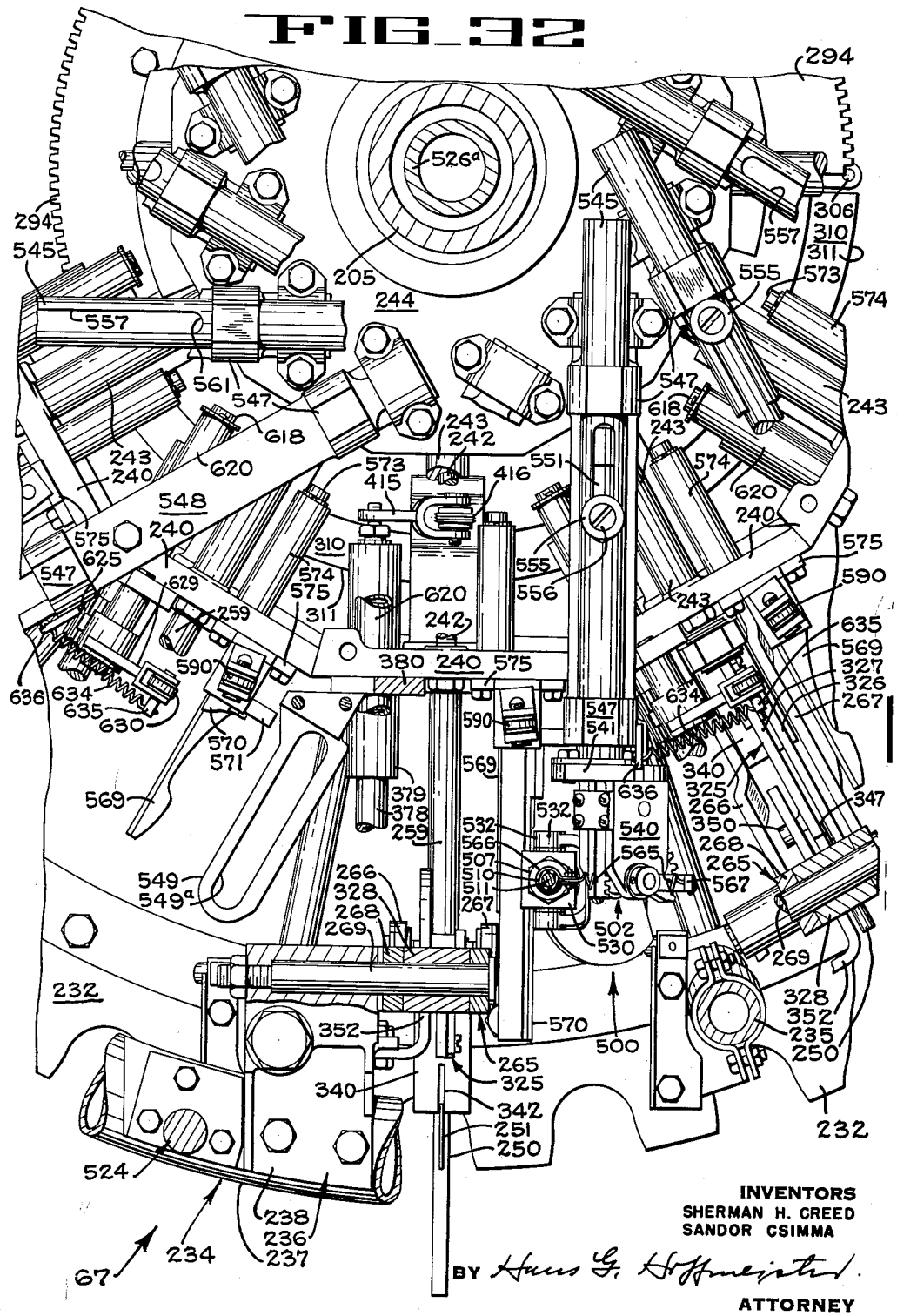

April 11, 1961
S. H. CREED ET AL
2,979,093
PEAR PEELING MACHINE
Filed Nov. 30, 1956
31 Sheets-Sheet 17
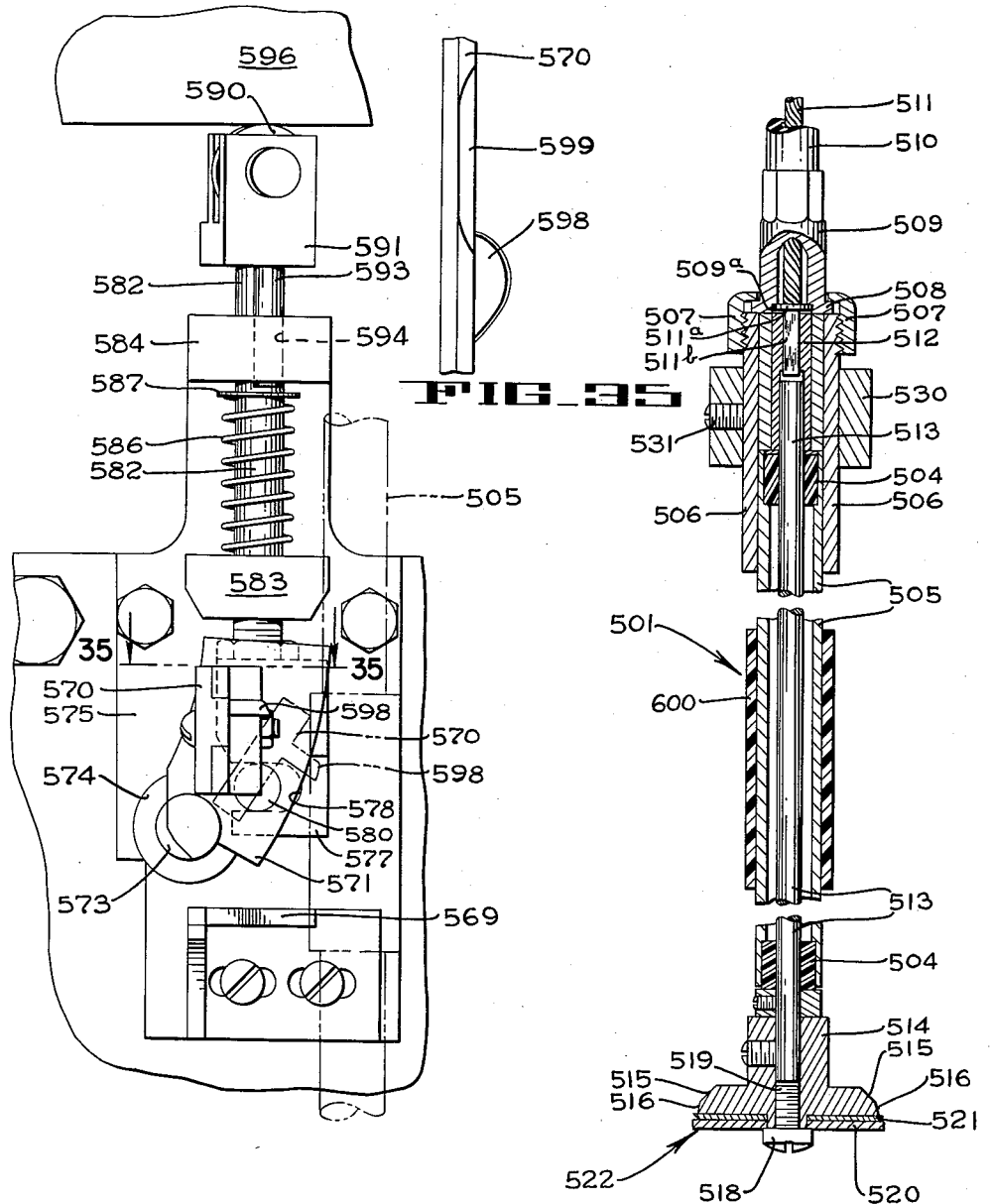
INVENTORS
SHERMAN H. CREED
SANDOR CSIMMA
BY *Hans G. Hoffmeister*
ATTORNEY

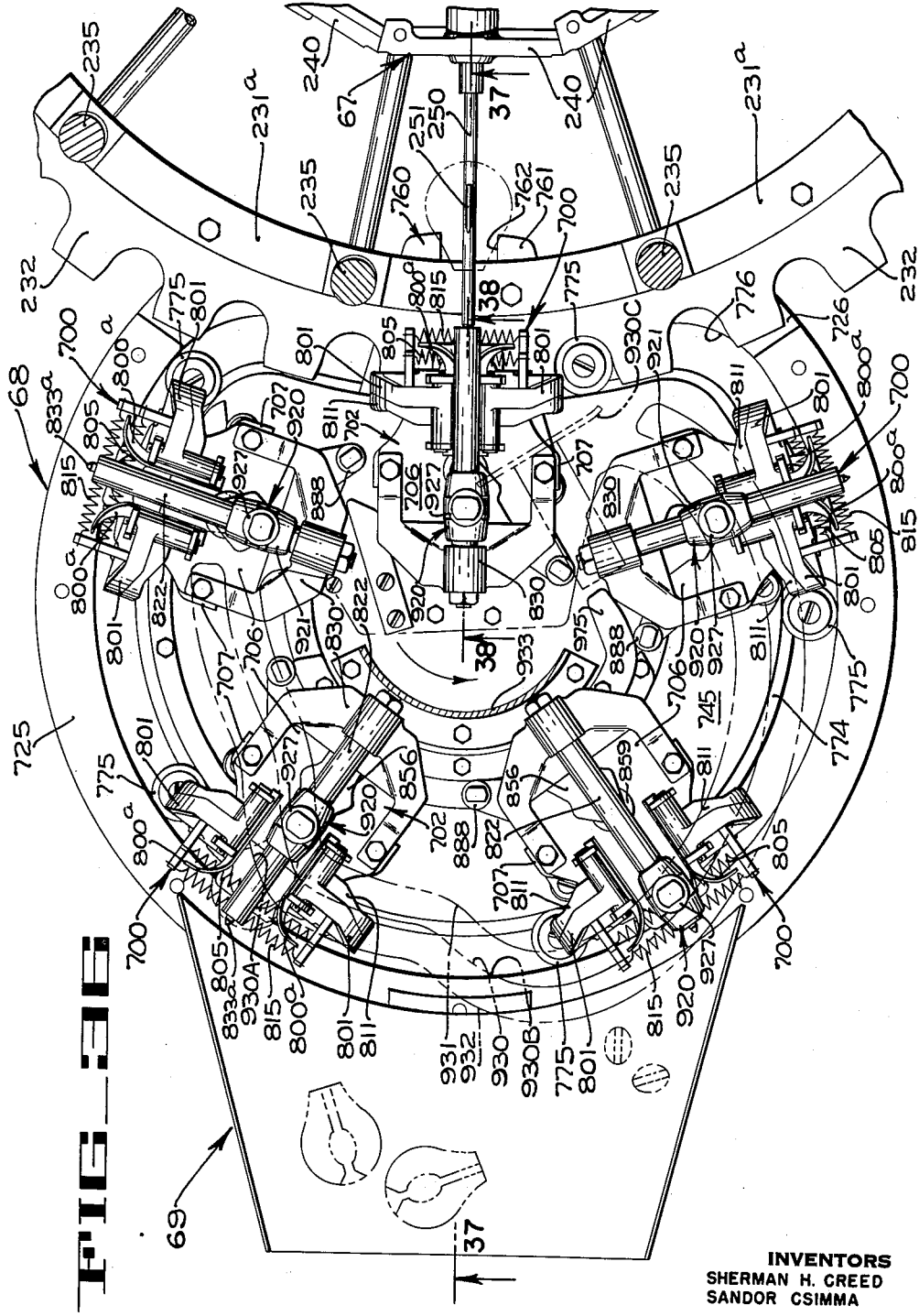

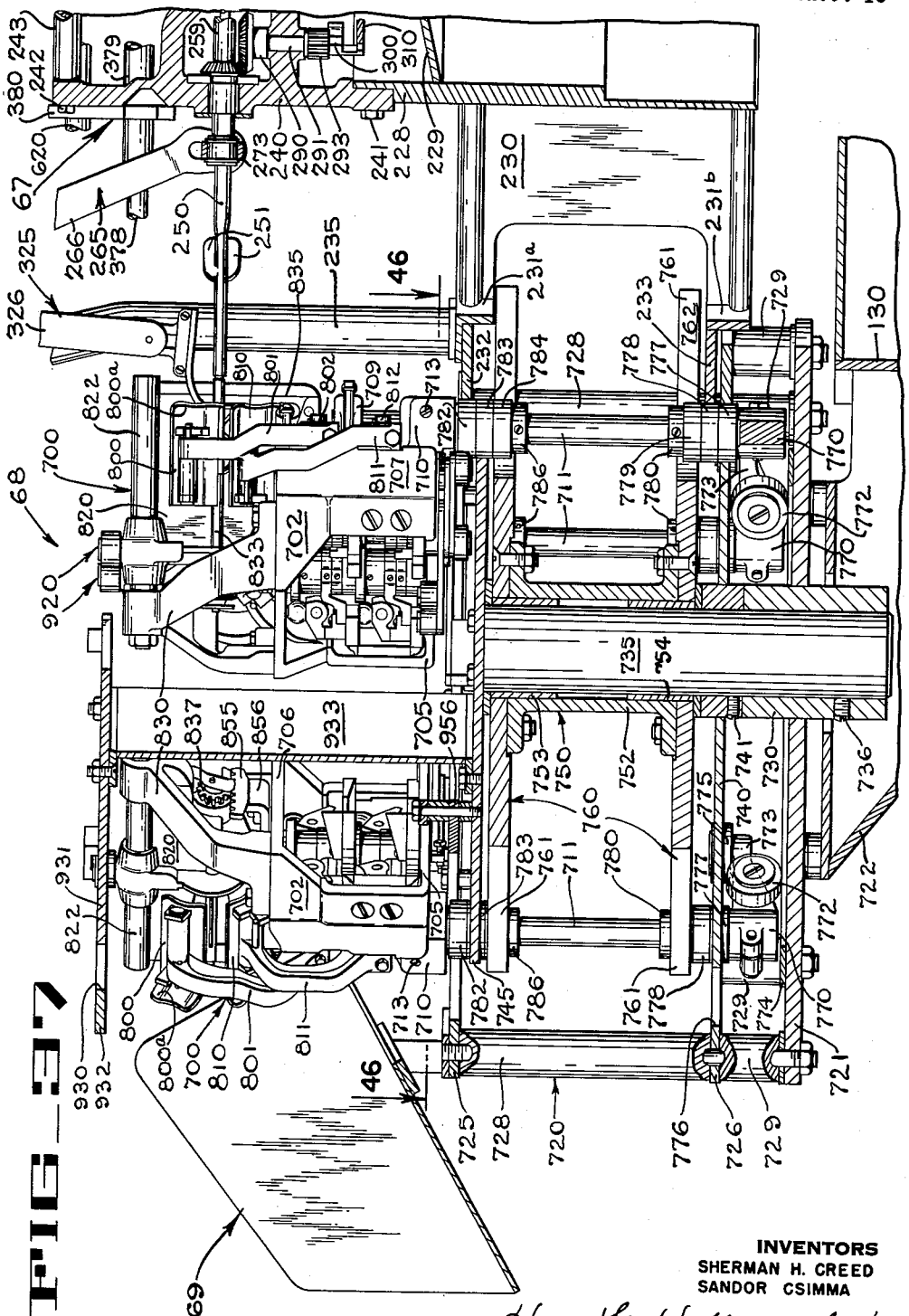

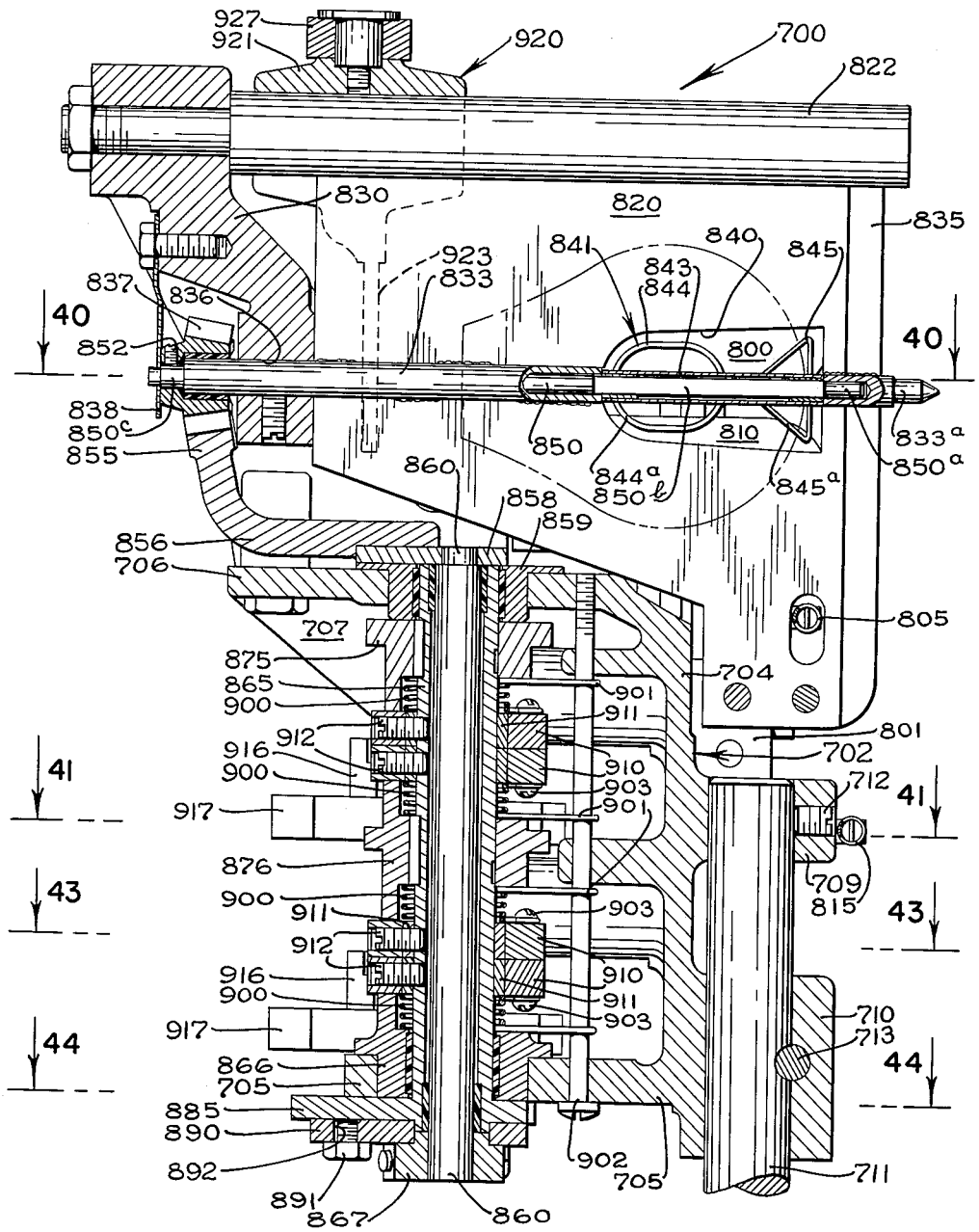

April 11, 1961
S. H. CREED ET AL
2,979,093
PEAR PEELING MACHINE
Filed Nov. 30, 1956
31 Sheets-Sheet 21
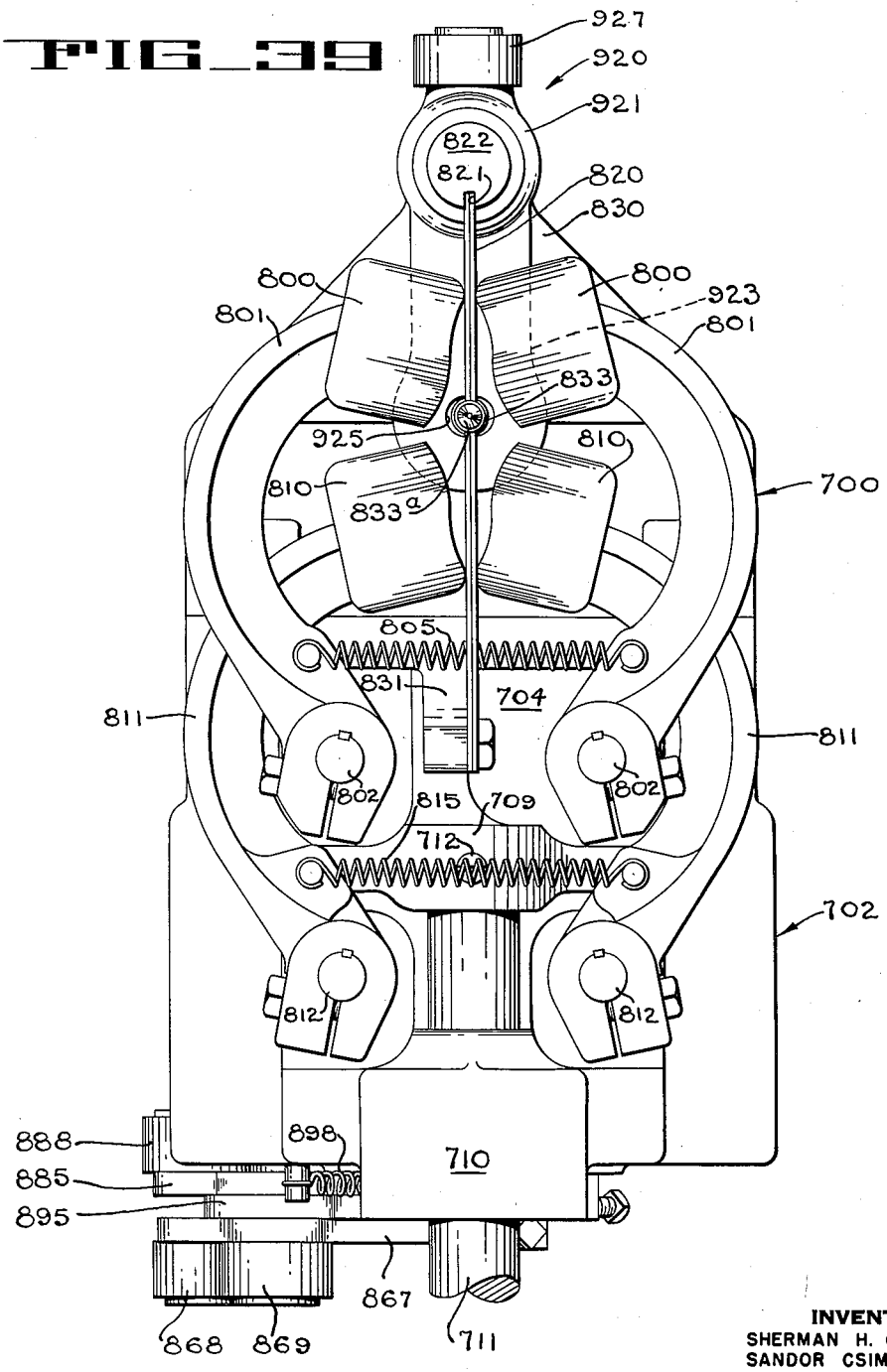
INVENTORS
SHERMAN H. CREED
SANDOR CSIMMA
BY *Hans G. Hoffmeister*
ATTORNEY

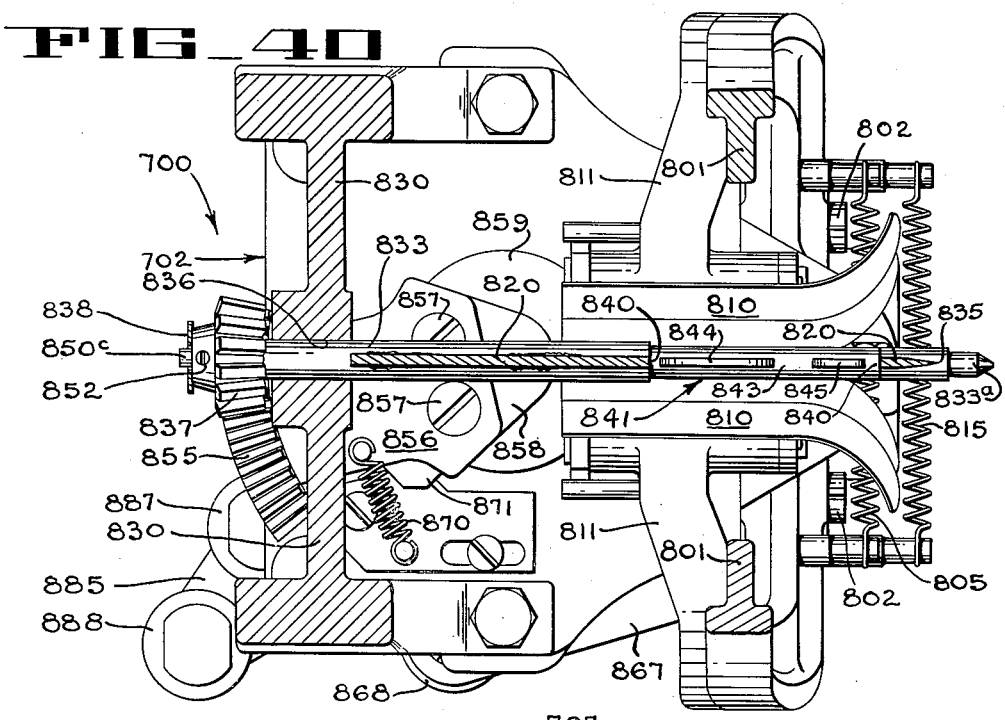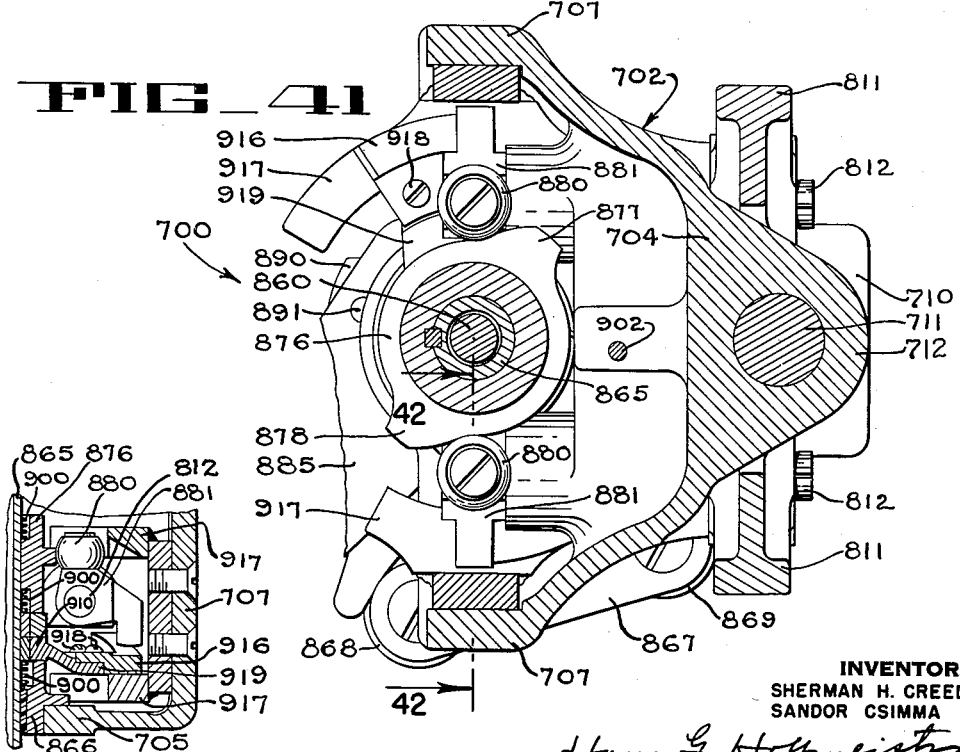

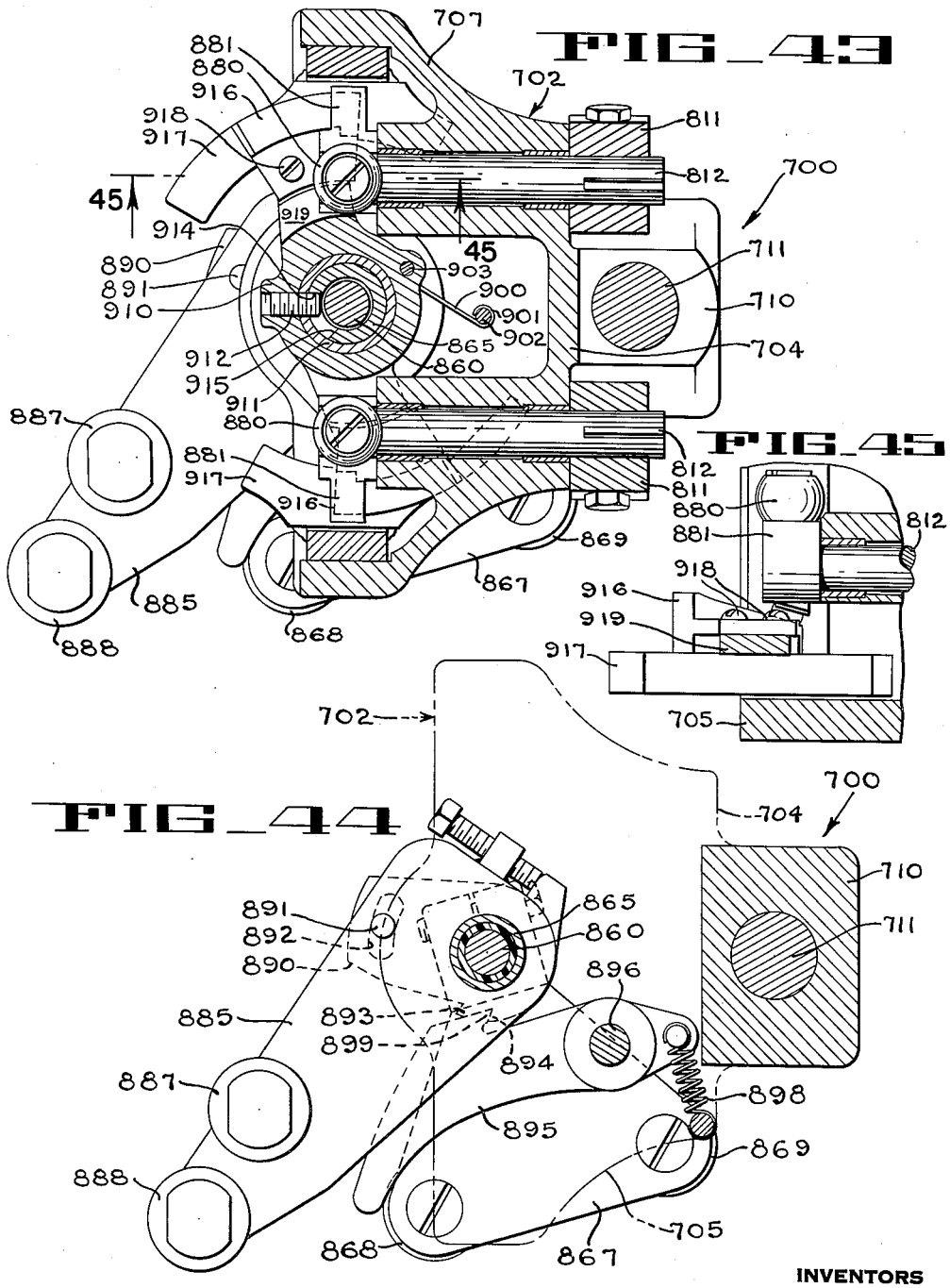

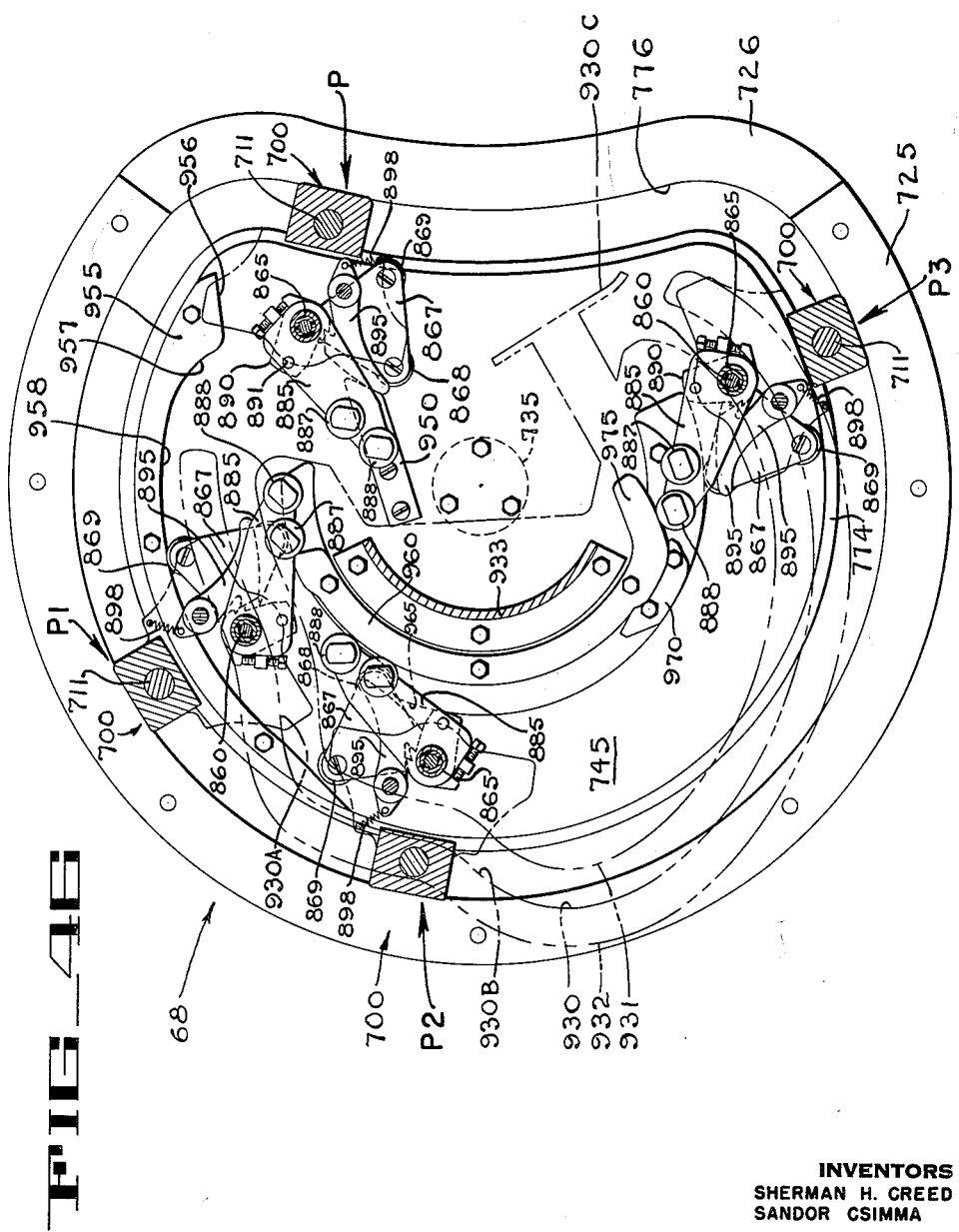

April 11, 1961 S. H. CREED ET AL 2,979,093
PEAR PEELING MACHINE
Filed Nov. 30, 1956 31 Sheets-Sheet 25
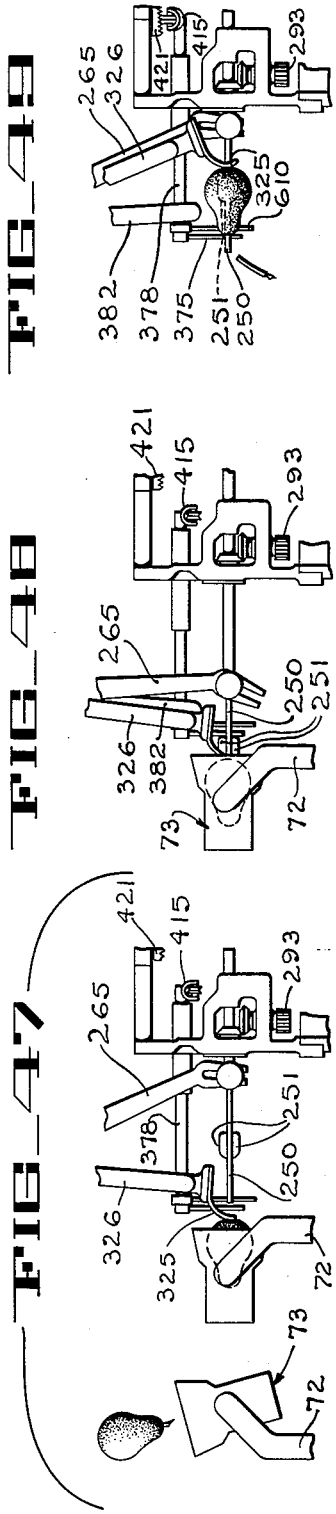
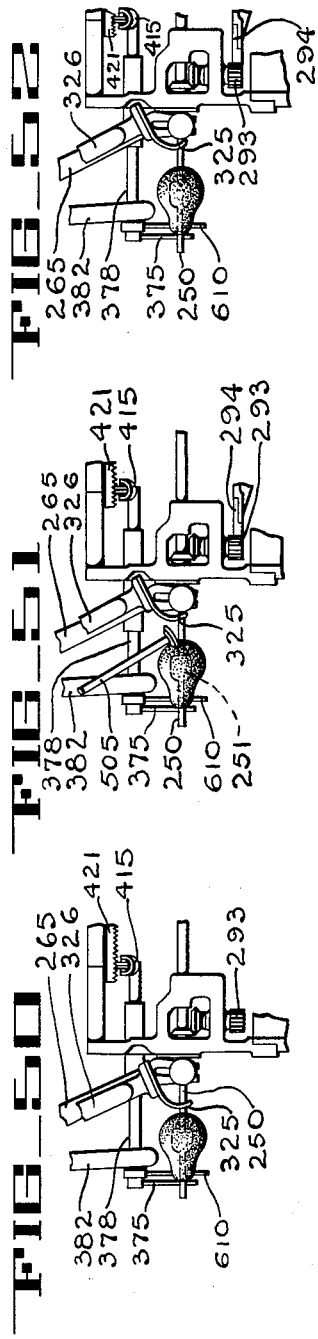
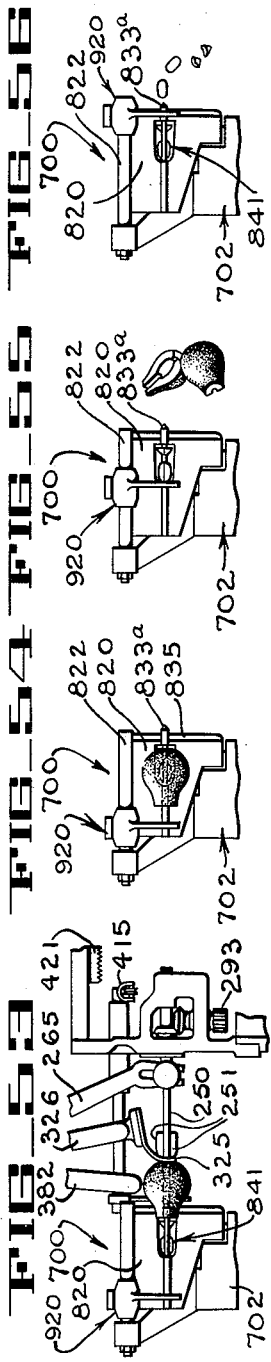
INVENTORS
SHERMAN H. CREED
SANDOR CSIMMA
BY *Hans G. Hofmeister*
ATTORNEY

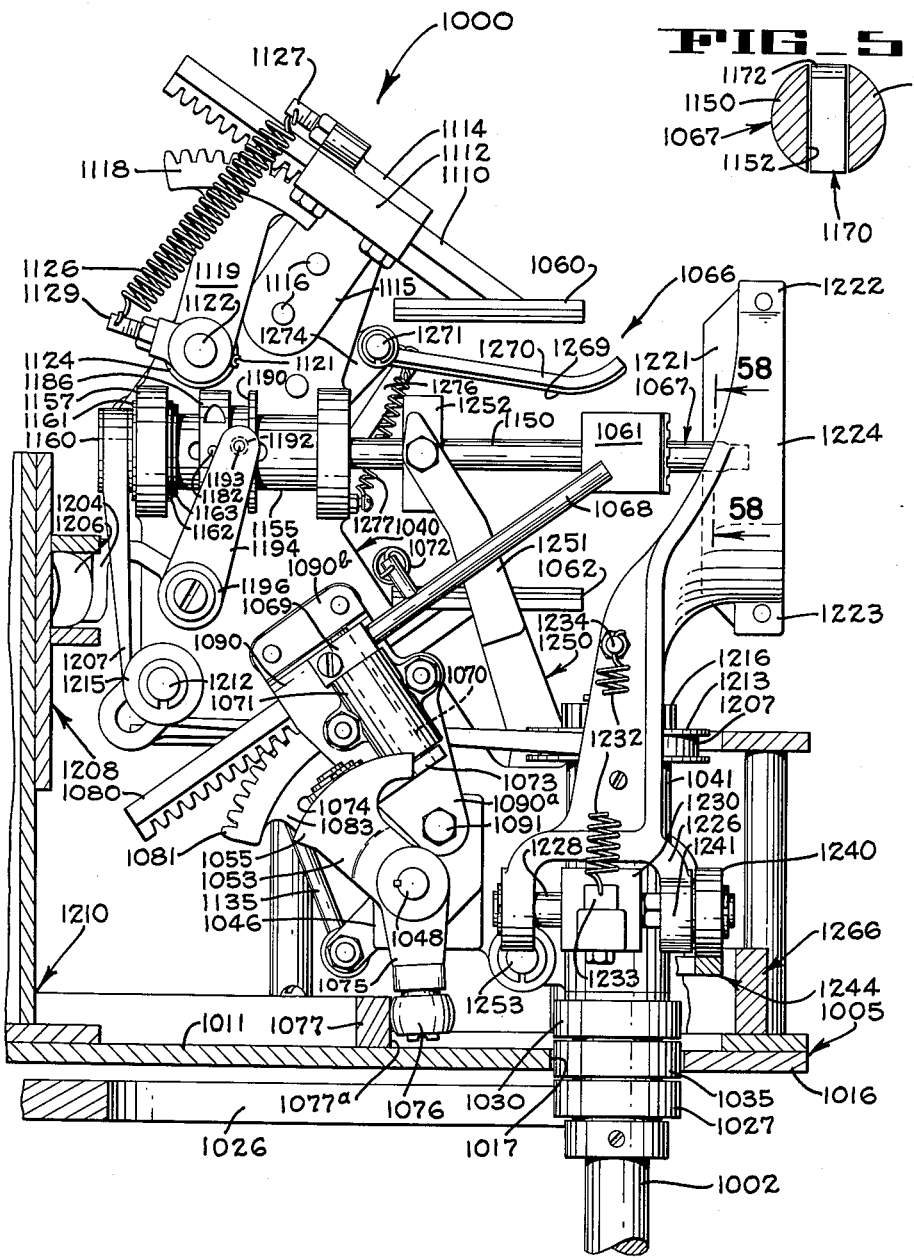
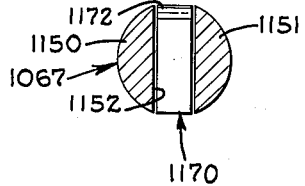

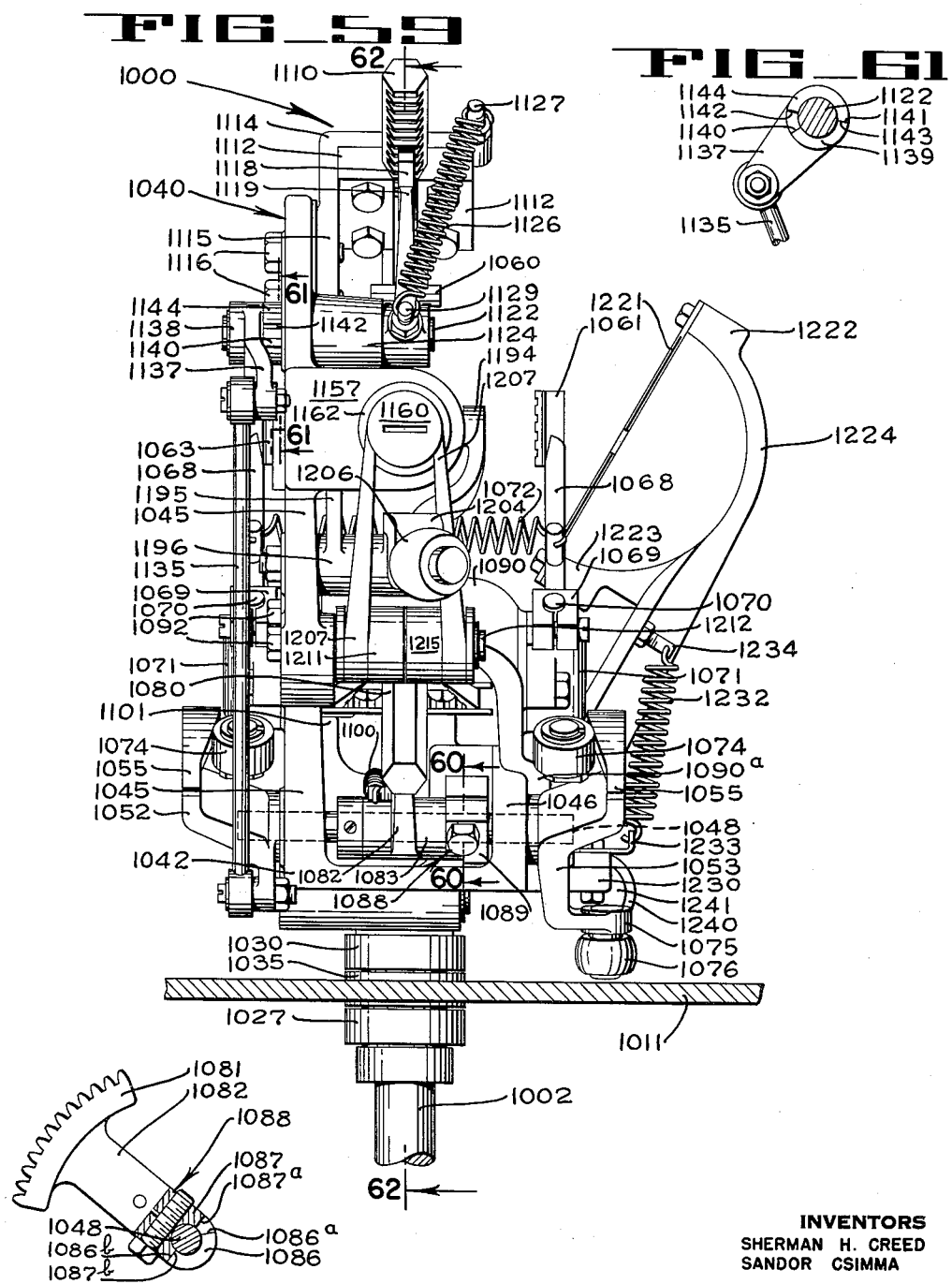

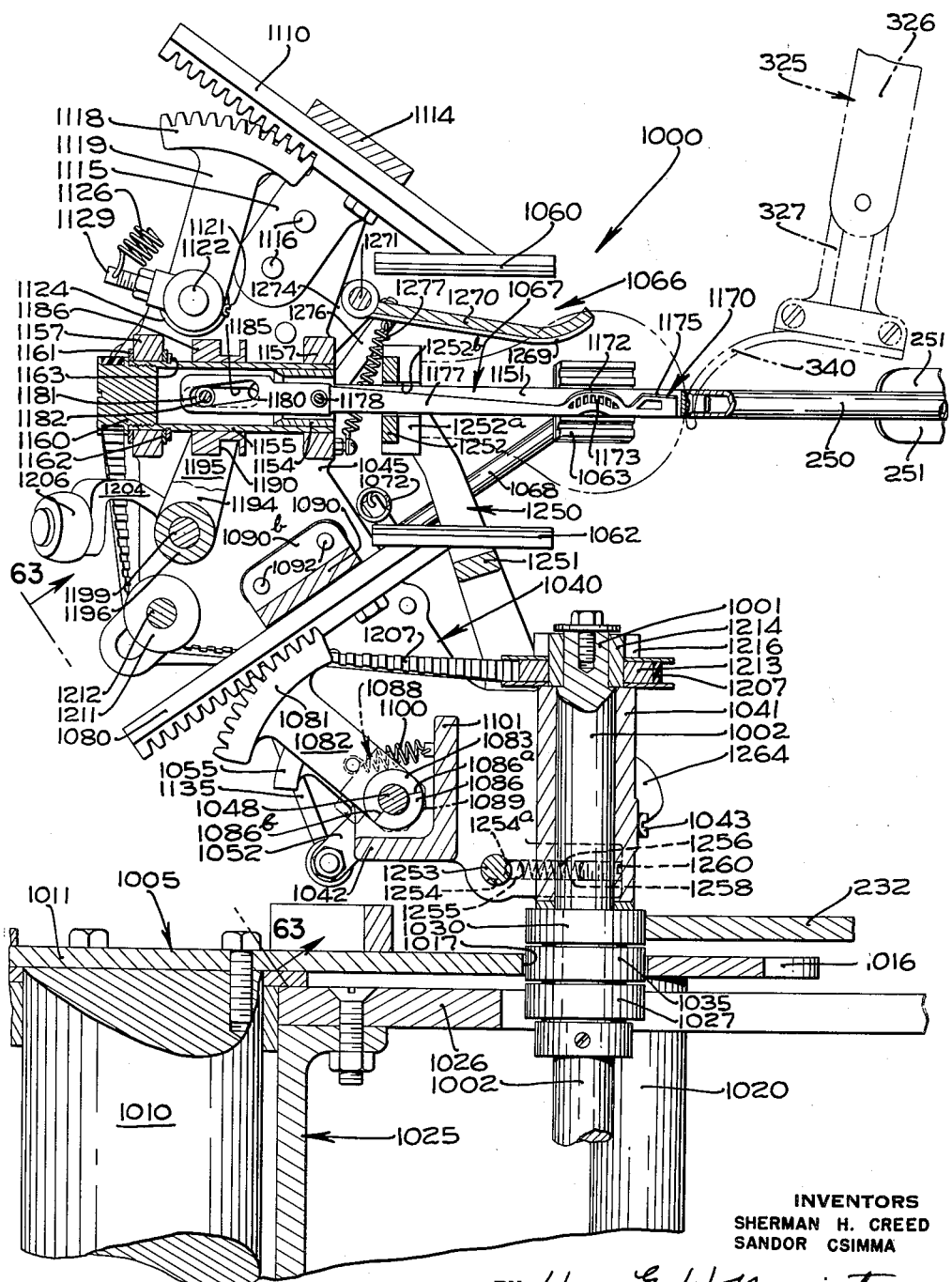

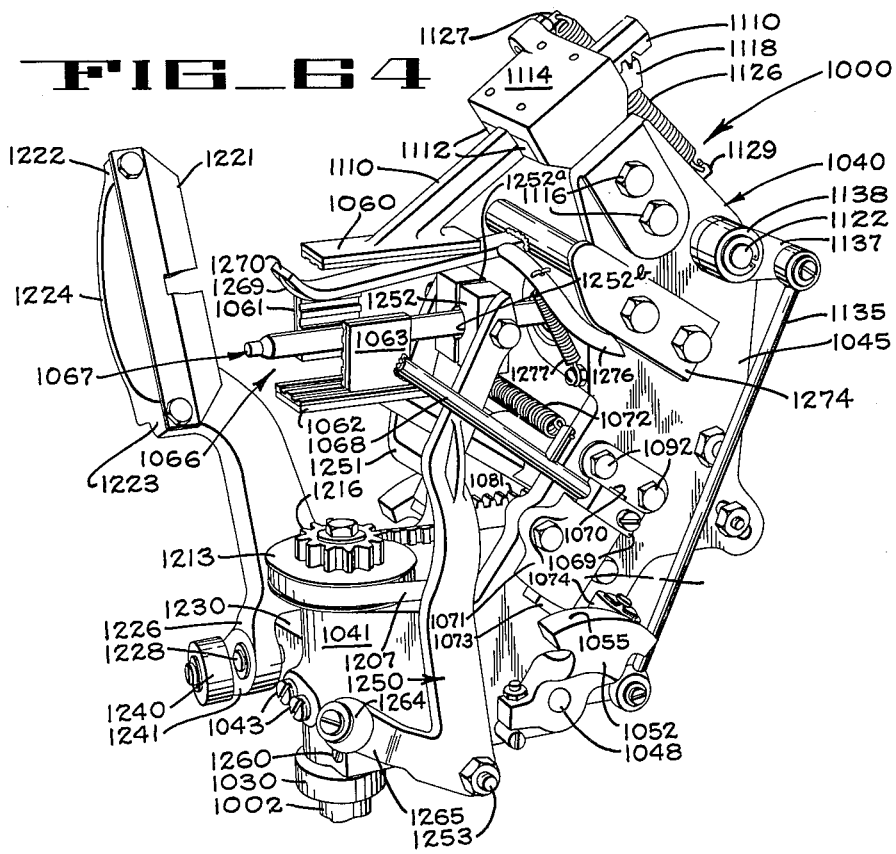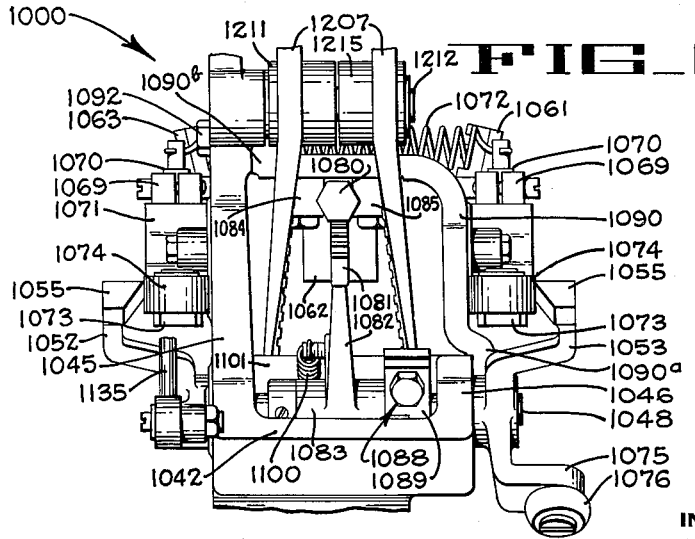

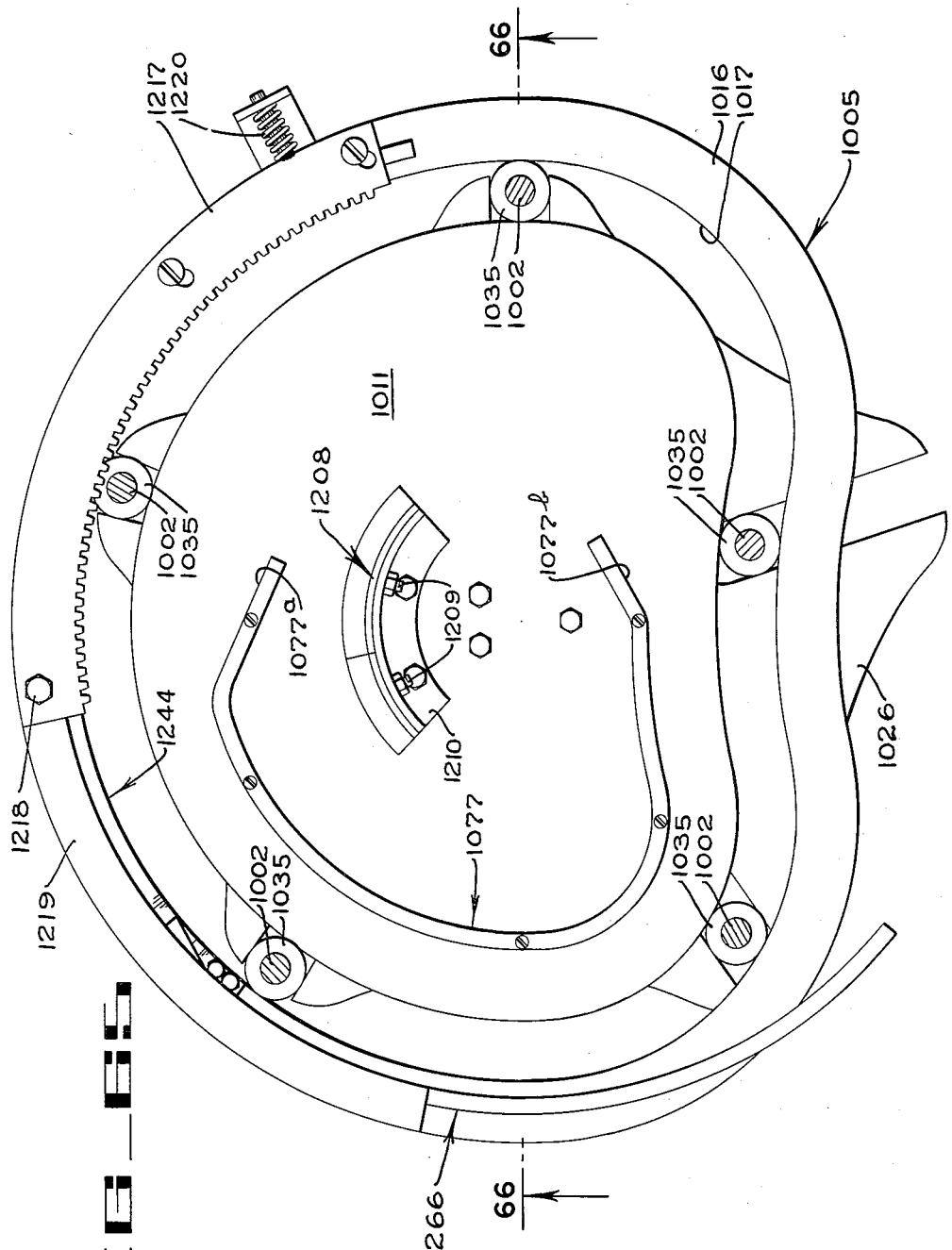

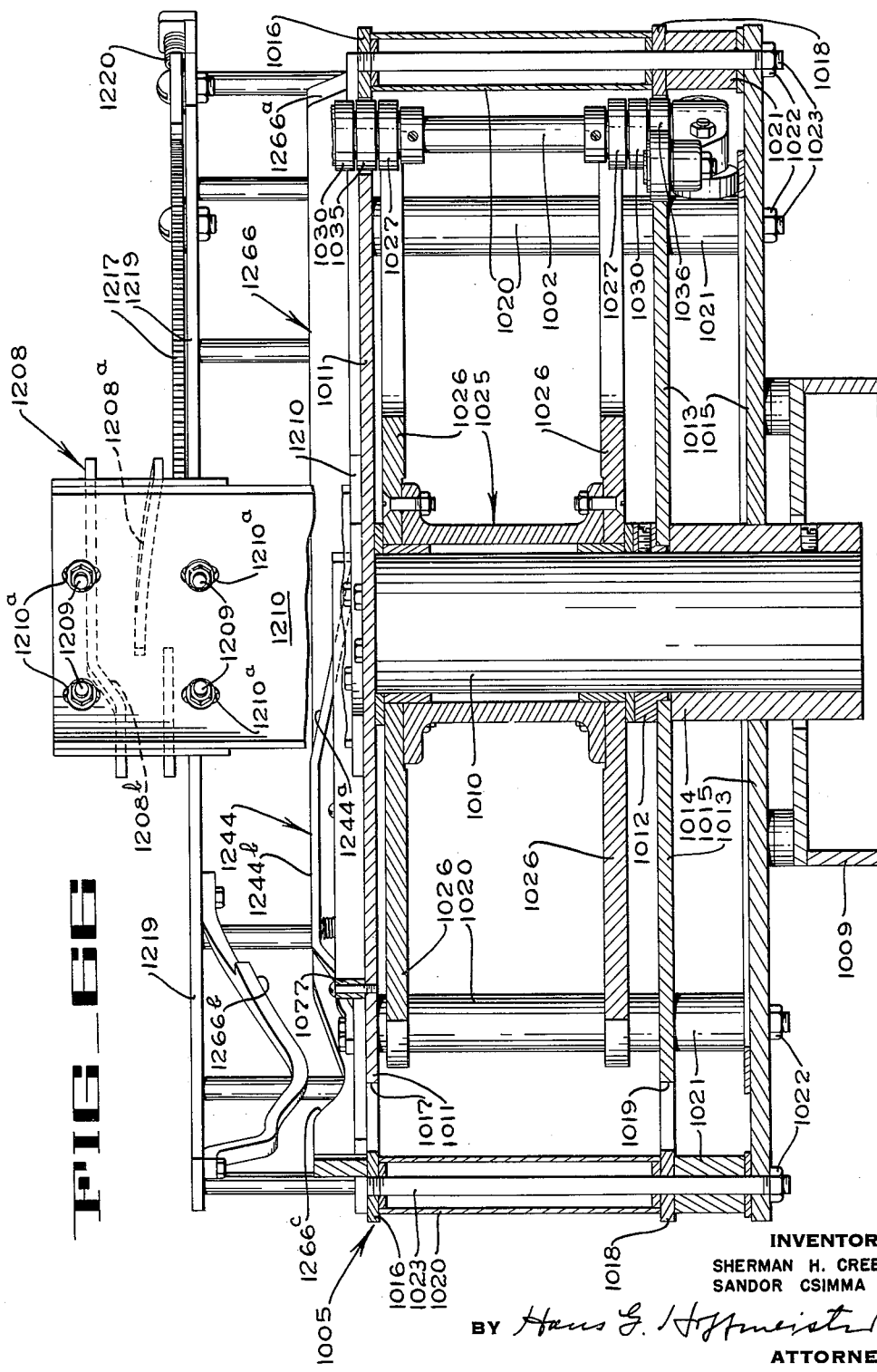

United States Patent Office 2,979,093
Patented Apr. 11, 1961

2,979,093
PEAR PEELING MACHINE

Sherman H. Creed, Campbell, and Sandor Csimma, Sunnyvale, Calif., assignors to Food Machinery and Chemical Corporation, San Jose, Calif., a corporation of Delaware Filed Nov. 30, 1956, Ser. No. 625,368

15 Claims. (Cl. 146—43)

This invention appertains to a fruit handling machine and more particularly relates to a machine for preparing fruit, such as pears, for canning.

An object of this invention is to provide a fruit preparation machine having a feeding mechanism in which the fruit may be easily and efficiently positioned by the operator.

Another object is to provide means for positively seating and centering fruit in a fruit carrier.

Another object is to provide an improved positioning mechanism for seating each fruit on an impaling tube and moving each fruit to a predetermined position adjacent a peeling mechanism.

Another object is to provide improved mechanisms for transferring fruit from one rotary processing unit to another processing unit.

Another object is to provide an efficient mechanism for splitting fruit and holding the split sections while the fruit is cored and trimmed.

Another object is to provide an improved mechanism for applying pressure to clamping members in which fruit is held during processing.

Another object is to provide an improved mechanism for coring a fruit and discharging the core material therefrom.

Another object is to provide an efficient control apparatus for a fruit peeling mechanism.

Another object is to provide an improved mechanism for controlling and synchronizing the various feeding, transferring, peeling, splitting, coring, and trimming operations of a fruit preparation machine.

Another object is to provide an improved fruit splitting, coring and trimming head for a fruit preparation machine.

Another object is to provide an improved coring mechanism for a fruit preparation machine.

Another object is to provide an improved fruit splitting mechanism.

Another object of this invention is to provide a fruit processing machine which may be adapted for carrying out the complete processing of a pear, including coring, peeling, trimming, and splitting operations, or may be arranged to carry out only certain of these operations.

Another object is to provide a fruit preparation machine having means whereby a fruit splitting device may be selectively connected into the operating mechanism or disconnected therefrom.

Other and further objects and advantages of the present invention will become apparent from the following description taken in connection with the accompanying drawings:

Fig. 1 is a perspective of the fruit preparation machine of the present invention.

Fig. 2 is a plan view of the machine of Fig. 1, with a portion broken away.

Fig. 3 is a vertical section taken on line 3—3 of Fig. 2.

Fig. 4 is a diagrammatic plan view of a portion of the operating mechanism of the machine of Fig. 1.

Fig. 5 is a horizontal section taken on line 5—5 of Fig. 3.

Fig. 6 is a perspective of a feed cup used in the feed mechanism of the present invention.

Fig. 7 is a reduced perspective of the main body portion of the feed cup of Fig. 6 shown removed from the feed cup assembly.

Fig. 8 is a vertical section taken on line 8—8 of Fig. 6.

Fig. 9 is a vertical section taken on line 9—9 of Fig. 6.

Fig. 10 is an enlarged perspective of the entire feed mechanism of the machine of Fig. 1, shown as removed from the rest of the machine.

Fig. 11 is a perspective of the upper portion of the feed mechanism of Fig. 10, said upper portion being removed from the rest of the feed mechanism.

Fig. 12 is a vertical section taken on line 12—12 of Fig. 11.

Figs. 13–18, inclusive, are side elevations of one of the fruit feeding cups of the feed mechanism of Fig. 10, showing successive operational positions of the cup.

Fig. 19 is an enlarged fragmentary vertical section taken on line 19—19 of Fig. 2.

Fig. 20 is a sectional view taken on line 20—20 of Fig. 19.

Fig. 21 is a fragmentary vertical section taken on line 21—21 of Fig. 19.

Fig. 22 is an enlarged fragmentary elevation of a portion of the main turret of the machine of Fig. 1 taken in the direction of arrows 22—22 of Fig. 19, particularly showing one of the several processing units on the main turret.

Fig. 23 is a fragmentary perspective of the processing unit shown in Fig. 22, parts being omitted and parts shown in section to fully disclose the operating mechanism.

Fig. 24 is a fragmentary, enlarged perspective of the stemming tube drive mechanism of the machine of Fig. 1.

Fig. 25 is a fragmentary section taken along lines 25—25 of Fig. 24 at the beginning of the gear segment of the stemming tube drive mechanism.

Fig. 26 is a fragmentary sectional view, similar to Fig. 25, but taken at the end of the gear segment of the stemming tube drive mechanism.

Fig. 27 is an enlarged fragmentary perspective of a control mechanism disposed in a drum at the upper end of the fruit preparation machine of Fig. 1.

Fig. 28 is a side elevation taken along lines 28—28 of Fig. 2 showing a portion of the outer wall of the drum and access windows therein.

Fig. 29 is a fragmentary side elevation similar to Fig. 28 but showing another operational view of the mechanism, the wall of the drum being omitted for clarity.

Fig. 30 is an enlarged fragmentary perspective, similar to Fig. 23, of the processing unit shown in Fig. 23 with parts being omitted.

Fig. 31 is a sectional view taken on line 31—31 of Fig. 30.

Fig. 32 is an enlarged fragmentary horizontal section taken along line 32—32 of Fig. 3 with parts broken away, parts in section, and parts omitted to more clearly show the internal operating mechanisms of the machine.

Fig. 33 is an enlarged longitudinal sectional view taken centrally through the peeling cutter assembly used in the machine of the present invention.

Fig. 34 is a fragmentary side elevation of a cutter retracting mechanism.

Fig. 35 is a fragmentary plan view of the retractor bar of Fig. 34, the view being taken along lines 35—35 of Fig. 34.

Fig. 36 is a plan view, with parts in section, of the splitting, coring and stemming turret of the present machine with portions of the main turret shown in section.

Fig. 37 is a vertical section taken along line 37—37 of Fig. 36.

Fig. 38 is an enlarged vertical section taken along line 38—38 of Fig. 36.

Fig. 39 is a front elevation of a splitting, coring and stemming unit used in the turret of Fig. 36.

Fig. 40 is a horizontal section taken on line 40—40 of Fig. 38.

Fig. 41 is a fragmentary horizontal section taken on line 41—41 of Fig. 38.

Fig. 42 is a fragmentary vertical section taken on line 42—42 of Fig. 41.

Fig. 43 is a horizontal section taken on line 43—43 of Fig. 38.

Fig. 44 is a horizontal section taken on line 44—44 of Fig. 38.

Fig. 45 is a fragmentary vertical section taken on line 45—45 of Fig. 43.

Fig. 46 is a horizontal section taken on line 46—46 of Fig. 37 particularly showing the control cam plate used with the stemming and coring mechanism of the present invention.

Figs. 47–56, inclusive, are schematic operational views of the operating mechanisms of the present fruit preparation machine showing the processing of a pear from the feeding operation of Fig. 47 to the discharge operation of Fig. 56.

Fig. 57 is a side elevation of a second embodiment of the splitting, coring and trimming head of the present invention.

Fig. 58 is a vertical section taken on line 58—58 of Fig. 57.

Fig. 59 is an end elevation of the head of Fig. 57.

Fig. 60 is a fragmentary vertical section taken on line 60—60 of Fig. 59.

Fig. 61 is a fragmentary vertical section taken on line 61—61 of Fig. 59.

Fig. 62 is a vertical section taken on line 62—62 of Fig. 59.

Fig. 63 is a fragmentary elevation taken looking in the direction of arrows 63—63 of Fig. 62.

Fig. 64 is a perspective of the head of Fig. 57.

Fig. 65 is a plan view, with parts in section, of the support structure along which the head of Fig. 57 is moved, particularly showing the cam mechanism.

Fig. 66 is a fragmentary vertical section taken on line 66—66 of Fig. 65.

The rotary pear processing machine of the present invention is indicated generally in Figs. 1, 2 and 3 by the reference numeral 64 and comprises a pear feed mechanism 65, a rotary main turret 66 which carries a plurality of peeling, coring and stem-end trimming units 67, and a discharge turret 68 which receives each peeled, cored and trimmed pear from the main turret 66 and performs successive splitting, seed-cell removing, and blossom-end trimming operations prior to depositing the two halves of the pear on a discharge chute 69.

Pear feeding mechanism

The feed mechanism 65 of the machine (Fig. 4) comprises eight identical feed cups 70a to 70h, inclusive, which are mounted on an endless chain carrier 71 for movement in a circuitous path in the direction of arrow A. Pears are dropped, stem end down, into the cups when they are on the side of the feed mechanism 65 that is remote from the turret 66. In Fig. 4 the cup 70a is in open, pear-receiving position and is tilted approximately 15° from the vertical and toward the operator. As the loaded cups are carried around the circuitous path, they are closed and are tilted further, as indicated by cup 70c until the axis of the cup is substantially horizontal, as illustrated by cups 70d, 70e and 70f. While each cup is in the horizontal position, a stemming or coring tube, which will be described hereinafter, is moved into the cup to impale the pear along its stem-blossom axis. The cup is then opened and the stemming tube is withdrawn, carrying the pear out of the cup. The cup is then tilted back to the pear receiving position 15° from the vertical as it completes its circuit and returns to the pear feeding position.

The feed cups 70a through 70h are identical. Accordingly, a description of cup 70a will fully disclose the structures of all of the cups. The cup 70a (Fig. 6) comprises a rigid yoke 72 in which a rigid cup body member 73 (Figs. 6 and 7) is pivotally mounted on aligned pins 74 (only one pin being shown). The body member 73 has a central, frusto-conical guide portion 73a (Figs. 7 and 9) and two partially cylindrical walls 73b and 73c that extend upwardly from opposite sides of the upper edge of the guide portion 73a. A removable, frusto-conical insert 75 (Fig. 9) is disposed in the guide portion 73a. It will be evident that the size of the insert may be varied according to the size of the pears being processed. A third wall portion 73d (Fig. 7) projects upwardly between the opposed ends of the walls 73b and 73c to define a pair of vertical slots 76. Two movable jaws 77 and 78 (Fig. 6) are pivotally mounted on the body member 73. These jaws are identical but are oppositely disposed, each jaw comprising a pair of bent arms 79 (Fig. 9) which are connected by a strap 80. Near their lower edge, the arms 79 of the movable jaw 77 are keyed to a shaft 81 which is rotatably journalled at its ends in aligned apertures 82 (Fig. 7) provided in depending legs 83 and 84 of the rigid body member 73. Similarly, the arms 79 of the jaw 78 are keyed to a shaft 85 which is rotatably supported in aligned apertures 86 in the legs 83 and 84, one aperture only being shown. At their upper ends, each arm 79 carries a curved pear-gripping plate 87. The plates 87 of the movable jaw 77 extend through an open space 88 (Fig. 7) between the side edges of the walls 73b and 73c, while the plates 87 of the movable jaw 78 extend through the vertical slots 76 on the opposite side of the body member 73.

The movable jaws 77 and 78 are pivoted relative to each other by an actuator arm 89 (Fig. 9) that has a hub 90 secured to the shaft 81 by a setscrew 91. At one end, the actuator arm 89 carries a cam follower roller 92 and, at the other, it carries a rotatable roller 93 that is disposed in a socket of a U-shaped member 94 which is secured to the shaft 85. It will be evident that, when the actuator arm 89 is pivoted in a counterclockwise direction (Fig. 9) about the axis of shaft 81, the jaws 77 and 78 will be moved away from each other to an open position suitable to receive a pear placed therein by the operator.

The actuator arm 89 is pivoted counterclockwise to open the jaws by means of a cam, which will be explained presently, and this movement is made against the resistance of a spring 95 (Fig. 9) which is anchored at one end of a pin 96 projecting from the actuator arm 89 and is anchored at the other end to a pin 97 projecting from the rigid body member 73. Accordingly, as soon as the follower roller 92 moves out of engagement with its associated cam, the spring 95 moves the jaws 77 and 78 toward each other to a closed position wherein an adjustable stud 98, carried by the strap 80 of the jaw 77, abuts a resilient pad 99 which is positioned in a recess in the exterior wall of the frusto-conical guide portion 73a of the body member 73.

During a certain portion of the travel of the cup around its circuitous path, the jaws 77 and 78 are latched in an open position by means of a latch arm 100 (Fig. 8) that is mounted for pivoting movement on a pin 101 projecting from the body portion 73. A cam follower roller 103 is mounted for rotation on one end of the latch arm 100, and a V-shaped notch 104 is formed in the other end of the arm 100. A pin 105, projecting from one arm 79 of jaw 77, has a peaked upper portion arranged to engage in the V-shaped notch 104 to lock the jaws 77 and 78 in the open position of Fig. 8. A tension spring 108 is connected between the arm 100 and a pin 109 on the body portion 73 to urge the arm 100 in a counterclockwise direction about pin 101. Accordingly, when the actuator arm 89 is being cammed to jaw-open position, the notch 104 of the latch arm 100 is resiliently urged onto the peaked portion of the pin 105 to latch the jaws in open position.

As previously mentioned, as each cup moves around its circuitous path, it is tilted to various positions. This tilting movement is effected by means of a cam follower roller 112 (Fig. 8) that is mounted for rotation in a shelf 113 (Fig. 7) that projects laterally from the lower end of the leg 84 of the body member 73. An adjustable stud 114 (Fig. 6) is mounted in a tab 115 that is integrally formed on the inner face of one of the legs of the yoke 72. A capscrew 116 threaded in the upper end of the body portion 73, is arranged to engage the top of the stud 114 to arrest the pivoting movement of the cup when the cup reaches a horizontal position.

The endless chain carrier 71 (Fig. 3) on which the cups are mounted comprises a plurality of vertical plates 120 (Fig. 10) pivotally mounted on vertical pins 121. Each plate 120 has a pair of trailing hubs 120a which receive a trailing pin 121 and a pair of leading hubs 120b which receive a leading pin 121. Two rotatable rollers 122 are mounted on the upper end of each pin 121 and two rotatable rollers 123 are mounted on the lower end of each pin 121. The carrier 71 is supported by a horizontal plate 125 (Fig. 3) which is secured in fixed position on a plurality of pads 126 projecting upwardly from a flat platform 127. The platform is connected to a generally cylindrical support base 130 by a plurality of vertical webs 131, only one of which is illustrated in Fig. 3. As seen in Fig. 5, the horizontal support plate 125 has a generally oval shape with circular end portions, and is provided along its outer edge with a raised track 132 along which a plurality of rollers 133 ride. Each roller is mounted on a shaft 134 which extends through a spacer collar 135 and through one of the plates 120 of the carrier 71. A nut 136 is disposed on the threaded end of each shaft 134 to lock the roller 133 on the plate. A sufficient number of rollers are provided to transfer the entire vertical component of the weight of the carrier 71 and the cups to the lower support plate 125.

Each cup is connected to the carrier 71 by means of a fork 137 (Fig. 10) which is integrally formed at the lower end of the yoke 72 and projects laterally from the shank of the yoke. Each of the arms 137a and 137b of the fork 137 is pivotally mounted on a pin 138 that has an end disposed in a roller 139 which is mounted for rotation on the upper end of one of the pins 121 of the carrier. The conveyor pin 121, which is immediately behind the pin on which the yoke is mounted, extends upwardly through an opening 140 in the shank of the yoke 72 and is secured therein by a setscrew 141.

An upper support plate 142 (Fig. 3) is mounted directly above the support plate 125 and is held in spaced relation thereto by four vertical spacer tubes 143 (Figures 3 and 5). The plates 125 and 142 have the same configuration and are secured together by bolts 144 which extend through the plates and through the spacer tubes 143. The plates are also held in spaced relation by two shafts 147 and 148 (Fig. 5). At its lower end, each of the shafts 147 and 148 is secured by a setscrew 150 to a hub 151 bolted to the upper surface of the lower support plate 125. At its upper end, each of the shafts 147 and 148 is secured by a setscrew 153 (Fig. 10) to a hub 154 bolted to the upper surface of the upper support plate 142.

As the endless chain carrier 71 travels around the left end (Fig. 10) of the elongated, generally oval frame provided by the support plates 125 and 142, the upper rollers 122 bear against a circular plate 160 which is disposed directly below the upper support plate 142 and is slightly larger in diameter than the circular ends of the plates 125 and 142. The lower rollers 123 bear against a similar lower circular plate 162. The circular plates 160 and 162 are mounted for free rotation on the shaft 147 and, accordingly, the chain is carried bodily around the left end of the frame on the plates. Similarly, at the right end of the frame the rollers 122 and 123 bear against freely rotatable circular plates 164 and 165 respectively which are disposed on the shaft 148.

Each feed cup is moved to its various tilted positions as it travels around the upper support plate 142 by means of a fabricated cam track 170 (Fig. 11) which is mounted on the upper plate 142. The track 170 has a generally straight portion 172 on the operator's side of the feed mechanism. This portion 172 has a U-shaped transverse cross-section (Fig. 12) with its side walls inclined about 15 degrees from the vertical so that the roller 112 holds the cup in a corresponding tilted position. After a pear is placed in the cup, the cup is moved toward the right (Fig. 11), as indicated by arrow B, until the roller 112 engages a twisted cam section 174 where the side along which the roller was moving is turned gradually to an inclined surface, as at 174a, and finally to a substantially horizontal surface at 174b. Thus, as the roller 112 moves around the right hand end of the upper plate 142, the axis of the roller is moved from approximately 15 degrees from the vertical to an approximately horizontal position as shown in Fig. 16. It will, of course, be evident that the axis of the cup will also be moved to a horizontal position. The roller 112 then is moved toward the left, as indicated by arrow C (Fig. 11) along the horizontal surface 176 of a track 177. At the left hand end of the machine, the roller rides onto a twisted cam surface 179 and is gradually turned back to the 15 degree from vertical pear-receiving position as it is returned to the substantially straight portion 172 of the track. If desired, auxiliary guide members 181 and 182 may be mounted at the left and right ends, respectively, of the track to assist the guiding of the cups around the ends of the track. The track 170 is supported at a predetermined elevation above the plate 142 by a plurality of brackets 183 which are secured to the plate 142 and extend upwardly therefrom.

At the beginning of the feeding operation, the operator places the pear in the conveniently tilted, open cup (Fig. 13). As the cup is moved toward the right, the roller 103 (Fig. 14) of the latch arm 100 rides under a cam plate 185 (Fig. 11) and is tripped thereby, permitting the spring 95 to close the movable jaws of the cup against the pear. As seen in Fig. 11, the inclined cam plate 185 is mounted on one wall of the U-shaped track portion 172.

After the pear has been impaled on a stemming tube (Fig. 16), the cup is moved back to open, latched position by the engagement of the roller 92 (Fig. 16) of the actuating arm 89 with an inclined surface 188 (Fig. 11) of a cam 189 that is mounted on a bracket 190. As previously mentioned, when the cup reaches its open position, the notch 104 of the latch arm is spring urged into engagement with the peaked portion of the pin 105. Therefore, after the roller 92 passes out of engagement with the cam surface 188, the jaws remain in open position.

*Support structure and drive mechanism*

Referring to Fig. 3, it will be noted that the cylindrical base 130 has three support posts 200 which rest on a surface such as a floor. An upright tubular member 201 is disposed concentrically of the base at the center thereof and is rigidly secured to the base by a plurality of radially extending flanges 202. An apertured plate 203 is bolted across the lower end of the tubular support member 201 and a main shaft 205 is bottomed on the plate 203 inside the stationary support member 201 to which it may be secured by any suitable means as by bolts. A cylindrical drum 206 is mounted in supported relation at the upper end of the stationary shaft 205. The drum has a central tubular member 207 and a plurality of radial webs 208 which connect the central tubular member 207 to a base plate 209 and an outer wall 210. The drum is supported by the stationary support shaft 205 and is keyed thereto so that the drum cannot rotate and, accordingly, it provides a suitable support for several stationary cams which control operating mechanisms of the machine, as will be explained presently.

In the present pear processing machine, the rotary turret 66 carries twelve separate and complete processing units 67 which are schematically shown in Fig. 4. As the turret 66 rotates clockwise, each unit removes a pair from a feed cup, firmly seats the pear on a stemming tube, peels the pear, and cuts off the stem end of the pear. By the time these operations are completed, the unit is disposed adjacent the discharge turret 68 to which the pear is transferred.

The turret 66 (Fig. 3) comprises a tubular drive member 218, which is disposed at the center of the machine around the stationary main shaft 205. The member 218 is driven by a motor 220 through a belt and pulley drive 221, a transmission unit 222, a drive shaft 223, a pinion 224 (Fig. 5) on the shaft 223, and a gear 225 that is bolted to a plate 226 (Fig. 3) which is welded to the drive member 218. Near its upper end the drive member 218 is rigidly connected to an outer cylindrical drive member 228 through a rigid, frusto-conical member 229. Thus, when the motor 220 is energized, the outer drive member 228 of the turret 66 is continuously rotated.

The outer cylindrical drive member 228 carries a plurality of vertical plates 230 (Figs. 3 and 5) which are welded to the member 228 and project radially outwardly therefrom. A circular angle bar 231a (Fig. 3) is rigidly secured around the upper, outermost edges of the plates 230, and a circular strap 231b is welded around the lower outermost edges of the plates 230. A horizontal upper sprocket ring 232 (Figs. 3 and 4) is secured to the upper flange 231a, and a lower sprocket ring 233 (Figs. 3 and 5) is secured to the lower strap 231b. The sprocket rings 232 and 233 engage the upper and lower rollers 122 and 123, respectively, of the cup carrier 71 to drive it in synchronism with the several processing units 67 on the turret 66.

A framework 234 (Figs. 2 and 3) is formed around the drum 206 by means of a plurality of vertical tubular members 235 which are mounted in upright spaced position on the upper surface of the circular angle bar 231a. A casting 236 (Fig. 19) is bolted on the upper end of each tubular member 235, and the several castings 236 are connected together by a tubular ring 237 which is bolted between spaced arms 238 and 239 of each casting. The castings 236 provide mounting means for mechanism of each pear processing unit 67 and accordingly, one upstanding tubular member 235 is disposed radially outwardly from each processing unit 67.

*Pear processing units on main turret*

The twelve pear processing units 67 (Figs. 4, 19 and 22) are identical, each unit comprising a vertical mounting plate 240 which is secured at its lower end to the outer drive member 228 of the turret by bolts 241. At the upper end of the mounting plate, a bolt 242 projects through the plate 240, and through a spacer sleeve 243 (Fig. 19) and is threaded in a hub plate 244 that is supported from the stationary main shaft 205 and mounted for rotation relative thereto. Each processing unit 67 includes a stemming tube 250 (Fig. 19) that has a pair of diametrically opposed fins 251. A stationary ejector rod 252 is disposed inside the stemming tube 250 and is connected at its innermost end to a tab 253 (Fig. 3) that extends upward from the inner end of a bracket 254 that is secured to the mounting plate 240.

The stemming tube 250 carries a tubular end portion 255 (Fig. 20) that is pressed on the tube 250 and is locked between a nut 257 and a shoulder 258 formed internally in a tubular drive member 259 on which a bevel gear 260 is keyed. With this arrangement, the stemming tube 250 is rotated when the gear 260 is driven and, at the same time, the stemming tube may be slid in and out of the mounting plate 240 which rotatably journals gear 260.

The stemming tube 250 is moved in a radial direction in the mounting plate 240 by means of a lever 265 (Figs. 19 and 22) which has two substantially identical, spaced arms 266 and 267. Each arm has a hub 268 mounted for pivoting movement on a short shaft 269 that projects outwardly from the casting 236. At its lower end, each lever arm 266 and 267 has a forked end portion 271 (Fig. 19) that has arms disposed on opposite sides of a pin 272 (Fig. 22) which projects outwardly from each side of a bearing block 273 (Fig. 23). The bearing block 273 is locked on the tubular drive member 259 (Fig. 20) of the stemming tube 250 by means of snap rings 275. As the lever 265 is pivoted about the short shaft 269, the forked ends of the lever move the stemming tube radially in or out of the mounting plate 240 of the turret.

The lever 265 is pivoted about shaft 269 by means of a cam follower roller 277 (Fig. 19) that is rotatably mounted on a bar 278 that is secured between the upper ends of the lever arms 266 and 267. The roller 277 is disposed in a cam track 280 formed between two flanges 281 and 282 which project downwardly from a horizontal plate 283. This plate 283 is rigidly secured to a circular member 284 that is welded to the exterior surface of the stationary drum 206. As seen in dotted lines in Fig. 2, the cam track 280 is bent inwardly at a point approximately directly opposite the longitudinal midpoint of the frame on which the cup carrier is mounted. As will be explained presently, when the cam follower 277 rides inwardly along this inwardly bent portion of the camming track, the stemming tube is carried radially outwardly of the main turret to impale a pear in the feed cup.

Each stemming tube is rotated by a bevel gear 290 (Fig. 19) that is in mesh with the bevel gear 260 which is keyed in driving relation on the drive member 259. The gear 290 is keyed to a vertical shaft 291 that is journalled in a lower wall 292 of a box-like extension of the mounting plate 240. At its lower end, the shaft 291 carries a gear 293 which is arranged to move into contact with a stationary gear segment 294 (Fig. 4) that partially encircles the main shaft 205. This gear segment 294 is secured to a plate 296 (Fig. 3) which projects horizontally from a hub of a stationary circular mounting member 297 that is keyed to the stationary main shaft 205. Accordingly, while the gear 293 is moved continuously with the turret in a circular path, it is rotated about its own axis only during a portion of its movement in said circular path. As will be explained hereinafter, the pear is peeled while it is being rotated on the stemming tube, and therefore the rotation of the stemming tube corresponds in length to the peeling phase of the pear processing cycle.

Each gear 293 is brought into smooth engagement with the gear segment 294 by means of a synchronizing block 300 (Fig. 24) that is secured to the lower face of the gear 293. The block 300 has two recesses 301 and 302 (Fig. 25) that open in opposite directions. A T-shaped locking bar 304 is secured to the bottom of the block 300. As the gear 293, which is being carried by the turret, approaches the entrance end of the gear segment, the recess 301 of the block 300 engages a pin 306 that is mounted in upright position on a bracket 307 (Fig. 24) secured to the stationary circular mounting member 297. The pin 306 is so positioned relative to the first tooth of the gear segment that the block 300 will be engaged and rotated, as shown in Fig. 25, to bring the teeth of the gear 293 into smooth meshing engagement with the teeth of the gear segment. It is to be noted that the locking bar 304 rotates with the gear 293 below the gear segment.

When the stemming tube 250 is not rotating, it must be held in a fixed position with the fins 251 disposed in a substantially vertical plane so that a forked butt clamp member, which will be described presently, can be moved longitudinally along the stemming tube past the fins. The stemming tube is held in this fixed position by means of the locking bar 304. It will be noted in Fig. 26 that, as the gear 293 moves toward the left and out of engagement with the gear segment 294, the recess 302 of block 300 receives a pin 308 which is mounted on the extension 307 of the circular mounting member 297. This contact of the pin with the walls of the recess causes the locking bar 304 to be rotated in a clockwise direction so that it is moved smoothly into engagement with the outer peripheral edge 309 of a plate 310 that projects outwardly from the circular mounting member 297. As seen in Fig. 4, the gear segment 294 extends around the stationary main shaft 205 for about 226°, while the locking plate 310 has an angular extent of about 134°.

Butt stop

Just before a stemming tube is moved into a pear, it is necessary that the pear be pressed into the feed cup in which it is carried so that the nose of the pear will be centered in the cup and the stem-blossom axis of the pear will be aligned with the stemming tube. This pear centering operation is carried out by a butt stop lever 325 (Figs. 19 and 22), which is a composite member comprising two parallel, juxtaposed members, an actuating bellcrank 326 (Fig. 19) and a pear-contacting butt stop arm 327. The bellcrank 326 has a hub 328 rotatable on the short shaft 269 which projects outwardly from the adjacent casting 236. One arm 329 of the bellcrank carries a roller 332 which rides in a cam groove 333 provided by two spaced horizontal straps 334 and 335 that are secured to and project outwardly from a cylindrical support member 336 which is secured to the drum 206. At its lower end the bellcrank 326 carries a roller 338 which rides in an elongated opening 339 formed in the lower end of the butt stop arm 327. At its lower end, the arm 327 has a forked butt stop 340 which has a slot 342 (Fig. 22), terminating in an enlarged recess 343. The butt stop 340 is in alignment with the stemming tube 250, which is adapted to pass through the enlarged recess 343. When the stemming tube is in its non-rotating, locked position with the fins 251 disposed in a vertical plane, the uppermost fin is aligned with the slot 342 and is adapted to pass therethrough.

The butt stop arm 327 has a forked upper end 346 (Fig. 19) which receives a roller 347 rotatably carried by the bellcrank 326. Thus, when the bellcrank 326 is pivoted about shaft 269, the upper roller 347 and the lower roller 338 carried by the bellcrank 326 cause the arm 327 to swing with the bellcrank. In order that the butt stop 340 of the arm 327 will move in a substantially straight line path as it pushes the pear, the arm 327 carries a roller 350 (Fig. 19) which projects laterally into a camming groove 351 in a plate 352 secured to the casting 236. As best seen in Fig. 19, the groove 351 has an ascending and a descending portion designed to cause the butt stop 340 to move in a straight line path as it moves longitudinally along the stemming tube 250. It will be understood that the camming groove 333, which actuates the butt stop bellcrank roller 332, has a configuration adapted to cause the butt stop to move radially inwardly or outwardly at predetermined times in coordination with the movement of other operating mechanisms.

It will be evident from Fig. 19 that, when the roller 332 is moved downwardly, the arm 327 is pivoted clockwise and the butt stop 340 is moved to the left to engage a pear in a feed cup. At this point the pear is gripped by the jaws 77 and 78 and its stem end may be out of contact with the tapered seat in the cup. The butt stop 340 engages the pear and forces it inwardly in the cup causing the stem end of the pear to engage the seat of the cup and the pear to be centered. In Fig. 21, a downwardly inclined portion 333a of the groove 333 is illustrated. As the roller 332 travels down this inclined portion of the groove, the butt stop 340 is moved into engagement with the pear. Near the lower end of the groove, the roller 332 contacts a shoe 352 which is formed on the end of a spring loaded bellcrank 353 which causes the pressure of the butt stop 340 to be increased until the pear has been firmly seated. When the pear is seated, the bellcrank 353 will pivot clockwise and allow the roller 332 to pass thereunder, thus terminating the pressure of the butt stop on the pear. With this arrangement, the spring-loaded lever 353 assures the proper seating of the pear regardless of its size, and at the same time it prevents the application of the excessive pressure to the pear.

Nose stop

At the time the stemming tube of each processing unit 67 withdraws a pear from the feed cup, the pear is not fully seated on the stemming tube. Before the peeling operation can be started, the pear must be fully seated on the tube and the butt end of the pear must be positioned at the particular location at which the cutter begins its peeling operation. This seating and positioning of the pear is effected by means of a nose stop 375 (Figs. 19, 22 and 23) which is in the form of a bar having a notch 376 at its outer end. At its inner end the bar is secured to a short shaft 377 (Fig. 23) projecting from the end of a tubular shaft 378 which is journalled for sliding and rotating movement in a tubular bushing 379 fixed on a plate 380 that is arranged to be bolted to the mounting plate 240 of the associated processing unit. The bore of the bushing 379 is aligned with openings in the plates 240 and 380. The tubular shaft 378 is moved back and forth in the bushing 379 by means of a bellcrank 382 that has a slot 383 disposed at the lower end of one arm and adapted to receive a pin 385 projecting from a collar 386. The collar is locked against axial movement on the shaft by snap rings 389, one only being shown. The bellcrank 382 has a hub 394 pivotally mounted on a stub shaft 395 (Fig. 22) projecting from the casting 236 at a point below the shaft 269 on which the butt stop bellcrank 325 pivots. The other arm 397 (Fig. 19) of the bellcrank 382 has a roller 398 mounted for rotation thereon, said roller being disposed in a stationary camming channel 400 which is formed by two horizontal plates 401 and 402 projecting from the exterior wall 210 of the drum 206. The stationary camming channel 400 is so designed that, as the processing unit is carried in a circular path, the bellcrank 382 is pivoted in a clockwise direction (Fig. 23) causing the tubular shaft 378 to move radially inwardly. When the nose stop 375 has reached a predetermined radially inward position, a pin 404 (Fig. 23), that is carried by the stationary bushing 379 and is disposed in a camming slot 405 in the tubular shaft 378, engages a slanted portion 406 of the slot, causing the shaft to be rotated to swing the nose stop to a position wherein the notch 376 in the nose stop is disposed around the stemming tube 250. After the nose stop is in this pivoted position, the bellcrank 382 is pivoted further in the clockwise direction to cause the nose stop to engage the stem end of the pear and push it further onto the stemming tube which is stationary during this particular interval.

It is to be noted in Fig. 23 that the tubular nose stop shaft 378 has a laterally extending yoke 415 secured to its radially inner end. A roller 416, that has three peripheral rings of V-shaped cross section, is rotatable in the yoke. When the nose stop bar 375 is swung up to a position of alignment with the stemming tube, the yoke 415 and the roller 416 are also swung upwardly to a position wherein the upper V-shaped edges of the rings on the roller are at the same level as a plurality of elongated V-shaped grooves 420 (Fig. 19) formed on the lower surface of a locking plate 421 that has a hub 422 (Fig. 3) secured by setscrews to the stationary main shaft 205. As seen in Fig. 4, the locking plate 421 is not completely circular but has an angular extent of about 238 degrees. Fig. 19 is a view taken at the turret position at which impaling of the pear is begun and at this position the nose stop has not yet been moved radially inwardly. Since the locking plate 421 does not begin until approximately 48 degrees after the impaling station, it is evident that upward swinging movement of the roller in Fig. 19 would not bring the roller 416 into contact with the V-shaped notches 420 of the locking plate. However, it will be understood that in each processing unit 67 the roller 416 is raised to a predetermined position as the nose stop is aligned with the stemming tube, and then it is moved radially inwardly, as the nose stop seats the pear, until it is in a radially inner position such that further rotation of the turret will move the threads of the roller 416 into engagement with the V-shaped grooves 420 in the locking plate. When the roller 416 is engaged with the plate in this manner, the nose stop is locked against further radial movement until the subsequent peeling and stem cut-off operations are completed.

When the pear has been fully seated on the stemming tube by the inward pushing movement of the nose stop, the butt of the pear comes into contact with the butt stop which has been previously withdrawn to a predetermined radially inward position. At the time that the butt of the pear hits the butt stop, the processing unit has been rotated approximately 35 degrees from the fruit impaling station to a station which will be called the pear positioning station since at this position the butt end of each pear, regardless of the length of the pear, will be positioned at the same predetermined radially inward position at which the peeling cutter begins the peeling operation.

The control mechanism 449 at the pear positioning station is particularly shown in Figs. 2, 27, 28 and 29. At this station the wall 210 of the drum 206 (Fig. 28) has an upper small aperture 450 and a lower large aperture 451. A paddle 453 (Fig. 27) has a forward end portion 453a projecting through the small upper aperture 450 and has a tubular hub 453b disposed inside the drum 206. The hub 453b is pivoted on a pin 455 that is disposed in two spaced tabs 456 (Fig. 29) depending from a flange 457 secured to the inner surface of the wall of the drum. An actuator arm 460 (Fig. 27) is welded to the hub 453b and extends radially inwardly therefrom to engage the plunger 461 of a control valve 462 mounted in fixed position on a bracket 463. The control valve 462 is connected in an air pressure line leading to one end of a power cylinder 464 (Figs. 27 and 28) which has a plunger 465 pivotally connected to an arm 466 that is secured to a shaft 468. The shaft 468 is journalled for rotation in a bushing 469 that is fixed to a mounting plate 471. Also secured to the shaft 468 is a latch arm 470 (Fig. 28). At its free end the latch arm 470 carries a roller 472 adapted to engage a shoulder 474 formed on a control arm 475 of a compound lever 476 that is pivoted on the mounting plate 471 and includes a ramp 477. It is to be particularly noted that the ramp 477 forms a continuation of the lower member 402 (Fig. 19) of the cam channel 400 in which the follower 398 of the nose stop 375 travels. Accordingly, when the follower 398 (shown in phantom lines in Fig. 28) rides up the latched ramp 477, the nose stop 375 is moved radially inwardly of the turret (Fig. 23) to engage the stem end of the pear and push it inwardly.

At the time the follower 398 of the nose stop 375 approaches the ramp 477 as seen in Fig. 28, the follower 332 of the butt stop bellcrank is disposed in the cam track 333 (Fig. 28) and is approaching the paddle 453 which forms a part of the upper wall 334 of the cam track 333. It is therefore evident that the substantially horizontal portion of the cam track 333 positions the butt stop in a predetermined radially inward position, ready to be contacted by the butt end of the pear as it is moved inwardly by the nose stop. Accordingly, as the nose stop follower 398 rides up the ramp, the nose stop bar 375 pushes the pear inwardly until the butt end of the pear contacts the butt stop. The contact of the pear with the butt stop causes the butt stop bellcrank to be pivoted. The follower 332 engages and lifts the end portion 453a of the paddle 453 upwardly, causing the actuator arm 460 to be moved downwardly to actuate the air valve 462. When the air valve is actuated, air under pressure is directed to the right hand end of the power cylinder 464 (Fig. 28). As the plunger 465 is forced out of the cylinder 464, the latch arm 470 is moved from under the shoulder 474 of the lever 475, permitting the lever to swing counterclockwise and lower the ramp 477. When the ramp is lowered, the inward movement of the nose stop is terminated and the pear comes to rest in a predetermined position against the butt stop 340.

The pear positioning mechanism is moved back to latched position by means of an arm 480 (Fig. 29) that is keyed to a shaft 481 which is journalled in a hub 482 on the support plate 471. A second arm 483 is keyed to the shaft 481 and is pivotally connected to a link 484 (Fig. 27) that has a yoke 485 pivotally mounted on an arm 487 which is keyed to the same shaft 468 to which the latch arm 470 is keyed. Accordingly, as seen in Fig. 29, when the nose stop follower 398 of the next pear processing unit 67 contacts the arm 480, the shafts 481 and 468 will be rotated clockwise and the latch arm 470 will be swung clockwise, causing the roller 472 to ride along the edge of the control arm 475 to latched position under the shoulder 474.

*Peeling mechanism*

On each pear processing unit 67, a peeling mechanism 500 (Figs. 22, 30 and 32) is mounted alongside the stemming tube actuating lever arm 267. The peeling mechanism 500 includes a cutter assembly 501 (Fig. 30) and a cutter actuating mechanism 502 which swings the rotating cutter into position adjacent the butt end of the pear, moves the cutter up over the butt end as the butt end is peeled, and then moves the cutter longitudinally along the pear to the stem end.

The cutter assembly 501 (Fig. 33) comprises a tubular metal support shaft 505 that has a sleeve 506 welded to its upper end. A nut 507 is disposed on the threaded end of the sleeve 506 and is arranged to engage an annular flange 508 of a short ferrule 509 to lock the tube against the end of the sleeve 506. The ferrule 509 has a rubber tubular extension 510 secured thereon to form a flexible protective covering for a flexible drive shaft 511 which is connected by a coupling 512 to a shaft 513 that extends through the metal support shaft 505 and is journalled in bushings 504. The coupling 512 is pressed on the shaft 513 and has a socket of square cross-section adapted to receive a square end 511b of the shaft 511. The ferrule 509 has a shoulder 509a that is urged by the nut 507 into engagement with a collar 511a on the shaft 511 to hold the square end 511b in the square socket of the coupling 512. Set screwed to one end of the drive shaft 513 is a depth gauge 514 which has a frusto-conical gauging surface 515, and a frusto-conical guide surface 516 adjacent the gauging surface. A screw 518 is threaded into a central tapped bore 519 in the gauge 514, the head of the screw being arranged to lock a second cylindrical gauge 520 and a circular cutter 521, which has peripheral cutting teeth, to the gauge 514 to form a cutter head 522.

The flexible drive shaft 511 of each processing unit has a drive wheel 523 secured to its upper end, as seen in Fig. 3, and each drive wheel is supported from the ring 237 by a bracket 524, and is disposed in frictional engagement with a peripheral rim of a disk-like drive member 525. The drive member 525 is keyed to and supported on the upper end of a drive shaft 526, which has a tubular section 526a, and is rotatably journalled in suitable bearings in the stationary main shaft 205. At its lower end, the drive shaft 526 carries a pulley 527 which is driven from a motor 528 (Fig. 5) through a belt 529. During the operation of the machine, the motor 528 is continuously energized and, accordingly, the flexible drive shaft 511 of each processing unit is continuously rotated to drive its cutter head at a high rotative speed.

Each cutter assembly 501 is connected to its associated actuating mechanism 502 by means of a square block 530 (Fig. 30) which is secured by a setscrew 531 to the sleeve 506 and is pivotally mounted in a yoke 532 by pins 533 (one only being shown).

The yoke 532 is clamped by a bolt 535 (Fig. 22) around a shaft 536 (Figs. 30 and 22) that is journalled for rotation in two spaced arms 537 and 538 of a yoke 540 that has a base member 541 (Fig. 23) secured by capscrews 543 to a flange 544 of a tubular push rod 545. The push rod 545 is slidably journalled in two spaced bushings 547 that are integrally formed on a bushing support member 548. It will be evident that, when the tubular push rod 545 is slid back and forth in the bushings 547, the yoke 540, acting through the transverse shaft 536 and the yoke 532, will carry the cutter assembly 501 in a longitudinal direction relative to a pear on the stemming tube.

The yoke 540 has an integrally formed boss 540a Fig. 22) depending therefrom. A rotatable roller 542, which is mounted on the boss 540a, extends into a guide slot 549a (Fig. 30) in a bracket 549 that is secured to the bushing support member 548. The bushing support member 548 (Fig. 23) of a particular processing unit 67 is bolted to the upper surface of the vertical mounting plate 240 of the processing unit 67 next behind and to the upper surface of the hub plate 244. The engagement of the roller 542 in the slot 549a maintains the yoke 540 and the shaft 536 in a fixed orientation as the cutter is moved radially outwardly along the associated stemming tube.

At the beginning of the peeling operation, the cutter assembly 501 is swung from the generally vertical position of Fig. 22 to a position wherein the cutter head 522 is disposed rearwardly of the butt end of the pear and close to the stemming tube, as indicated in phantom lines in Fig. 22. To accomplish this movement, the yoke 532 is swung approximately 90 degrees about the axis of shaft 536, bringing the square block 530 outwardly and to the right from the position of Fig. 22, and moving the cutter head 522 rearwardly and to the left to the phantom line position. This 90 degree movement is effected by means of a rack 550 (Figs. 30 and 31) formed on the end of a rod 551 that is supported for sliding movement in the tubular push rod 545. The rack 550 meshes with a pinion 552 that is rotatably mounted on a pin 553 extending between the arms 537 and 538 of the yoke 540. The pinion 552 also meshes with the teeth of a gear segment 554 which is keyed to the shaft 536. With this arrangement, when the rack 550 is withdrawn into the tubular push rod 545 from the positions shown in Figs. 23 and 30, the pinion 552 is rotated clockwise (Fig. 31) and the gear segment 554, the shaft 536, and the yoke 532 are swung counter-clockwise approximately 90 degrees.

The rack is moved in and out of the tubular push rod 545 by means of a cam roller follower 555 (Fig. 30) that is mounted for rotation on a pin 556 which is fixed in the rod 551 and projects up through a slot 557 in the push rod 545. The roller follower 555 rides in a camming slot 558a (Fig. 3) that is formed in a plate 558 which is bolted to the bottom wall of the drum 206. A spring 559 (Fig. 30) is anchored at one end on a pin 560 on the base of the innermost bushing 547 and is secured at the other end to the inner face of the yoke 540. This spring 559 is tensioned when the yoke 540 is moved outwardly to carry the cutter longitudinally along the pear. Accordingly, when the pear has been peeled, the spring 559 pulls the yoke rearwardly to put it in position for the next peeling operation. It will be understood that the camming slot 558a in which the follower 555 rides is so designed that just before a peeling operation is begun, the rack will be moved into the tubular push rod 545 to actuate the pinion 552 and gear segment 554 to rotate the yoke 532 in a counterclockwise direction (Fig. 31) to swing the cutter head to a position behind the butt end of the pear. When the pin 556, on which the roller follower 555 is mounted, engages the rearward edge 561 (Fig. 30) of the slot 557, the rotation of the gears and the swinging movement of the cutter head stops with the cutter head in a predetermined position adjacent the butt of the pear. Then, at the beginning of the peeling operation, the follower 555 is moved outwardly along the slot 557 of the tubular push rod 545, causing the rack and gear mechanism to swing the yoke 532 clockwise (Fig. 31) to carry the rapidly rotating cutter up over the butt end of the pear.

When the pin 556 contacts the forward edge 562 of the slot 557, the swinging movement of the cutter head is terminated and the rack and the tubular push rod 545 move outwardly as a unit, carrying the cutter longitudinally along the surface of the pear.

A spring 565 (Fig. 30) is connected between a clip 566 on the tubular extension 510 and an arm 567 extending upwardly from a collar 568 setscrewed to the shaft 536. As the cutter head moves longitudinally along the surface of the pear, the spring 565 maintains a pressure on the upper end of the shaft and swings the cutter head at the lower end into engagement with the surface of the pear. A stop bar 569 which is secured to the vertical plate 240, limits the amount the cutter shaft can be swung inwardly so that the cutter head will not engage the stemming tube if no pear is on the tube.

When a pear is being impaled on the stemming tube and when the pear is removed from the tube, the cutter assembly 501 must be held away from the stemming tube. For this purpose, a movable retractor bar 570 (Fig. 30) is mounted alongside the cutter assembly. The retractor bar, which is disposed in a position that is generally parallel to the associated stemming tube, is mounted on a short transverse arm 571 that is keyed to a pivot shaft 573. The shaft 573 is mounted for rotation in a bushing 574 that is fixed in a mounting plate 575 which is arranged to be bolted to the vertical plate 240 of the processing unit.

The transverse arm 571 and the retractor bar 570 are swung about the axis of the pivot shaft 573 by means of an actuating block 577 (Fig. 34) that has a recess 578 which is adapted to receive a pin 580 projecting rearwardly from the transverse arm 571. The actuating block 577 is carried at the lower end of a rod 582 that is mounted for sliding movement in two fixed guide tabs 583 and 584 projecting from the mounting plate 575. A compression spring 586 is disposed around the rod 582 between the lower guide tab 583 and a washer 587 fixed on the rod 582. The rod 582 is moved downwardly (Fig. 34) to swing the shaft 573 in a clockwise direction by means of a cam follower 590 that is rotatably mounted in a block 591 that is pinned to the upper end of the rod 582. A short guide rod 593 is also secured to the block 591 and projects downwardly into a guide hole 594 in the upper guide tab 584, to prevent rotation of the rod 582 as it is vertically reciprocated in the tabs 583 and 584. The cam follower 590 rides along the lower surface of a camming track 596 (Fig. 3) which is secured to the undersurface of the circular floor 209 of the drum 206 near the outer periphery of the floor. The cam track 596 is so designed that, at the time a pear is being positioned on the stemming tube, the cam follower 590 is depressed and the retractor bar 570 is held in the inclined, retracted, phantom line position of Fig. 34 wherein the cutter is held away from the stemming tube. When the rack and gear mechanism swings the cutter head to position behind the butt end of the pear, the cutter shaft 505 moves from a substantially vertical position to an inclined position generally parallel to the inclined bar 570. In moving to this inclined position, the cutter shaft is positioned behind a stop member 598 (Fig. 35) formed on the surface of the retractor bar adjacent a recess 599 in the bar. When the peeling operation is about to begin, the cam follower 590 is allowed to move rapidly upwardly under the urging of the spring 586. The retractor bar is swung to its vertical position, causing the stop member 598 to release the cutter shaft 505 which is then swung into contact with the butt end of the pear. After the pear is peeled and it is ready to be removed from the stemming tube, the cam follower 590 is depressed causing the retractor bar 570 to engage the shaft and swing it to the retracted position. If desired, a wear sleeve 600 (Fig. 33) may be positioned on the shaft 505 at the point where the retractor bar contacts the shaft.

It will be observed in Fig. 4 that the peeling operation is begun at station R5 approximately 60 degrees of turret rotation from station R2 at which the pear was withdrawn from the feed cup by the stemming tube. Then, approximately 207 degrees of turret rotation is used for the peeling operation. During a short interval at the very end of the peeling operation, the stem end of the pear is cut off by a blade 610 (Fig. 23) which is mounted on the nose stop shaft 378 by a collar 612 that is rotatable on the shaft. A roller 613 is mounted on a pin 615 which projects radially outwardly from the collar 612, and this roller 613 is disposed in a channel-shaped actuator 616 that is formed on a shaft 618. At its radially inner end, the shaft 618 is journalled for rotation in a bushing 620 which projects outwardly from the mounting plate 380. A gear 625 is keyed to the shaft 618 and is in mesh with a gear segment 627 formed on one end of a rocker arm 629. At its other end, the rocker arm 629 carries a rotatable roller 630 that is arranged to ride along a camming surface provided by the lower edge of a strap 631 (Fig. 3) that is secured to the bottom wall of the drum 206. A spring 634 is connected between the pin 635 on which the roller 630 is mounted and an arm 636 (Fig. 32) secured to one of the bushings 547 of the processing unit next ahead. The camming surface is designed so that the blade 610 is normally held away from the stemming tube. When the stem cut off station is reached, the follower 630 is released and the rocker arm 629 is rotated counter-clockwise (Fig. 23) by the spring 634 and the blade 610 is then swung inwardly through one side of the stem end of the pear to a position closely adjacent the stemming tube. A bolt 640 (Figs. 22 and 23), that is threaded through a tab 641 on the collar 386, abuts a stop plate 642 that extends rearwardly from an arm 643 to which the knife 610 is secured. Since the pear itself is being rotated, the entire stem end will be quickly cut off.

*Splitting, coring and discharge mechanism*

After the stem end of the pear has been cut off, the pear is transferred to a splitting and coring head 700 on the discharge turret 68 (Fig. 4). There are five heads 700 (Fig. 36) on the turret 68 and they are arranged to travel in a generally circular path in timed relation to the stemming tubes of the processing units 67 on the main turret. The five splitting and coring heads 700 are identical and each head comprises a rigid metal housing 702 (Figs. 37 and 38) which has a vertical front wall 704, a bottom wall 705, a top wall 706, and side walls 707. Two vertically spaced guide blocks 709 and 710 project outwardly from the front wall 704 to receive a shaft 711. A setscrew 712 and a transverse key 713 lock the shaft 711 to the housing.

The heads 700 are mounted in a rigid frame 720 (Fig. 37) consisting of a base plate 721 which is supported from the machine base 130 by a rigid inclined bracket 722. The frame 720 has an upper cam ring 725 and a lower cam ring 726 mounted in fixed position relative to the base plate 721 on spacer posts 728 and 729. A tubular hub 730 is secured, as by welding, in a central opening in the base plate 721. A central stationary shaft 735 is secured by a setscrew 736 to the hub 730. A lower cam plate 740, which is disposed in horizontal alignment with the lower cam ring 726, is secured by a setscrew 741 to the shaft 735. A plate 745 is bolted to the top of the stationary shaft 735 and a reel 750 is mounted for rotation in the stationary frame 720. The reel comprises a central tubular member 752 that is mounted for rotation in two spaced bushings 753 and 754 disposed around the stationary shaft 735. Identical star wheels 760 are bolted to the upper and lower ends of the central member 752. Each star wheel 760 (Fig. 5) has five arms 761 and each arm has a radial groove 762 at its outer end. The arms of the upper star wheel are disposed in vertical alignment with the arms of the lower star wheel.

A split hub 770 (Fig. 37) is clamped to the lower end of the shaft 711 of head 700, and a caster wheel 772, which is mounted for rotation on an arm 773 projecting from the hub 770, rolls along a circular track 774 on the base plate 721. Three rollers 777, 778 and 779 are mounted for rotation on the lower end of each shaft 711 between a set collar 780 and the split hub 770. A guide wheel 775 is rotatably mounted on the rearward, trailing end of each of the caster arms 773. Since each arm 773 is keyed to one of the shafts 711 of a head 700, a guide wheel 775 will determine the orientation of the head as it travels around the discharge turret. To assure that the head is moving in a path normal to the stemming tube at the time that the pear is transferred onto the splitting blade and to keep the head facing in a generally outwardly direction at all other times, the several guide rollers 775 and the rollers 777 are disposed in a cam track 776 (Figs. 36 and 37) defined between the lower cam ring 726 and the lower cam plate 740. Near the upper end of each shaft 711, three rollers 782, 783 and 784 are mounted for rotation on the shaft between a set collar 786 and the lower guide block 710. As seen in Fig. 37, the main turret sprocket ring 233 engages the roller 778 of each shaft 711. Similarly, the main turret sprocket ring 232 (Fig. 37) engages the roller 782 on each shaft 711. Thus, the shaft 711 of each head 700 is engaged by both sprocket rings, and the reel 750 is rotated about the stationary shaft 735. It is to be noted that the sprocket rings of the main turret drivingly engage only one unit. This driven unit drives the star wheels which in turn drive the other units around the turret in spaced relation.

Each head 700 (Figs. 36 and 39) has a pair of upper jaws or clamping pads 800 that are pivotally mounted at the upper end of curved arms 801. The arms 801 are keyed to shafts 802 which are journalled for rotation in the front wall of the housing 702. The pads 800 have outwardly curved leading end portions 800a (Fig. 36) which facilitate the insertion of a pear between the jaws. A spring 805 is connected between the arms of the upper jaws 800 to urge the jaws toward each other. Mounted directly below the upper jaws, and cooperating therewith to define a pear receiving chamber, is a pair of outwardly curved pads 810 which are pivotally mounted on curved arms 811 that are keyed to shafts 812 journalled in the forward wall 704. The lower jaws are connected together and urged toward each other by a spring 815. In their innermost position, the four pads bear against a pear splitting blade 820 that has an upper marginal edge tightly held in a slot 821 in a rod 822 that is secured to a vertical support wall 830 (Fig. 38) which is bolted to and extends upwardly from the rearmost portion of the upper wall 706 of the housing 702. The blade 820 is bolted at its lower forward end to a vertical flange 831 (Fig. 39) that projects forwardly from the housing 702. It is to be noted that the splitting blade 820 is disposed in the same plane as the fins 251 of the stemming tube on the main turret. Accordingly, the cut made by the blade coincides with the cut made by the fins.

Throughout its length the blade is provided with a tubular portion 833 (Fig. 38) which projects a short distance forwardly of a vertical cutting edge 835 and also projects a somewhat greater distance rearwardly of the rear edge of the blade to be received and locked in an opening 836 in the vertical support wall 830. A gear 837 is mounted for rotation on the rearmost end of the tubular portion 833 and is held thereon by a strap 838. Near its forward end, the blade 820 has an opening 840 in which a coring and trimming device 841 is mounted. This device comprises a tubular member 843 from which two diametrically opposed wire-like cutters 844, 844a, and opposed cutters 845 and 845a project outwardly in a radial direction. These cutters have a width that is equal to or less than the thickness of the portion of the blade 820 that is adjacent the opening 840. Accordingly, when the cutters are positioned in the vertical plane of the splitting blade 820, they do not interfere with the movement of the pear onto the blade. The forward cutters 845 and 845a are formed so that, when the tubular member 843 is rotated approximately 180 degrees, they will cut a frusto-conical portion from the blossom end of the split pear. Similarly, the rearward cutters 844 and 844a are designed so that they will sever the seed cell of the split pear. When the shaft is rotated approximately 90 degrees the cutters 844 and 844a are disposed laterally from the plane of the splitting blade and provide a cage-like structure adapted to hold the seed cell in the aperture 840 of the splitting blade. It will be understood that the cutters 844, 844a, 845 and 845a have sharpened leading edges.

The tubular member 843 of the coring and trimming device 841 is rotated by means of a shaft 850 that is journalled for rotation throughout a major portion of its length in the tubular portion of the cutter blade. The shaft 850 also has a forward end portion 850a journalled in the tubular portion of the blade 820, a portion 850b of square cross section disposed in driving engagement with the square bore of the tubular member 843 of the device 841, and a rearward portion 850c secured to the gear 837 by a setscrew 852. The gear 837 is in mesh with a gear segment 855 that is formed on the upper end of a bent arm 856 which is secured by capscrews 857 (Fig. 40) to a pivot plate 858. The pivot plate 858 rests on the upper surface of a bearing member 859 (Fig. 38) and is keyed to a vertical shaft 860. The shaft 860 is journalled for rotation in a tubular shaft 865 which in turn is rotatably journalled in the bearing member 859 and in a lower bearing member 866, fixed in the lower wall 705 of the housing. The shaft 860 is oscillated by means of a triangular arm 867 (Fig. 44) that is clamped on the lower end of the shaft 860. Two spaced rollers 868 and 869 are rotatably mounted on the underside of the triangular arm 867 and these rollers are arranged to be actuated by cams, which will be described presently, so that the coring and trimming cutters may be rotated both clockwise and counterclockwise as seen in Fig. 39 at predetermined intervals during the processing of the pear. A spring 870 (Fig. 40) is connected between the bent arm 856 and the housing 702 and is arranged to pivot the arm 856 counterclockwise against a stop bar 871 which determines the position wherein the cutters 844, 844a, 845 and 845a are disposed in the plane of the splitting blade 820.

The jaws 800 and 810 are moved to open position by means of two rotary cams 875 and 876 (Figs. 38 and 41) which are keyed to the tubular shaft 865. The cams 875 and 876 are identical and each cam has two diametrically opposed camming arms 877 and 878 (Fig. 41) which are arranged to engage rollers 880 (Figs. 41 and 42). Each roller 880 is mounted for rotation on a pivot block 881 that is keyed on the rearmost end of one of the shafts 802 or 812 on which the jaws are mounted. When the shaft 865 is rotated in a counterclockwise direction (Fig. 41) the camming arms 875 and 876 engage the associated rollers 880 and move them outwardly away from the center of the housing, causing the pivot blocks 881 to be pivoted (Fig. 42) and the shafts 802 and 812 to be rotated in the direction for opening the jaws.

The tubular shaft 865, to which the rotary cams 875 and 876 are keyed, is rotated in the counterclockwise, jaw-opening direction by a control lever 885 (Figs. 38 and 44) which is formed integrally on a lower end of the tubular shaft 865 or is welded thereon. The lever 885 has two spaced rollers 887 and 888 mounted for rotation thereon, and has a latch plate 890 adjustably secured to the lower surface of the lever by a bolt 891 (Fig. 44) that extends through a slot 892 in the plate 890. The latch plate 890 is rotatably mounted on the extreme lower end of the tubular shaft 865, as seen in Fig. 38, and has two teeth 893 and 894 (Fig. 44) formed on one edge. A latching lever 895 is pivotally mounted on the lower wall 705 (shown in phantom lines in Fig. 44) of the housing 702 by a bolt 896. A spring 898 is connected between one end of the latching lever 895 and the housing 702 and urges the lever 895 in a clockwise direction to move a tooth 899 on the lever 895 into position behind one of the teeth 893 and 894 on the latching plate 890 to prevent clockwise pivoting of the control lever 885.

The tubular jaw control shaft 865 is urged in a clockwise, jaw-closing direction by a plurality of torsion springs 900 (Fig. 38), each of which encircles the shaft 865 and has one end 901 hooked around a long screw 902 that extends vertically through the housing 702. The other end of each spring 900 is secured by a screw 903 to the face of a ring 910 (Fig. 43) that has a pressed-in bushing 911 rotatable on the shaft 865. As each ring 910 is urged in a clockwise direction (Fig. 43) by the associated torsion spring 900, a screw 912, which extends in a radial direction through the ring 910, engages an end wall 914 of an arcuate groove 915 cut in the shaft 865 opposite the ring. When the screw 912 abuts the end wall 914, the shaft 865 will be rotated with the ring 910.

It should be noted in Fig. 44 that, when the first tooth 893 of the latch plate 890 is engaged by the tooth 899 of the latching lever 895, the tubular jaw control shaft 865 is in a first angular position of adjustment wherein the jaws are wide open. When the tooth 899 is engaged behind the second tooth 894, the shaft 865 is in a second position which is disposed clockwise from the first position and which defines a second jaw position wherein the pivot blocks, on which the jaw pivot shafts are mounted, have been released by the cam rings 875 and 876 and the jaws are urged toward each other only by the urging of the two springs 805 and 815 (Fig. 39). This second position is the position of the jaws when the pear is pushed onto the splitting blade. Accordingly, the jaws will open and will accommodate their position to the size of the pear.

When the lever 885 has been pivoted clockwise from the position of Fig. 44 to a third position wherein the tooth 899 of the latching arm 895 is out of engagement with either of the teeth of the latch plate 890, wedge blocks 916 (Figs. 43 and 45), which are carried on the wedge support rings 910, are moved by the urging of the torsion springs into wedging engagement between shelves 917 formed on the inner wall of the housing and the underside of the pivot block 881. As seen in Fig. 43, a wedge block 916 is secured by a screw 918 to the outer end of each of two diametrically opposite arms 919 of each wedge support ring 910. Thus, in the third position of angular adjustment of the tubular jaw control shaft 865, the loaded jaws are urged inwardly toward each other by the wedge blocks. As will be explained presently, the jaws are moved to this third position after a pear has been forced over the splitting blade and is ready to be cored and trimmed.

When the wedge blocks are resiliently urged into contact with the pivot blocks, the jaws are urged inwardly to grip the pear with a certain amount of load resulting from the impact of the wedges. This gripping of the pear is sufficient to hold the pear while the seed cell is cut out and the blossom end is trimmed.

When the split pear has been cored and trimmed, the jaws are opened and the two halves of the pear are pushed away from the blade 820 by a pusher mechanism 920 (Figs. 38 and 39) which comprises a hub 921 mounted for sliding movement on the bar 822 at the upper end of the head. A paddle 923 extends downwardly from the hub 921 on each side of the blade 820, and each paddle has an arcuate recess 925 adjacent the tubular portion 833 of the blade. A cam roller follower 927, which is mounted on the upper end of the hub, is arranged to ride in an overhead cam track 930 (Figs. 2 and 37) defined by an inner plate 931 and an outer strap 932 which are secured together and supported in spaced relation above the stationary frame 720 (Fig. 37) by a vertical bracket 933. The cam track 930 is so designed that the pusher paddles 923 are moved radially outwardly to eject the cored and trimmed pear halves from their position adjacent the blade 820 at a point where the pear halves can fall into the discharge chute. After the pear halves are discharged, the pusher paddles are moved further outwardly to eject the seed cell from the cutters 844 and 844a, causing the seed cells to fall at a different part of the discharge chute.

In Fig. 46 the various cams that operate the mechanisms of each coring and trimming head 700 are shown. The operations of a coring head 700, as it travels around the shaft 735, are shown by the positions of the control levers 885, 867 and 895 of the coring head in positions indicated as P, P1, P2 and P3 in Fig. 46. After a pear has been pushed onto the splitting blade, the head 700 begins its movement in a counterclockwise direction around the axis of shaft 735. It is to be noted that at the time the pear is pushed onto the splitting blade, the main shaft 865 of the head is in the above-mentioned second angular position wherein only the springs 805 and 815 urge the clamping pads against the pear. In this position the tooth 899 on the latch lever 895 is engaged with the second tooth 894 of the control plate 890. Soon after leaving the pear splitting station, the latch lever 895 engages a cam 950 that is secured to the upper surface of the fixed plate 745. The latch lever is pivoted in a counterclockwise direction, disengaging the teeth, and permitting the control shaft 865 to be swung to the third angular position by the several torsion springs 900. In this position the clamping pads are loaded and locked by the wedging action of the wedge blocks.

After the clamping pads have been preloaded, the roller 869 of the triangular cutter control lever 867 is engaged by a cam 955 that has an inwardly extending surface 956 which swings the lever 867 clockwise to rotate the coring and trimming cutters 844, 844a, 845 and 845a through 180 degrees. In this manner, the seed cell is severed from the pear halves and the butt or calyx end is trimmed. As the head continues its movement the roller 869 engages an outwardly extending camming surface 957, and the cutters are rotated 90 degrees counterclockwise so that the cutters lock the seed cell and the calyx material in the blade. The roller 869 is then moved along a surface 958 that causes the cutters to be held in the 90 degree rotated position.

In order that the pear halves may be pushed away from the blade 820, the clamping pads 800 and 810 are moved to their open position by the engagement at position P1 of the roller 887 with a cam 960 which causes the shaft control lever 885 to be swung counterclockwise, permitting the tooth 899 of the latching lever 895 to engage the first tooth 893 to hold the clamping pads open. When the pads are opened, the roller 927 of the push off mechanism is urged radially outwardly by the surface 930A of the overhead cam track 930 which is shown in phantom lines in Fig. 36. After the pear halves have been ejected, the cutter control lever 867 is pivoted counterclockwise at position P2 by the engagement of the roller 868 with a cam 965, following the release of the roller 869 by the camming surface 958 which is terminated. When the cutters are returned to the plane of the blade 820, the seed cell and the calyx material is released, and further outward movement of the paddles 923 along cam surface 930B pushes this material away from the blade and into the discharge chute.

Before another pear can be pushed onto the splitting blade 820, the clamping pads must be latched in the pear receiving position wherein the tooth 899 is engaged with the second tooth 894 of the control lever 885. To effect this, a cam 970 is positioned to engage the latch lever 895 to swing that lever counterclockwise and disengage the tooth 899 from the first tooth 893. At the same time, a cam 975 engages the roller 888 of the control lever 885 so that this spring-urged lever is permitted to swing slowly in a clockwise direction at position P3. Since the latch lever 895 is urged counterclockwise by the spring 898, the tooth 899 will move into engagement behind the second tooth 894 and stop the pivoting movement of the control lever 885 with the clamping pads in the spring-loaded pear receiving position.

A guide bar 930C is supported from the overhead plates 931 and 932 that define the cam track 930. The bar 930C is arranged to intercept the roller 927 of the pear push-off mechanism and return the push-off paddle to a radially inner position so that another pear can be pushed onto the splitting blade.

*Operation*

The path of a single pear as it is processed will be traced through the machine, referring particularly to Figs. 4, and 47 to 56, inclusive.

The pear is placed stem end down in a feed cup which is disposed in a position wherein its axis is inclined at an angle of approximately 15 degrees to the vertical. As the feed cup is carried in the direction of arrow A (Fig. 4) the movable jaws of the cup are moved to a spring loaded position around the butt end of the pear by the cam 185, and the cup is tilted to a horizontal position. When the cup is moving along that portion of its path that is adjacent the periphery of the main turret 66 and reaches radial position R1, a processing unit 67 on the turret is moved into position opposite the cup, and the stemming tube 250 of the unit is moved radially outwardly from the main turret toward the pear in the cup. Before the stemming tube engages the pear, the butt stop 325 (Fig. 47) is moved radially outwardly from the turret by the bellcrank 326 to engage the butt or calyx end of the pear and push the pear further into the cup. In this manner, the stem end of the pear is seated in the frusto-conical seat of the feed cup, and the stem-blossom axis of the pear is aligned with the axis of the stemming tube.

The stemming tube, which at this point is locked against rotation with the fins 251 disposed in the plane of the slot in the butt stop, is moved radially outwardly of the turret by the lever 265 to impale the pear (Fig. 48). The stemming tube reaches its outermost position at R2 when the feed cup has traveled approximately half way along that portion of its path that is concentric with the path of the periphery of the main turret. It is to be noted that the fins 251 of the tube may or may not be engaged in the pear at this time depending upon the size of the pear. However, at this point the tube must extend entirely through the pear since it must completely sever the core material from the pear during the impaling stroke.

Approximately at the time the stemming tube reaches its outermost position, the jaws of the feed cup are opened by cam 189. After the pear is impaled on the stemming tube, the butt stop is moved radially inwardly of the main turret by the bellcrank 326, and the stemming tube is moved radially inwardly by the lever 265, withdrawing the pear from the open feed cup. As the stemming tube is moved radially inwardly, the stationary core ejector rod inside the stemming tube contacts the core material that was cut from the pear by the stemming tube, and causes it to be pushed out of the tube (Fig. 49). After the stemming tube has reached its innermost position, the nose stop bar 375 is swung into position behind the stem end of the pear at R3, and the bellcrank 382 is actuated as the roller 398 (Fig. 28) rides up the ramp 477 to move the nose stop bar radially inwardly of the turret. The nose stop bar contacts the stem end of the pear and slides it along the stemming tube until the fins 251 (Fig. 49) are fully engaged in the pear. The inward movement of the pear on the stemming tube is stopped when the butt end of the pear engages the butt stop, which was previously retracted to its pear-positioning location. When the butt end of the pear contacts the butt stop, the follower 332 of the butt stop bellcrank 326 contacts the paddle 453 (Fig. 27) and thereby actuates the air-operated cylinder 464 which releases the ramp 477 and stops the inward movement of the nose stop bar. The ramp 477 is released between R3 and R4 depending upon the length of the pear.

When the nose stop bar 375 on shaft 378 was swung up behind the stem end of the pear, the yoke 415 on shaft 378 was also elevated, as seen in Fig. 49. After the inward movement of the nose stop bar is terminated, continued rotation of the main turret brings the V-shaped rings on the yoke 415 into engagement with the grooves of the locking plate 421 (Fig. 50) shortly after position R4, whereby the nose stop bar is locked against radial movement relative to the turret and, accordingly, the pear cannot be pushed off the stemming tube during the peeling operation.

To permit the cutter head to approach the butt of the pear, the butt stop 325 is cammed further inwardly (Fig. 51) a few degrees after R4 is passed. The rack 550 (Fig. 31) of the cutter control mechanism is then retracted into the tube 545, thereby swinging the cutter head to a position closely adjacent the stemming tube near the butt end of the pear, with the cutter tube 505 inclined relative to the vertical and disposed behind the stop member 598 (Fig. 35) of the retractor bar 570. As the turret rotates, the stemming tube drive gear 293 moves into engagement with the stationary gear segment 294 (Fig. 4) and the stemming tube begins to rotate about its own axis. With the cutter head in position and the stemming tube rotating, the retractor bar 570 is swung to a vertical position (Fig. 34), disengaging the cutter tube 505 and permitting the cutter head to be swung into engagement with the butt end of the pear to start the peeling operation approximately at R5. During approximately the next 207 degrees of turret rotation, the cutter head peels the pear.

Just before the peeling operation is completed, the cutting blade 610 (Fig. 51) is swung upwardly to cut into the stem end of the pear so that the final revolutions of the pear will cause the stem end to be cut off at R6 leaving a square nose on the stem end of the pear. Approximately at the time the stem end of the pear is cut off, the retractor bar 570 is pivoted through its cam-actuated mechanism to swing the peeler cutter away from the stemming tube to permit the pear to be pushed off the tube.

After the stem end has been cut off, the gear 293 passes out of engagement with the gear segment 294, stopping the rotation of the stemming tube. The positioning bar 304 (Fig. 26) moves into engagement with the peripheral surface 309 to lock the stemming tube in a non-rotating position in which the fins 251 are disposed in a vertical plane. Continued rotation of the turret brings the stemming tube into registry with the pointed end 833a of the tubular portion 833 of one of the splitting, coring and trimming heads 700. The butt stop 325 (Fig. 52) is moved radially outwardly of the main turret to engage the butt end of the pear and push it off the stemming tube and onto the splitting blade 820. As the coring and trimming head continues around the discharge turret 68, the seed cell is severed and the calyx or butt end is trimmed (Fig. 53), as explained above. The pear halves, the seed cell and the calyx material are then discharged (Figs. 55 and 56) into separate parts of the chute 69.

A second embodiment 1000 of the splitting, coring and stemming head of the present invention is illustrated in Figs. 57–66, inclusive. Each head 1000 (Fig. 62) is mounted on the upper, reduced diameter end 1001 of a shaft 1002 that is supported in a stationary frame structure 1005 in substantially the same manner as the shafts 711 of the heads 700 are supported in the frame 720 (Fig. 37).

The stationary frame structure 1005 (Fig. 66) comprises a central shaft 1010 to which is secured a top cam mounting plate 1011, the hub 1012 of a circular plate 1013, and the hub 1014 of a circular plate 1015 that is mounted on a rigid stationary base 1009. A ring 1016 is mounted in the horizontal plane of the cam mounting plate 1011 and is spaced therefrom to define a cam track 1017. Similarly a ring 1018 is mounted in spaced relation to the plate 1013 to define a cam track 1019. The rings 1016 and 1018 and the plate 1015 are held in spaced relation by studs 1023, each of which is in threaded engagement with the ring 1016 and extends through spacer members 1020 and 1021 to receive a nut 1022 on its lower end. A reel 1025 is rotatably mounted on the shaft 1010 and has two spaced star wheels 1026 that are arranged to engage spaced rollers 1027 on the shaft 1002. Two other spaced rollers 1030 on each shaft 1002 are engaged by the sprocket rings 232 and 233 of the main turret. When the main turret is rotated, the sprocket rings move each shaft around the stationary frame structure with spaced rollers 1035 and 1036 on the shaft being disposed in guided relation in the cam grooves 1017 and 1019 respectively. During this guided movement, the star wheels maintain the several shafts 1002 in spaced angular relation.

Each head 1000 (Figs. 59 and 62) has a housing 1040 that has a tubular front wall portion 1041 (Fig. 62), which is adapted to receive the upper end of the shaft 1002, and a flat, rear base plate 1042. Setscrews 1043 lock the tubular front wall 1041 to the shaft 1002. As seen in the rear elevation (Fig. 59), the flat rear base plate 1042 has a high wall 1045 extending upwardly from one side thereof and a relatively low wall 1046 extending upwardly from the other side. A shaft 1048 is mounted for rotation in the side walls 1045 and 1046 and projects outwardly from said side walls to receive two levers 1052 and 1053 which are secured thereto by setscrews (not shown). Each of the levers 1052 and 1053 has a wedge block 1055 integrally formed on one end, for a purpose which will be explained presently.

The head 1000 has four clamping pads 1060, 1061, 1062 and 1063 (Fig. 64) which define a pear-receiving chamber 1066 at the front of the head around an impaling rod 1067. Each of the two side pads 1061 and 1063 is mounted on a rod 1068 (Figs. 57 and 59) that has a split end 1069 clamped on a short shaft 1070 which is journalled for rotation in a bearing 1071 secured to one of the side walls 1045 or 1046 of the housing. The two rods 1068 are drawn toward each other by a spring 1072 (Fig. 59) which is connected between the rods. At the lower end of each bearing 1071, one end of a lever 1073 (Fig. 57) is keyed to the shaft 1070 while the other end of the lever carries a roller 1074 which is in engagement with the wedge block 1055 that is carried on the lever 1052 or 1053. The lever 1053 has an arm 1075 which carries a roller 1076 that rides along the surface of a cam 1077.

The cam 1077 (Fig. 65) is in the form of a bar that is secured to the upper plate 1011 of the stationary frame structure 1005. The cam bar 1077 has a camming surface 1077a that is arranged to swing the lever 1053 in a counterclockwise direction (Fig. 57) causing the wedge blocks 1055 to force the rollers 1074 inwardly (Fig. 59) toward the walls of the housing. As the roller 1074 moves inwardly the shafts 1070 are pivoted in the bearings 1071 and the clamp pads 1061 and 1063 are moved outwardly away from the impaling rod 1067 against the resistance of the spring 1072. The cam 1077 also has a camming surface 1077b (Fig. 65) which releases the lever 1053, permitting the clamp pads to move inwardly to engage a pear.

The lower clamp pad 1062 (Fig. 62) is mounted on a rack 1080 that is in mesh with a gear segment 1081 formed on the end of an arm 1082 that has a hub 1083 freely rotatable on the shaft 1048. The rack 1080 has a hexagonal cross-section (Fig. 63) and is slidably disposed in guided relation in recesses in the confronting side walls of blocks 1084 and 1085 respectively. The guide blocks 1084 and 1085 are secured to the undersurface of a curved bracket 1090 which has one end 1090a (Fig. 57) secured to the short wall 1046 by a capscrew 1091 and the other end 1090b (Fig. 63) secured to the high wall 1045 by capscrews 1092 (Fig. 64). The hub 1083 of the gear arm 1082 has a partially cylindrical extension 1086 (Fig. 62) that has two flat abutment faces 1086a and 1086b (Fig. 60) disposed opposite abutment faces 1087a and 1087b, respectively, of a drive portion 1087 of a clamp 1088. The clamp 1088 has a portion 1089 (Fig. 59) that encircles the shaft 1048 and is clamped thereto.

A spring 1100 (Fig. 62) is tensioned between a fixed transverse wall 1101 of the housing and the lever 1082 and tends to urge the lever in a clockwise direction and moves the abutment surface 1086b of the hub extension 1086 into contact with the surface 1087b of the clamp 1088 that is secured to the shaft 1048. It will be evident that when the shaft 1048 is rotated clockwise (Fig. 57) to permit the spring 1072 to close the side clamp pads 1061 and 1063, the spring 1100 will resiliently urge the gear arm in a clockwise direction to move the lower pad 1062 toward a pear on the impaling rod 1067. If the pad 1062 contacts the pear before the shaft 1048 has completed its pivoting movement, the inward movement of the lower pad will stop while the shaft 1048 will continue to rotate to the end of its travel. Thus the space between the abutment surfaces 1087a and 1086a (Fig. 60) permit the shaft 1048 to rotate without corresponding rotation of the gear arm 1082.

The upper clamp pad 1060 (Fig. 62) is mounted on a rack 1110 that is hexagonal in cross-section and is mounted for sliding movement in opposed recesses in two guide blocks 1112 (Fig. 64) which are secured to a bracket 1114. The bracket 1114 has a mounting flange 1115 (Fig. 62) secured to the upper end of the high wall 1045 by capscrews 1116. The rack 1110 is in mesh with a gear segment 1118 formed on a gear arm 1119 that is secured by a setscrew 1121 to a shaft 1122. The shaft 1122 is rotatably journalled in a boss 1124 (Fig. 59) that is formed on the wall 1045. The gear arm 1119 is urged in a clockwise direction (Fig. 57) by a spring 1126 which is connected between a stud 1127 disposed in the bracket 1114 and a stud 1129 disposed in the hub of the gear arm 1119.

When the lower shaft 1048 is urged in a clockwise direction (Fig. 57), as mentioned above, the upper shaft 1122 is also urged clockwise through a rod 1135 (Fig. 59) that is pivoted at its lower end to the lever 1052 and at its upper end to an arm 1137 that has a hub 1138 freely rotatable on the shaft 1122. The hub 1138 has a partially cylindrical extension 1139 (Fig. 61) that has radial abutment faces 1140 and 1141 which are opposite faces 1142 and 1143, respectively, formed on a radially projecting drive flange 1144 that is formed on the shaft 1122. When the shaft 1048 is rotated clockwise, the rod 1135 is raised, causing the arm 1137 to be rotated clockwise (Fig. 61) and allowing the shaft 1122 to be rotated clockwise by spring 1126. As the extension 1139 moves in a clockwise direction, the spring 1126 urges the gear arm 1119 clockwise (Fig. 57), moving the upper clamp pad 1060 toward the pear. If the inward movement of the pad 1060 is stopped before the shaft 1122 has completed its rotary movement, the lost motion connection between the hub extension 1139 and the shaft flange 1144 permits the hub extension to continue rotation for a predetermined distance without corresponding movement of the shaft 1122.

In summary, when the roller 1076 (Fig. 57) rides up the cam surface 1077a, the lower shaft 1048 is pivoted counterclockwise causing the wedge blocks 1055 to swing the rods 1068 outwardly and move the side clamp pads 1061 and 1063 to open position. Counterclockwise movement of the shaft 1048 causes the abutment face 1087b (Fig. 60) to engage face 1086b of the gear arm hub extension 1086 and move the gear arm counterclockwise (Fig. 57), thereby moving the lower clamping pad 1062 to open position. At the same time the rod 1135 (Fig. 61) is moved downwardly and the abutment face 1141 on the hub extension 1139 is brought into engagement with the face 1143 and the gear arm 1119 (Fig. 57) is swung counterclockwise to move the upper jaw to open position.

The impaling rod 1067 (Fig. 57) is an elongated member comprising two spaced side wall members 1150 and 1151 (Fig. 58), each of which has a partially circular cross-section. The side wall members are spaced apart to provide a vertical slot 1152. At their inner end, the wall members 1150 and 1151 are secured to a cylindrical member 1154 (Fig. 62) that is pressed in a tube 1155 which is mounted for rotation in two spaced bearing arms 1157 projecting from the high wall 1045. A gear 1160 is threaded in the end of the tube 1155 so that rotation of the pulley will cause rotation of the tube. A bronze washer 1161 is disposed between the gear 1160 and the rear bearing arm 1157 and a washer 1162 is disposed between the rear bearing arm 1157 and a spring clip 1163 which locks the tube 1155 against axial movement in the bearing arms 1157.

A cutter 1170 is disposed in the slot 1152 between the side wall members of the impaling rod. The cutter has a curved longitudinal cutting edge 1172 and transverse cutting edges 1173 which engage and cut up the seed cell of a pear on the impaling tube. A calyx end trimming cutting edge 1175 is formed near the outer end of the cutter 1170. The cutter 1170 has a long shaft 1177 that is pivotally mounted on a pin 1178 that is secured in the short cylindrical member 1154. Near its innermost end the shaft 1177 has an inclined slot 1180 which receives a roller 1181 that is disposed on a pin 1182. The roller 1181 and the pin 1182 extend through two aligned slots 1185 in the opposite side walls of the rotatable tube 1155 and are received in a collar 1186. Since the slots 1185 extend axially of the tube 1155 and the slot 1180 in the cutter shaft 1177 is inclined relative to the axis of the tube, movement of the roller 1181 in the slots 1185 will cause pivoting movement of the cutter shaft 1177, causing the cutting edges at the outer end of the shaft to be moved in or out of the slot. If the roller 1181 is moved toward the right from the position of Fig. 62, the cutting edges will be moved progressively out of the impaling tube to engage and cut the seed cell and the calyx end of the pear. When the roller 1181 is moved toward the left, the cutting edges will be withdrawn into the impaling tube.

The roller 1181 is moved axially of the tube 1155 by means of the collar 1186 which is slidable on the tube 1155 and has an annular groove 1190. A roller 1192 (Fig. 57), which is disposed in the groove 1190, is rotatably mounted on a pin 1193 that is pressed in an arm 1194. A similar roller (not shown), which is mounted in the same manner on an arm 1195 (Fig. 62), is disposed in the groove 1190 diametrically opposite the roller 1192. Both of the arms 1194 and 1195 are integrally formed on a hub 1196 (Fig. 59) that is freely rotatable on a shaft 1199 secured to and projecting outwardly from the wall 1045. A cam arm 1204 (Fig. 57), which is integrally formed on the hub 1196, carries a cam roller 1206 which rides on the camming surfaces of a cam plate 1208 (Figs. 65 and 66) that is mounted by bolts 1209 on a bracket 1210 secured to and projecting upwardly from the plate 1011 of the stationary frame structure 1005. The bracket has vertical slots 1210a which permit raising or lowering of the cam plate. Since the cam plate 1208 is adjustable on the bracket 1210, the movement of the collar 1186 may be adjusted to regulate the amount the cutting edges move out of the impaling rod. It will be noted in Fig. 57 that, when the roller 1206 is raised, the collar 1186 is moved to the right, causing the cutting edge of the cutter to be moved out of the impaling tube. When the roller 1206 is moved downwardly, the collar 1186 is moved toward the left, causing the cutting edges to be withdrawn into the impaling tube.

Accordingly, the cam 1208 (Fig. 66) has an upwardly inclined camming surface 1208a that causes the roller 1206 to be raised, and a surface 1208b that moves the roller downwardly.

The pear is cored by rotating the cored rod 1067 while the pear is held in stationary position by the four clamp pads. Rotation of the coring rod is effected through a flexible belt 1207 (Fig. 62) that has teeth formed on one surface. The belt 1207 is disposed around the gear 1160 on the end of the rotatable tube 1155, around an idler gear 1211 which is rotatably mounted on a rod 1212 secured in the high wall 1045, around a drive gear 1213 rotatably mounted on a bushing 1214 disposed on the upper end of the shaft 1002, and around an idler gear 1215 (Fig. 57). The drive gear 1213 is keyed, in any suitable manner, to a gear 1216 (Figs. 62 and 64) that is adapted to be moved into meshing engagement with a gear segment 1217 (Figs. 65 and 66) as the head 1000 is carried around the coring turret. The gear segment 1217 is pivotally mounted by a pin 1218 on a rail 1219 that is mounted in spaced relation above the cam mounting plate 1011. A spring 1220 (Fig. 65) urges the gear segment 1217 inwardly.

A splitting blade 1221 (Figs. 57 and 59) is mounted between spaced arms 1222 and 1223 of a blade holder 1224 which has a yoke 1226 (Fig. 57) mounted for pivoting movement on a shaft 1228 disposed in a flange 1230 projecting outwardly from the lower portion of the boss 1041 at the front of the housing. The blade holder 1224 is normally held in the retracted position of Fig. 59 by means of a spring 1232 which is connected between a tab 1233 secured to the flange 1230 and a pin 1234 disposed in the upper portion of the blade holder. At the end of the coring and trimming operation the splitting blade 1221 is swung up to a position of alignment with the impaling rod 1067 by means of a cam roller 1240 (Fig. 64) that is rotatably mounted on an arm 1241 of the blade holder 1224. The roller 1240 (Fig. 57) rides along the surface of a cam 1244 mounted on the cam mounting plate 1011 (Fig. 66). The cam 1244, which is resiliently mounted, has an upwardly inclined camming surface 1244a that raises the roller 1240 and pivots the blade holder counterclockwise (Fig. 59) to bring the blade into a vertical plane through the impaling rod. If desired, the camming surface 1244a may be designed so that the blade holder is at first gradually moved toward an erect position and then rapidly moved to bring the blade to a vertical position at exactly the correct time. A flat camming surface 1244b (Fig. 66) holds the blade in the vertical position. The blade has a recess formed in its cutting edge and this recess receives the end of the coring rod when the blade is swung up to a position of alignment with the rod.

After the pear has been cored and trimmed and the splitting blade is in aligned position with the impaling rod, the pear is pushed off the rod by a pusher lever 1250 (Figs. 62 and 64) which has an offset yoke 1251 at its upper end. A block 1252, which is pivotally mounted on the yoke, has a recess 1252b adapted to receive the impaling rod 1067, and a vertical slot 1252a arranged to receive the sharpened end of the blade 1221 during the push off operation. Near its lower end the pusher lever 1250 is secured, in any suitable manner, to a shaft 1253 that is journaled for rotation in the side walls of the housing. The shaft 1253 (Fig. 62) has an annular groove 1254 into which a ball 1255 is pressed by a spring 1256. The spring is disposed in an elongated hole 1258 in the front wall of the housing and is adjustably held therein by a setscrew 1260 (Fig. 64) which is threaded into the end portion of the hole 1258. It will be seen in Fig. 62, that the spring loaded ball 1255 will normally engage an end wall 1254a of the annular groove 1254 and will hold the pusher lever in a predetermined inward position. It will be appreciated that when the unit 1000 is moved around the coring turret, centrifugal force will tend to pivot the lever 1250 and move the block 1252 to an outer position on the impaling rod 1067 where they might interfere with the operation of the clamping pads.

When the pear is ready to be discharged, the pusher lever 1250 is swung counterclockwise (Fig. 64) by means of a cam roller 1264 that is rotatably mounted on an arm 1265 of the lever 1250. The roller 1264 is arranged to ride in a cam track 1266 (Fig. 66) that has an upwardly inclined entrance camming surface 1266a, and a downwardly inclined surface 1266b that forces the roller 1264 downwardly to pivot the pusher lever 1250 in a direction adapted to move the block 1252 outwardly along the impaling tube to eject the pear. The cam track 1266 also has an upwardly inclined camming surface 1266c which raises the roller 1264 and moves the pusher blocks rearwardly along the impaling rod. It will be understood that when a pear is impaled on the impaling rod it will contact the pusher block 1252 which will slide rearwardly to accommodate the pear. When the pusher lever is pivoted by the cam to eject a pear, the resistance of the spring loaded ball 1255 in the groove is overcome and the pusher lever passes through the position in which it would normally be held by the spring loaded ball 1255, if there were no pear on the impaling rod.

As a pear is pushed onto the impaling rod 1067, the upper surface of the pear is penetrated by a sharpened fin 1269 (Fig. 62) which is secured in depending relation on the lower surface of an arm 1270. The arm 1270 has a curved outer end and is pivotally mounted on a pin 1271 which is fixed in a bracket 1274 secured to the high wall 1045. The arm 1270 (Fig. 64) has a bar 1276 projecting from one side face, and a spring 1277, connected between the bar 1276 and the wall 1045, urging the arm 1270 downwardly until the end of the bar 1276 abuts the edge of the bracket 1274. The fin 1269, which assists the clamps in preventing rotation of the pear, is disposed in a vertical plane. Since the fins of the stemming tube of the main turret are also disposed in a vertical plane, the cuts made by all the fins will be in the same plane. The fin 1269 also holds the pear against displacement as the pear is pushed on and off the impaling rod 1067.

In operation, the head 1000 is brought into alignment with the stemming tube of the main turret as shown in Fig. 62. It is to be noted that the impaling rod 1067 of the unit has a tapered outer end that terminates in a cylindrical portion adapted to fit into the end of the stemming tube. When the stemming tube and the coring rod are in alignment, the stemming tube is moved radially outwardly from the main turret, by means of its previously described actuating mechanism, and the end of the impaling rod pilots the stemming tube into perfect alignment, as shown in Fig. 62. The butt stop is then moved outwardly from the main turret to push the pear from the stemming tube of the coring rod. As the pear is impaled on the rod 1067, the upper surface of the pear is penetrated by the sharpened fin 1269 of the spring-loaded arm 1270. At this time, the roller 1076 (Fig. 57), that controls the clamp pads, is disposed on the inclined camming surface 1077b (Fig. 65). Accordingly, the side pads 1061 and 1063 are urged inwardly by the spring 1072, the lower pad is urged inwardly by the spring 1100, and the upper pad 1060 is urged downwardly by the spring 1126.

As the head 1000 moves around the turret the pusher lever roller 1264 rides up the camming surface 1266a to pivot the pusher to a rearward position on the impaling rod. The gear 1216 then moves into engagement with the gear segment 1217 (Fig. 65) to start the rotation of the impaling rod 1067. Shortly after the rod 1067 begins to rotate, the roller 1206 (Fig. 62), which controls the pivoting of the cutter in the impaling rod rides up the upwardly inclined surface 1208a of the cam plate 1208 causing the cutting edges to be progressively moved out of the slot of the rotating impaling tube. The rotation of the cutter in the pear tends to displace the pear and move the upper and lower clamp pads outwardly from the pear. However outward movement of the pads 1060 and 1062 is prevented because such movement cocks the racks 1110 and 1080 in their slidable mounting. Accordingly, the upper and lower clamp pads are effectively locked in position. When the seed cell and the calyx end of the pear have been cut, the cutter is retracted as the roller 1206 is forced downwardly by the camming surface 1208b.

The splitting blade 1221 is then swung up to a vertical position by the engagement of the roller 1240 (Fig. 64) with the camming surface 1244a, and is held in the vertical position by the flat camming surface 1244b. When the splitting blade is in position, the clamp pads are swung to their open position by the engagement of the roller 1076 with the camming surface 1077a. The pusher lever 1250 (Fig. 64) is then swung counterclockwise by the engagement of the roller 1264 with the camming surface 1266b (Fig. 66) to force the pear off the impaling rod and over the splitting blade. The halves of the pear drop into a suitable discharge chute (not shown). The roller 1264 rides up the camming surface 1266c and retracts the pusher block. As the block moves rearwardly, the splitting blade 1221 is swung to its normal position of Fig. 59 as the roller 1240 moves down off the camming surface 1244b.

The head 1000 will then be ready to receive another pear from the stemming tube of the main turret.

It is sometimes desirable to leave the pear in a whole condition after it has been peeled, cored and trimmed. The coring and trimming head 1000 may be easily adapted to such a process since, when the blade 1221 is removed from the blade holder 1224, the pears will be discharged from the head without being split. It is also evident that, if it is necessary or desirable to cut the pear into more than two pieces, the blade 1221 (Fig. 59) may be replaced by a blade having a plurality of blades. For example, a cutter having two blades crossed at 90 degrees would cut the pear into four sections. It is therefore evident that the head 1000 is flexible in its use and makes the machine adaptable for carrying out different fruit preparation processes.

From the foregoing description it will be recognized that the present invention provides a pear preparation machine that is capable of completely and efficiently carrying out the processing of pears for canning or the like. The fruit feed mechanism that presents the feed cups to the operator at a predetermined, advantageous, inclined angle to the vertical permits the feeding of the pears to be carried out with a minimum of fatigue to the operator. The use of a butt stop to push the pear down into the tapered fruit receiving chamber of each feed cup assures the accurate aligning of the pear with the impaling tube and minimizes losses due to improperly positioned pears. Each pear, regardless of its size, is accurately positioned by the air-operated control device which stops the inward movement of the pear on the tube when the pear has reached a predetermined position at which the peeling operation is begun. Again, the use of a stem end cutter that makes use of the rotation of the stemming tube to complete the stem end cut results in pears that have their stem ends cut off squarely. Further, both of the coring and trimming heads of the present invention quickly and automatically remove the seed cell from the pear, trim the calyx end, and discharge the peeled, cored and trimmed pear segments.

While a preferred apparatus for carrying out the invention has been shown and described, it will be understood that it is capable of modification and variation while still employing the principles of the invention. It is to be understood, therefore, that the scope of the invention should be limited only by the scope and proper interpretation of the claims appended hereto.

Having thus described the invention, that which is believed to be new and for which protection by Letters Patent is desired is:

1. In a fruit preparation machine, a stationary support structure, a turret mounted for rotation in said structure, an impaling tube mounted on said turret for movement radially of said turret and for movement in a circular path with said turret, cam means operatively connected between said stationary structure and said impaling means for moving said tube radially outwardly and inwardly of said turret at predetermined parts of the rotary movement of said turret, a rotary cutter supported by said turret, means mounting said cutter for movement longitudinally along said impaling tube, cam means operatively connected between said stationary structure and said cutter mounting means for moving said cutter along said tube in response to rotation of said turret, means for rotating said cutter, and means for rotating said turret.

2. In a fruit preparation machine, a rotary turret, an impaling tube mounted for rotation on said turret and arranged to support a fruit impaled thereon, a stationary gear disposed concentrically of said turret, a locking plate disposed concentrically of said turret, a circular drive member disposed concentrically of said turret, means for rotating said drive member, gear means keyed to said tube to rotate said tube on its axis upon engagement of said gear means with said stationary gear, a pusher member mounted on said turret for movement radially of the turret closely adjacent said tube, a locking member carried by said pusher member and arranged to be moved into engagement with said locking plate to lock said pusher member against movement radially outwardly of said turret, a rotary cutter mounted on said turret, means connecting said rotary drive means in driving engagement with said rotary cutter, means for rotating said turret, stationary cam means operatively associated with said pusher member and coordinated with the movement of said turret whereby said pusher member is moved inwardly of the turret along the impaling tube to contact and seat a fruit thereon, then the locking member of said pusher member is moved into engagement with said locking plate, and the gear means on said tube moves into engagement with said stationary gear to begin rotation of said tube.

3. In a fruit preparation machine, a rotary turret; means for rotating said turret; fruit impaling means mounted on said turret for movement in a fixed plane; and fruit feeding means mounted for movement along a predetermined path adjacent said impaling means, said feeding means including a feed cup having a symmetrical fruit-receiving chamber, means on said cup for receiving a pear and holding the pear with the stem-blossom axis disposed on the axis of symmetry of said cup, means mounting said cup for pivoting movement about a horizontal axis; means for moving said feeding means along said predetermined path; and stationary cam means operatively connected to said cup and arranged to engage said cup during movement along said predetermined path to pivot said cup to a position wherein said axis of symmetry is in the plane of said impaling means.

4. In a fruit preparation machine, a movable support member, an impaling tube mounted for longitudinal movement in said support member, means mounting said support member for movement along a fixed path, a first lever connected to said impaling tube to move said tube longitudinally, a pusher having a bifurcated end straddling said tube, a second lever connected to said pusher, a pair of stationary cams in engagement respectively with said first and second levers to effect coordinated longitudinal movement of said impaling tube and movement of said pusher axially of said tube.

5. In a fruit preparation machine, a stationary support structure, a rotary turret having a side wall, means for rotating said turret, a gear train mounted on said turret and including a tubular gear mounted for rotation in said side wall, an impaling tube splined to said tubular gear, an actuating lever connected to said tube and pivoted on said turret, cam means operatively connected between said lever and said stationary support structure and arranged to pivot said lever and actuate said tube during rotation of said turret, and stationary gear means mounted on said stationary support structure in a position to be engaged by said gear train during a portion of each rotation of said turret.

6. In a fruit preparaion machine, an impaling tube arranged to carry a fruit impaled thereon, means for moving said tube along a fixed path transverse to the length of said tube, a pusher mounted for movement axially of said tube closely adjacent thereto, a locking member carried by said pusher, a stationary locking plate adapted to be engaged by said locking member to prevent movement of said pusher axially of said tube, and means including a stationary cam adjacent the transverse path of movement of said tube and a lever in engagement with said cam and operatively connected to said pusher and arranged to move said pusher member along said tube as said tube is moved along said transverse path to push the fruit along the tube and to move said locking member into position for engagement by said locking plate.

7. In a fruit preparation machine, an impaling tube mounted for movement along a fixed path and adapted to carry a pear impaled thereon, a stem-end pusher member having a recess at one end adapted to receive said tube, means mounting said pusher member adjacent said tube for pivoting movement on an axis parallel to said tube, means responsive to movement of said tube along said fixed path and operatively connected to said pusher member for consecutively pivoting said member about said axis to a position wherein said tube is disposed in said recess, and then moving said pusher member axially of said tube while in said pivoted position to engage the stem end of the fruit on said tube and shift it axially on said tube.

8. In a fruit preparation machine, a support member mounted for movement along a fixed path, a tube on said support member arranged to carry a fruit impaled thereon, a pusher member mounted on said support member for movement axially of said tube and closely adjacent thereto, a lever connected to said pusher member, releasable cam means operatively connected to said lever and arranged when in unreleased condition during movement of said support member to actuate said lever and move said pusher member axially of said tube to engage the fruit and move it along said tube, a positioning lever mounted on said support member adjacent said impaling tube and spaced forwardly from said pusher member in the direction of movement of said pusher member in position to be engaged and pivoted by the fruit as it is moved along said tube by said pusher member, a power cylinder connected to said releasable cam means and arranged to release said cam means upon being energized, means responsive to the pivoting of said positioning lever when engaged by the fruit for energizing said power cylinder to release said cam means and stop the movement of said pusher member.

9. In a fruit preparation machine, a support structure, a fruit impaling tube mounted on said support structure and projecting outwardly therefrom, a cutter support member adjacent said stemming tube, a cutter head on said support member, means mounting said cutter support member for movement toward and away from said stemming tube and for movement longitudinally of said tube, actuating means for moving said cutter support member longitudinally of said tube, a retractor bar pivotally mounted on said support structure and having a portion disposed closely adjacent said cutter support member, and means operable independently of said actuating means for pivoting said retractor bar in a direction to move said portion into contact with said cutter support member and move said support member to a position spaced a predetermined distance from said stemming tube.

10. In a fruit preparation machine, a support structure, a fruit impaling tube mounted on said support structure and projecting outwardly therefrom, a cutter unit mounted on said support structure for swinging movement toward and away from said impaling tube and for movement longitudinally of said tube, means biasing said unit toward said impaling tube, a retractor bar pivotally mounted on said support structure and projecting outwardly in a direction generally parallel to said impaling tube, said retractor bar having a portion disposed closely adjacent said cutter unit, an actuating member mounted on said support structure and arranged to be moved in a forward direction to engage said retractor bar and pivot said bar in a direction to contact said cutter unit and pivot said unit a predetermined distance in a direction away from said impaling tube, spring means operatively connected between said support structure and said actuating member and arranged tot urge said actuating member in a reverse direction, and cam means operatively connected between said support structure and said actuating member for moving said actuating member in said forward direction against the resistance of said spring means.

11. In a fruit preparation machine, a rotary turret, an impaling tube mounted for rotation on said turret and arranged to support a fruit impaled thereon, a stationary gear disposed concentrically of said turret, a locking plate disposed concentrically of said turret, a circular drive member disposed concentrically of said turret, means for rotating said drive member, gear means keyed to said tube to rotate said tube on its axis upon engagement of said gear means with said stationary gear, a pusher member mounted on said turret for movement radially of the turret closely adjacent said tube, a locking member carried by said pusher member and arranged to be moved into engagement with said locking plate to lock said pusher member against movement radially outwardly of said turret, means for rotating said turret, stationary cam means operatively associated with said pusher member and coordinated with the movement of said turret whereby said pusher member is moved inwardly of the turret along the impaling tube to contact and seat a fruit thereon, then the locking member of said pusher member is moved into engagement with said locking plate, and the gear means on said tube moves into engagement with said stationary gear to begin rotation of said tube.

12. In a pear preparation machine, an impaling rod adapted to support a pear impaled thereon, a pusher member mounted for movement along a fixed path axially of said rod and closely adjacent thereto to engage a pear on said rod and move it axially thereon, a cam follower connected to the mounting means of said pusher member, a releasable cam arranged to be moved from an inclined position in the path of said cam follower to a non-inclined position, said cam being arranged when in inclined position to move said follower in a direction to effect movement of said pusher axially along said tube, means for latching said cam in said inclined position, means for moving said cam follower into engagement with said inclined cam, to effect movement of said pusher member along said fixed path, a movable positioning member disposed adjacent said tube in the path of movement of the pear as it is moved axially on the tube by said pusher member, and means responsive to a predetermined movement of said positioning member for unlatching said cam to terminate the axial movement of said pusher member.

13. In a fruit preparation machine, a stationary support, a turret mounted for movement around said support, an impaling tube mounted on said turret and projecting radially outwardly therefrom and adapted to support a fruit in impaled position, a pusher mounted on said turret for movement longitudinally of said tube to engage and move the fruit on the tube, a locking member mounted on said support structure and adapted to engage said pusher and prevent said longitudinal movement of said pusher, and means operatively connected between said turret and said pusher and responsive to rotary movement of said turret for moving said pusher into locked engagement with said locking member.

14. In a fruit preparation machine, a rotary turret, an impaling tube mounted for rotation on said turret and arranged to support a fruit impaled thereon, a stationary gear disposed concentrically of said turret, gear means keyed to said tube to rotate said tube on its axis upon engagement of said gear means with said stationary gear, a pusher member mounted on said turret for movement radially of the turret closely adjacent said tube, a rotary cutter mounted on said turret, means for rotating said turret, stationary cam operatively associated with said pusher member and coordinated with the movement of said turret whereby said pusher member is moved inwardly of the turret along the impaling tube to contact and seat a fruit thereon, and the gear means on said tube moves into engagement with said stationary gear to begin rotation of said tube.

15. In a fruit preparation machine, an impaling rod adapted to support a fruit impaled thereon, a pusher member mounted for movement along a fixed path axially of a fruit impaled thereon, releasable cam means operatively connected to said pusher to move said pusher along said path, a movable stop member disposed adjacent said tube in the path of movement of the fruit to be engaged and moved by the fruit as it is shifted along the tube by said pusher, and means responsive to a predetermined movement of said movable stop member for releasing said cam means from operative connection to said pusher to terminate the axial movement of said pusher.

References Cited in the file of this patent
UNITED STATES PATENTS

| | | |
|---|---|---|
| 321,667 | Wilcox | July 7, 1885 |
| 688,909 | Warner | Dec. 17, 1901 |
| 1,785,011 | Felizianett | Dec. 16, 1930 |
| 1,872,731 | Goranson | Aug. 23, 1932 |
| 1,979,322 | Ewald | Nov. 6, 1934 |
| 2,089,502 | Polk | Aug. 10, 1937 |
| 2,123,187 | Ewald | July 12, 1938 |
| 2,150,046 | Bard | Mar. 7, 1939 |
| 2,187,075 | Coone | Jan. 16, 1940 |
| 2,246,843 | Drake | June 24, 1941 |
| 2,265,649 | Krehbiel | Dec. 9, 1941 |
| 2,321,590 | Ewald | June 15, 1943 |
| 2,343,098 | Thompson | Feb. 29, 1944 |
| 2,447,640 | Dunn | Aug. 24, 1948 |
| 2,502,797 | Luhdorff et al. | Apr. 4, 1950 |
| 2,526,712 | Thompson | Oct. 24, 1950 |
| 2,529,727 | Dunn | Nov. 14, 1950 |
| 2,569,207 | Waters | Sept. 25, 1951 |
| 2,681,089 | Francisco | June 15, 1954 |
| 2,732,925 | Pechy | Jan. 31, 1956 |
| 2,738,819 | De Back et al. | Mar. 20, 1956 |
| 2,742,067 | Coon | Apr. 17, 1956 |
| 2,744,613 | Hait | May 8, 1956 |